(12) United States Patent
Minakuchi

(10) Patent No.: US 8,229,793 B2
(45) Date of Patent: Jul. 24, 2012

(54) SELECTION SET EVALUATION DEVICE AND SALE MANAGEMENT DEVICE

(75) Inventor: Mitsuru Minakuchi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 616 days.

(21) Appl. No.: 12/391,033

(22) Filed: Feb. 23, 2009

(65) Prior Publication Data

US 2009/0228334 A1  Sep. 10, 2009

Related U.S. Application Data

(62) Division of application No. 10/399,522, filed as application No. PCT/JP01/09037 on Oct. 15, 2001, now Pat. No. 7,747,467.

(30) Foreign Application Priority Data

| Oct. 17, 2000 | (JP) | 2000-317138 |
| Nov. 1, 2000 | (JP) | 2000-335147 |
| Nov. 9, 2000 | (JP) | 2000-342568 |
| Dec. 19, 2000 | (JP) | 2000-386008 |

(51) Int. Cl.
*G06Q 30/00* (2006.01)

(52) U.S. Cl. ........ 705/26; 705/26.14; 705/26.4; 705/10; 705/14; 705/21

(58) Field of Classification Search ............... 705/26.14, 705/26.4, 10, 14, 21
See application file for complete search history.

(56) References Cited

U.S. PATENT DOCUMENTS

| 5,450,314 A | 9/1995 | Kagami et al. |
| 6,014,677 A | 1/2000 | Hayashi et al. |
| 6,339,774 B1 | 1/2002 | Nakayama et al. |
| 6,412,012 B1 | 6/2002 | Bieganski et al. |
| 6,526,411 B1 * | 2/2003 | Ward ................................ 1/1 |
| 6,697,824 B1 * | 2/2004 | Bowman-Amuah ........ 709/229 |

FOREIGN PATENT DOCUMENTS

| JP | 7-200535 A | 8/1995 |
| JP | 9-62665 A | 3/1997 |
| JP | 9-171483 A | 6/1997 |
| JP | 9-171504 A | 6/1997 |
| JP | 9-245085 A | 9/1997 |
| JP | 10-83386 | 3/1998 |
| JP | 10-320457 A | 12/1998 |
| JP | 11-7472 | 1/1999 |
| JP | 11-250076 | 9/1999 |
| JP | 2000-132618 A | 5/2000 |

OTHER PUBLICATIONS

Chislenko, Alexander, "Collaborative Information Filtering and Semantic Transports," 1997.

* cited by examiner

*Primary Examiner* — Vanel Frenel
(74) *Attorney, Agent, or Firm* — Birch, Stewart, Kolasch & Birch, LLP

(57) ABSTRACT

A selection set evaluation device comprises selection item storage means (201) where information concerning selection items are stored, selection item presenting means (202) for presenting selection items to a user, selection item selection means (203) for allowing the user to select one or more of the presented selection items, evaluation criterion storage means (207) where evaluation criterion used for evaluating a selection set constituting of the one or more selection items selected by the user; and selection set evaluating means (209) for evaluating the selection set on the basis of the evaluation criterion stored. Thus a selection set evaluation device for evaluating a selection set which is a combination of selection items selected by the user on the basis of predetermined evaluation criteria.

11 Claims, 56 Drawing Sheets

FIG. 4

| Evaluation Standard Number | Evaluation Standard Type | Evaluation Pattern | Grade |
|---|---|---|---|
| 1 | Order | ID = [7, 8] | 10 |
| 2 | Order | ID = [3, 8] | 5 |
| 3 | Order | ID = [1, 4, 3] | 7 |
| 4 | Combination | Artist name = (Masahiro Hondo, Toshihiro Kawahara) | 5 |
| 5 | Combination | Artist name = (Masahiro Hondo, WING) | 2 |
| 6 | Combination | Artist name = (WING, Toshihiro Kawahara) | 2 |
| 7 | Attribute | Song name =n(Ai (love)?) | n |
| 8 | Attribute | Category = n(Enka (Japanese blues)) | n |
| 9 | Attribute | Category = 2(Pops):1(Western music) | 5 |
| ⋮ | ⋮ | ⋮ | ⋮ |

FIG. 15

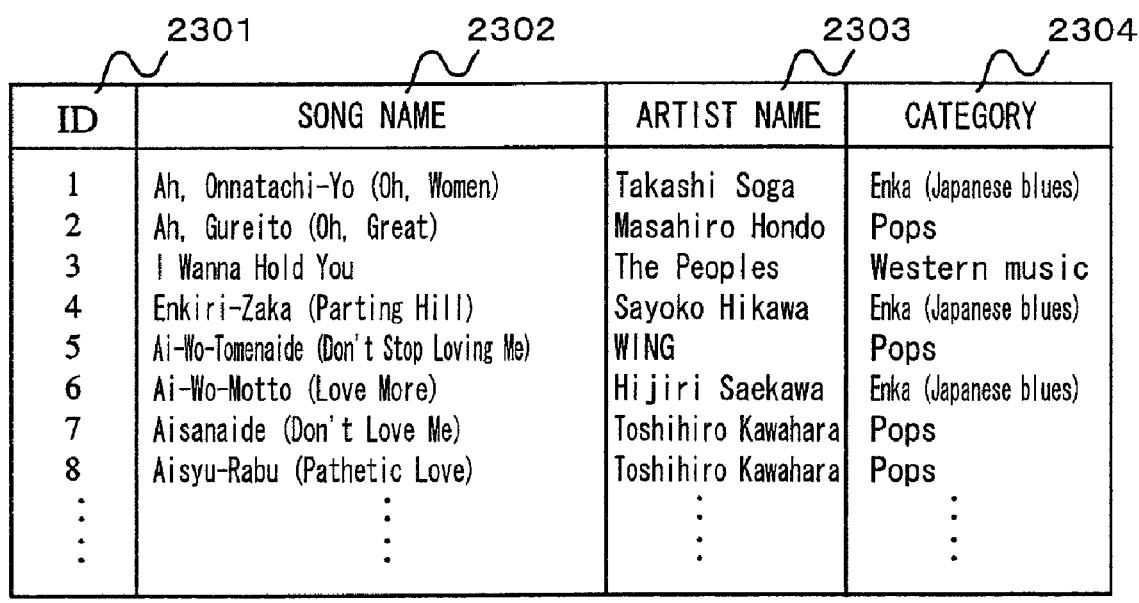

| ID | SONG NAME | ARTIST NAME | CATEGORY |
|----|-----------|-------------|----------|
| 1 | Ah, Onnatachi-Yo (Oh, Women) | Takashi Soga | Enka (Japanese blues) |
| 2 | Ah, Gureito (Oh, Great) | Masahiro Hondo | Pops |
| 3 | I Wanna Hold You | The Peoples | Western music |
| 4 | Enkiri-Zaka (Parting Hill) | Sayoko Hikawa | Enka (Japanese blues) |
| 5 | Ai-Wo-Tomenaide (Don't Stop Loving Me) | WING | Pops |
| 6 | Ai-Wo-Motto (Love More) | Hijiri Saekawa | Enka (Japanese blues) |
| 7 | Aisanaide (Don't Love Me) | Toshihiro Kawahara | Pops |
| 8 | Aisyu-Rabu (Pathetic Love) | Toshihiro Kawahara | Pops |
| ⋮ | ⋮ | ⋮ | ⋮ |

FIG. 16

| Selection Set Number | 1 |
|---|---|
| Order | ID |
| 1 | 2 |
| 2 | 7 |
| 3 | 8 |
| 4 | 6 |
| 5 | 4 |
| Maker | DJ mina |
| Comment | I made the album in memory of old days. |

2401 (Selection Set Number)
2402 (Order), 2301 (ID)
2403 (Maker)
2404 (Comment)

FIG. 17

| Selection Set Number | Evaluation Result | | | | | |
|---|---|---|---|---|---|---|
| | Evaluation Number | Evaluator | Comment | Grade | Adequacy | |
| 1 | 1 | Mamizu-man | I sometimes sing this song in karaoke. | 92 | 1.0 | |
| | 2 | Licky | It seems imbalance. | 40 | 0.7 | |
| | 3 | Mina-pi | The consistency between songs is good. | 80 | 1.2 | |
| 2 | 4 | Mamizu-man | I don't think it good. | 5 | 1.0 | |
| ⋮ | ⋮ | ⋮ | ⋮ | ⋮ | ⋮ | |

FIG. 28

| | 3301 | 3302 | 3303 | 3304 |
|---|---|---|---|---|
| | ID | SONG NAME | ARTIST NAME | CATEGORY |
| | 1 | Ah, Onnatachi-Yo (Oh, Women) | Takashi Soga | Enka (Japanese blues) |
| | 2 | Ah, Gureito (Oh, Great) | Masahiro Hondo | Pops |
| | 3 | I Wanna Hold You | The Peoples | Western music |
| | 4 | Enkiri-Zaka (Parting Hill) | Sayoko Hikawa | Enka (Japanese blues) |
| | 5 | Ai-Wo-Tomenaide (Don't Stop Loving Me) | WING | Pops |
| | 6 | Ai-Wo-Motto (Love More) | Hijiri Saekawa | Enka (Japanese blues) |
| | 7 | Aisanaide (Don't Love Me) | Toshihiro Kawahara | Pops |
| | 8 | Aisyu-Rabu (Pathetic Love) | Toshihiro Kawahara | Pops |
| | ⋮ | ⋮ | ⋮ | ⋮ |

FIG. 29

| Selection Set Number | 1 |
|---|---|
| Order | ID |
| 1 | 2 |
| 2 | 7 |
| 3 | 8 |
| 4 | 6 |
| 5 | 4 |
| Maker | DJ mina |
| Comment | I made the album in memory of old days. |

3401 — Selection Set Number
3402 — Order
3301 — ID
3403 — Maker
3404 — Comment

FIG. 30

| Evaluation Standard Number | Evaluation Standard Type | Evaluation Pattern | Grade |
|---|---|---|---|
| 1 | Order | ID = [7, 8] | 10 |
| 2 | Order | ID = [3, 8] | 5 |
| 3 | Order | ID = [1, 4, 3] | 7 |
| 4 | Combination | Artist name = (Masahiro Hondo, Toshihiro Kawahara) | 5 |
| 5 | Combination | Artist name = (Masahiro Hondo, WING) | 2 |
| 6 | Combination | Artist name = (WING, Toshihiro Kawahara) | 2 |
| 7 | Attribute | Song name =n(Ai (love)?) | n |
| 8 | Attribute | Category = n(Enka (Japanese blues)) | n |
| 9 | Attribute | Category = 2(Pops) : 1(Western music) | 5 |
| ⋮ | ⋮ | ⋮ | ⋮ |

FIG. 31

| Selection Set Number | Evaluation Result | | | | |
|---|---|---|---|---|---|
| | Evaluation Number | Evaluator | Comment | Grade | Adequacy |
| 1 | 1 | (system) | | 24 | 1.0 |
| | 2 | Mamizu-man | I sometimes sing this song in karaoke. | 92 | 1.0 |
| | 3 | Licky | It seems imbalance. | 40 | 0.7 |
| | 4 | Mina-pi | The consistency between songs is good | 80 | 1.2 |
| 2 | 5 | (system) | | 7 | 1.0 |
| | 6 | Mamizu-man | I don't think it good. | 5 | 1.0 |
| ⋮ | ⋮ | ⋮ | ⋮ | ⋮ | ⋮ |

FIG. 32

| Selection Set Number | Partial Evaluation Result | | | | | |
|---|---|---|---|---|---|---|
| | Partial Evaluation Number | Evaluator | Evaluation Target ID | Evaluation Standard Type | Grade | Adequacy |
| 1 | 1 | Mamizu-man | 4,6 | Combination | 10 | 1.0 |
| | 2 | Licky | 2,4 | Combination | -5 | 1.2 |
| | 3 | Mina-pi | 8,6 | Order | 7 | 0.8 |
| 2 | 4 | Mamizu-man | 5,7 | Order | -5 | 1.0 |
| ⋮ | ⋮ | ⋮ | ⋮ | ⋮ | ⋮ | ⋮ |

Labels: 3401, 3702, 3703, 3701, 3704, 3705, 3706, 3707

FIG. 34

| Ranking | Maker/Comment | Grade |
|---|---|---|
| 1 | DJ mina<br>I made the album in memory of old days. | 96 |
| 2 | Kero-pi<br>I have made a good album. | 52 |
| 3 | Ricky<br>Do you know SPEED? | 43 |
| 4 | DJ mina<br>Clutch player are featured. | 36 |
| 5 | Name withheld by request<br>No title | 30 |
| 6 | Kero-pi<br>I made a music album for the first time. | 28 |
| 7 | Ku-tan<br>You would like it. | 21 |
| 8 | DJ mina<br>These songs are familiar to me since I was a kindergarten student. | 19 |

FIG. 44

| | | |
|---|---|---|
| Product Set ID | | 326 |
| Order | | Song ID |
| 1 | | 2 |
| 2 | | 7 |
| 3 | | 8 |
| 4 | | 6 |
| 5 | | 4 |
| Maker Name | | DJ mina |
| Title | | Good Old Age |
| Image File Name | | 326.jpg |

5401 — Product Set ID row
5402 — Order
5301 — Song ID
5403 — Maker Name
5404 — Title
5405 — Image File Name

FIG. 47

| Sales Ranking of This Month | | | |
|---|---|---|---|
| Order | title/Maker | Number of Songs/Time | Price |
| 1 — | Dance-de-GO! (Let's dance!) DDR turbo Type-D | 7 songs 28'56" | 1400 yen |
| 2 ↑ | Iyashi-no-jikan (Healing Time) Dareusagi | 8 songs 59'12" | 1600 yen |
| 3 ↑ | Nastukashino-jidai (Good Old Age) DJ mina | 5 songs 25'43" | 900 yen |
| 4 ↓ | SPEED te-shitteru? (Do you know SPEED?) Mamizu-Nan | 4 songs 15'30" | 1000 yen |
| 5 ↓ | Ippastuya-kenzan (Clutch Player has come) Watashi-mo-ippastuya | 5 songs 19'43" | 1000 yen |

Title: Good Old Age
Maker: DJ mina

Good Old Age

Song List

| | Song Name | Artist Name |
|---|---|---|
| 1 | Shidai | Yuki Kajima |
| 2 | My Eddy | Hiromi Bou |
| 3 | Kurui-uchi | Kinta Amamoto |
| 4 | Jyura-ki | Osui Iroue |
| 5 | Awano-nagareno-youna | Midori Ihara |

Purchase

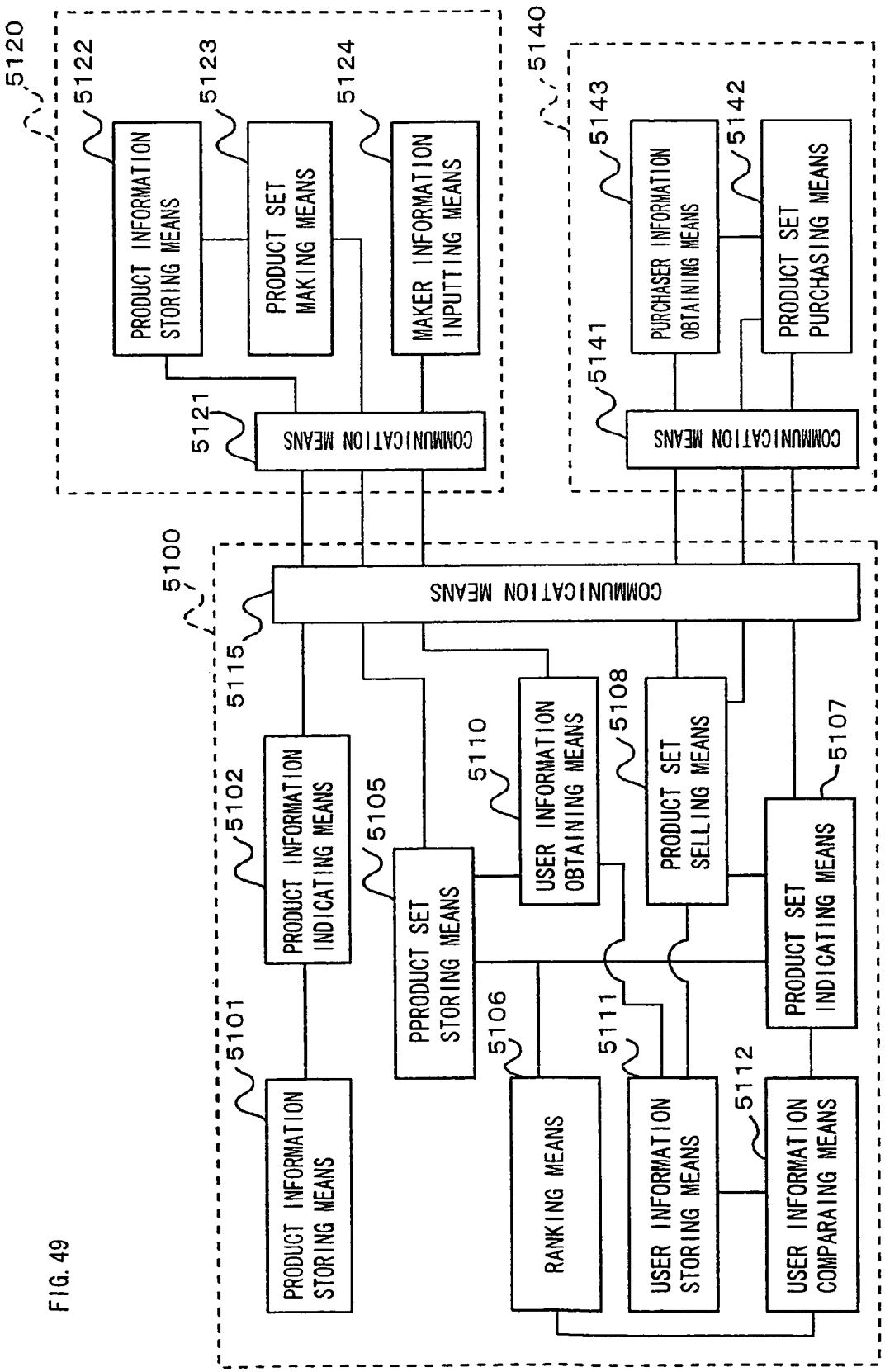

FIG. 50

| | 5901 | 5902 | 5903 | 5904 |
|---|---|---|---|---|
| | Option ID | Type | Option Name | Price |
| | 11 | Body Color | White | 0 |
| | 12 | Body Color | Red | 0 |
| | 13 | Body Color | Black Mica | 20000 |
| | 21 | Gearshift | Manual Gearshift | 0 |
| | 22 | Gearshift | Automatic Gearshift | 75000 |
| | 31 | Front Spoiler | Aero | 10000 |
| | 32 | Front Spoiler | Super Aero | 18000 |
| | 41 | Side Spoiler | Aero | 12000 |
| | 51 | Rear Spoiler | Aero | 28000 |
| | 52 | Rear Spoiler | Super Aero | 35000 |
| | 61 | Muffler | Hyper | 14000 |
| | 62 | Muffler | Sport | 22000 |
| | 71 | Fog Lamp | Fog Lamp | 12000 |
| | 81 | Aluminium Wheel | 195/60R16 | 18000 |
| | 82 | Aluminium Wheel | 205/55R16 | 24000 |
| | 91 | Child Seat | For Small Baby | 18000 |
| | ⋮ | ⋮ | ⋮ | ⋮ |

FIG. 51

| 6001 | User ID | 935 |
| 6002 | User Name | Kauzo Kuruma |
| 6003 | Age | 31 |
| 6004 | Gender | Male |
| 6005 | Single/Married | Married |
| 6006 | Family Member Number | 4 |
| 6007 | Hobby | Driving |

FIG. 54

```
New User Registration
```

- 6201 — Name [                    ]
- 6202 — Age [      ]
- 6203 — ● Male  ○ Female
- 6204 — ● Single ○ Married
- 6205 — Family Member Number [    ]
- 6206 — Hobby  ☐ Driving  ☐ Fishing  ☐ Golf
              ☐ Camp     ☐ Skiing   ☐ Cycling

- 6207 — [ Cancel ]
- 6208 — [ Register ]

FIG. 57

| Western Music Top Sales | | |
|---|---|---|
| Ranking | Title | Artist |
| First | mad season By matchbox TWENTY | Matchbox Twenty |
| Second | Oops!... I Did It Again | Britney Spears |
| Third | Inside Job | Don Henley |
| Fourth | The Marshall Mathers LP | Eminem |
| Fifth | Wasp Star | Xtc |
| ⋮ | ⋮ | ⋮ |

SELECTION SET EVALUATION DEVICE AND SALE MANAGEMENT DEVICE

This application is a Divisional of application Ser. No. 10/399,522 filed on Apr. 17, 2003 now U.S. Pat. No. 7,747, 467 and for which priority is claimed under 35 U.S.C. §120. Application Ser. No. 10/399,522 is the national phase under 35 U.S.C. §371 of PCT International Application No. PCT/JP01/09037 filed on Oct. 15, 2001. The entire contents of each of the above-identified applications are hereby incorporated by reference.

TECHNICAL FIELD

The present invention relates to a selection set evaluation device, a selection set making device, a selection set evaluating system, a selection set evaluating method, a computer-readable storage medium storing a program for carrying out the selection set method, and a product selling device, by which: a user selects one selection item or a plurality of selection items from a large number of selection items so as to make a selection set that is a combination thereof, and the selection set is evaluated in accordance with an evaluation rule, set in advance, that is used to judge which combination is preferable when the selection set itself is regarded as a target product to be purchased for example.

Further, the present invention relates to a selection set evaluation device, a selection set evaluating system, a selection set evaluation result collecting device constituting the selection set evaluating system, a selection set making device, a selection set evaluation inputting device, a selection set evaluating method, a computer-readable storage medium storing a program for carrying out the selection set evaluating method, a product selling device, and a communication supporting device, by which: a user making selection selects one selection item or a plurality of selection items from a large number of selection items so as to make a selection set that is a combination thereof, and an evaluating user makes an evaluation, that is regarded as a standard for a user making selection or a user purchasing the selection set to determine which combination is preferable, so as to indicate an evaluation result to the user making selection or the user purchasing the selection set when the selection set itself is regarded as a target product to be purchased for example.

Further, the present invention relates to a selection set evaluation device, a selection set evaluating system, a selection set evaluation result collecting device constituting the selection set evaluating system, a selection set making device, a selection set evaluation inputting device, a selection set evaluating method, a computer-readable storage medium storing a selection set evaluating program, a product selling device, and a communication supporting device, by which: a user selects one selection item or a plurality of selection items from a large number of selection items so as to make the combination thereof, and an evaluating user makes an evaluation, that is regarded as a standard for a user making selection or a user purchasing the selection set to determine which combination is preferable, in accordance with (a) an evaluation rule that has been set in advance and (b) an evaluation result indicated by another evaluating user, when the selection set itself is regarded as a target product to be purchased for example.

Further, the present invention relates to a sale management device, a product set making device, a product set purchasing device, a sale management system, a sale management method, and a storage medium storing a sale management program, by which: a product set that is a combination of a plurality of products or a plurality of selective items is sold via a network.

BACKGROUND ART

On-line sale performed in the Internet has become popular. In such a sale system, sold products are ranked, and the ranking is displayed in a terminal device, so that a purchaser obtains a standard for selecting products. FIG. 57 shows an example where sold CDs are ranked so that titles thereof and artist names thereof are displayed in the terminal device.

Further, Japanese Laid-Open Patent Application No. 171504/1997 (Tokukaihei 9-171504) (Publication date: Jun. 30, 1997) recites an information processing device and an information processing method such that: a user subjectively evaluates a predetermined target product such as a book and a music software by voting, and a total of votes are calculated so as to rank the target product, so that which product is highly evaluated is indicated to the user.

Incidentally, in the on-line sale of digital contents such as music distribution service, it is possible to purchase a favorite combination of contents by making selection from a large number of contents, for example, the user makes a single music album by combining his/her favorite songs. Further, in sale of a personal computer and the like, there is a sale style which enables subtle customization, for example, selection is made with respect to types of CPU and capacity of a memory or a hard disk, or option parts are purchased in combination, which is known as BTO (Build To Order). In this way, recently, it becomes often that the user selects desired items from a plurality of selection items so as to make a combination of the selected items.

However, in case of combining individual products, there occurs mismatch in terms of an object in purchasing the combination of selected products, for example, there occurs imbalance in terms of rhythm or tempo between the selected songs constituting the music album when the aforementioned music album is made, or there occurs a combination which is inappropriate for a specific usage such as formation of computer graphics when the aforementioned personal computer is targeted.

However, in the conventional method of informing the ranking, products are separately targeted upon making the ranking. Thus, the purchaser cannot obtain a standard for combining a plurality products or selection items, so that the purchaser does not know "which combination satisfies his/her needs in purchasing". This brings about such a problem that: even when the user makes a combination of plural items by referring to the ranking as a standard, the combination tends to lack in the uniformity and to be imbalanced.

Further, in the information processing device and the information processing method recited in Tokukaihei 9-171504, a target item is ranked by calculating (a) the number of times the target item is accessed, and (b) a point obtained and inputted by subjectively evaluating the target item, and similar manners, so as to determine where the target item is ranked. This brings about such a problem that: a standard for evaluation is not clear, so that it is not clear which basis supports the obtained evaluation.

That is, in case of the aforementioned music album, when an album constituted of songs based on a certain theme is made, only subjective evaluation based on personal preference can be obtained, so that it is difficult to realize the uniformity in the entire album with good balance. Further, when there is no evaluating user, it is impossible to obtain the evaluation, or when there are few evaluating users performing, adequacy of the evaluation is low.

Further, in an on-line sale site for selling combination of plural products or plural selective items as described above, a purchaser selects respective products or respective selective items so as to determine which combination is to be purchased, or a seller makes a product set constituted of plural products or plural selective items in advance, and the purchaser purchases the product set as it is or partially changes the product set before purchasing.

The product set made in advance is made by a seller who manages the on-line sale site. Alternately, as recited in Japanese Laid-Open Patent Application No. 320457/1998 (Tokukaihei 10-320457)(Publication date: Dec. 4, 1998), there is such a method that: plural products frequently ordered at the same time are combined with each other in accordance with order history information indicative of (a) products ordered at the same time by a single order maker and (b) the number of the products, so that the product set is automatically made based on the sale history.

However, in the conventional method in which the purchaser selects products or selective items so as to determine a combination to purchase, there is such a problem that the purchaser is bothered to make selection. Further, there is such a problem that: in a case where the purchaser has little knowledge of the products and the selective items, there is no standard to make selection, so that it is difficult to make an appropriate combination that satisfies an object of purchase.

Further, in the method in which the seller makes the product set in advance, the seller is bothered to make the product set.

The operation/sale management method recited in Tokukaihei 10-320457 is to solve the foregoing problems, but there is such a problem that: a large quantity of order history information is required in extracting products for making the product set, so that it is impossible to extract products including a product that has never been sold. Thus, there is such a problem that: only the combination of products ordered at the same time by a single order maker is to be extracted, so that types of the product set automatically made are limited to some extent.

Further, the operation/sale management method recited in Tokukaihei 10-320457 merely proposes the method of automatically making the product set, so that this does not solve the conventional problem such that it is difficult for the purchaser to obtain the product set suitable for the object of the purchase.

DISCLOSURE OF THE INVENTION

The present invention was conceived from the foregoing view point, and its object is to provide a selection set evaluation device, a selection set making device, a selection set evaluating system, a selection set evaluating method, a computer-readable storage medium storing a program for carrying out the selection set evaluating method, and a product selling device, by which a selection set constituted of selection items selected by a user with a certain object is evaluated in accordance with a predefined evaluation rule so as to indicate whether a certain combination is preferable or not.

Further, the object of the present invention is to provide a selection set evaluation device, a selection set evaluation result collecting device, a selection set making device, a selection set evaluation inputting device, a selection set evaluating system, a selection set evaluating method, a computer-readable storage medium storing a program for carrying out the selection set evaluating method, a product selling device, and a communication supporting device, by which an evaluating user evaluates a selection set constituted of selection items selected by a selecting user with a certain object, so as to indicate whether a certain combination is preferable or not to the selecting user or a user using the selection set, by purchasing the selection set and in a similar manner.

Further, the object of the present invention is to provide a selection set evaluation device, a selection set evaluation result collecting device, a selection set making device, a selection set evaluation inputting device, a selection set evaluating system, a selection set evaluating method, a computer-readable storage medium storing a selection set evaluation program, a product selling device, and a communication supporting device, by which a selection set constituted of selection items selected by a selecting user with a certain object is evaluated, in accordance with a predefined evaluation rule, or by an evaluating user, so as to indicate a clue for judging whether a certain combination is preferable or not to the selecting user or a user using the selection set, by purchasing the selection set and in a similar manner.

Further, the object of the present invention is to provide a sale management device, a product set making device, a product set purchasing device, a sale management system, a sale management method, and a computer-readable storage medium storing a sale management program, by which it is possible to indicate various product set, constituted of a plurality of products or a plurality of selective items, that has been made by an unspecified user, to a purchaser, and the purchaser can easily purchase a product set which satisfies an object of the purchase.

In order to achieve the foregoing object, the selection set evaluation device according to the present invention includes: evaluation rule storing means (evaluation criterion storage means) for storing an evaluation rule to evaluate a selection set constituted of one selection item or a plurality of selection items selected by a user; and selection set evaluating means for evaluating the selection set, in accordance with the evaluation rule stored in the evaluation rule storing means, so as to output an evaluation result, when the selection set is inputted.

With the foregoing configuration, the selection set evaluating means evaluates the selection set in accordance with the evaluation rule stored in the evaluation rule storing means, so that it is possible to evaluate a combination of the selection items selected by the user in accordance with a specific standard. Further, the user can obtain a specific standard to make the selection set, so that it is possible to make the selection set in which the selection items are combined with each other so that the combination is highly evaluated in accordance with the evaluation.

Further, in order to achieve the foregoing object, the selection set evaluation device according to the present invention includes: selection item storing means (selection item storage means) for storing information concerning the selection item; selection item indicating means (selection item presenting means) for indicating the selection item to the user; selection item selecting means (selection item selection means) by which the user selects the selection item, that has been selected, so as to make the selection set; evaluation rule storing means for storing an evaluation rule to evaluate the selection set that has been made by the user; and selection set evaluating means for evaluating the selection set, in accordance with the evaluation rule stored in the evaluation rule storing means, so as to output an evaluation result.

With the foregoing configuration, the user selects a desired selection item from the selection items, that have been read by the selection item indicating means from the selection item storing means so as to indicate the selection items, by using the selection item selecting means, so as to make a selection set. The selection set made by the user is evaluated by the selection set evaluating means in accordance with the evaluation rule stored in the evaluation rule storing means, so that it is possible to evaluate a combination of the selection items selected by the user in accordance with a specific standard. Further, the user can obtain a specific standard to make the selection set, so that it is possible to make the selection set in which the selection items are combined with each other so that the combination is highly evaluated in accordance with the evaluation.

In addition, the selection set evaluation device may further includes selection condition parameter setting means (selection state parameter setting means) for setting a selection condition parameter to adjust a degree at which each selection item included in the selection set contributes to evaluation, wherein the selection set evaluating means adjusts the evaluation result according to the selection condition parameter that has been set.

With the foregoing configuration, it is possible to set a parameter such as importance with respect to each selection item by means of the selection condition parameter setting means, and the selection set evaluating means adjusts the evaluation result made by the selection set evaluating means according to the selection condition parameter stored in the selection condition parameter storing means (selection state parameter storage means) when the selection set is evaluated in accordance with the evaluation rule. Thus, when the selection condition parameter of a selection item required to largely contribute to the evaluation is set to high, it is possible to bring about such an evaluation that an evaluation result based on the evaluation rule targeting the selection item is emphasized.

In addition, the selection set evaluation device may further includes evaluation rule setting means (evaluation criterion setting means) for setting the evaluation rule, wherein the evaluation rule setting means updates the evaluation rule stored in the evaluation rule storing means.

With the foregoing configuration, it is possible to update the evaluation rule by means of the evaluation rule setting means, so that it is possible to add or change the evaluation rule.

In addition, the selection set evaluation device may further includes evaluation result adequacy setting means by which the user sets adequacy with respect to the evaluation result of the selection set, said evaluation result having been given by the selection set evaluating means, wherein the evaluation rule setting means uses the adequacy that has been set by the evaluation result adequacy storing means, so as to update the evaluation result stored in the evaluation rule storing means.

With the foregoing configuration, the user sets the adequacy of the evaluation result by means of the evaluation result adequacy setting means, so that the evaluation rule setting means updates the evaluation rule according to the adequacy that has been set. Thus, it is possible to make the evaluation rule converge so as to satisfy needs of the user. As a result, it is possible to improve reliability of the evaluation result brought about by the selection set evaluating means.

Besides, in the selection set evaluation device, the selection set evaluating means evaluates the selection set in real time when a content of the selection set is updated.

With the foregoing configuration, when the user updates the combination of the selection items included in the selection set by using the selection item selecting means, the selection set evaluating means evaluates the selection set in real time, so that the user can learn the change of the evaluation result immediately. Thus, this makes it easy for the user to rectify the selection set.

Further, in order to achieve the foregoing object, the selection set evaluation device according to the present invention includes: selection item transmission controlling means for controlling transmission of information concerning the selection item to a terminal operated by the user who selects the selection item so as to make the selection set; selection set reception controlling means for controlling reception of the selection set from the terminal; evaluation rule storing means for storing the evaluation rule to evaluate the selection set; and selection set evaluating means for evaluating the selection set, in accordance with the evaluation rule stored in the evaluation rule storing means, so as to output an evaluation result.

With the foregoing configuration, the selection item transmission controlling means transmits the information concerning the selection item to the terminal. The user operating the terminal selects the selection item so as to make the selection set. The selection set that has been selected is received from the terminal by the selection set reception controlling means. The selection set evaluating means evaluates the selection set, that has been received, in accordance with the evaluation rule stored in the evaluation rule storing means.

Thus, it is possible to use a wide range of terminal devices such as a personal computer, a portable computer, a cellar phone, and the like, as the terminal, so that it is possible to evaluate selection set made by a wide range of users.

Further, in order to achieve the foregoing object, the selection set making device according to the present invention includes: selection item selecting means by which a user selects the selection item indicated by the selection set evaluation device; and selection set transmitting means for transmitting the selection set that has been made by the user to the selection set evaluation device.

With the foregoing configuration, the selection item selected by the user with the selection item selecting means is indicated by the selection set evaluation device, and the selection set made by the user is transmitted by the selection set transmitting means to the selection set evaluation device. Thus, even when the information concerning the selection item and the evaluation rule to evaluate the selection set are not stored on the side of the selection set making device, it is possible to make the selection set, and to obtain the evaluation of the selection set. As a result, with simplification of the selection set making device, it is possible to miniaturize the selection set making device and make the selection set making device lighter at a lower cost.

Further, in order to achieve the foregoing object, the selection set evaluating system according to the present invention includes the foregoing selection set evaluation device and the foregoing selection set making device.

With the foregoing configuration, it is possible to build a selection set evaluating system which covers a wide range of users.

Further, in order to achieve the foregoing object, the selection set evaluating method according to the present invention includes the steps of: inputting a selection set constituted of one selection item or a plurality of selection items selected by a user; and evaluating the selection set, in accordance with an evaluation rule to evaluate the selection set, when the selection set is inputted.

With the foregoing configuration, in the step of inputting the selection set, the selection set made by the user is inputted from a terminal having a selection set making function to a device having a selection set evaluating function via a wire or a radio communication, or the selection set is inputted directly to the device having the selection set evaluating function by using inputting means included in the device having the selection set evaluating function. Further, in the step of evaluating the selection set, the selection set is evaluated in accordance with the evaluation rule, so that it is possible to evaluate the selection set of the selection item selected by the user in accordance with a specific standard. Further, the user can obtain a specific standard to make the selection set, so that it is possible to make the selection set in which the selection items are combined with each other so that the combination is highly evaluated in accordance with the evaluation.

Further, in order to achieve the foregoing object, the selection set evaluating method according to the present invention includes the steps of: indicating information concerning the selection item to the user; and evaluating a selection set constituted of the selection item in accordance with an evaluation rule to evaluate the selection set.

With the foregoing configuration, in the step of indicating the selection item, the user selects one selection item or a plurality of selection items from the information concerning the selection item that has been indicated, so that it is possible to make the selection set. Thus, this makes it easier to make the selection set. Further, in the step of evaluating the selection set, the selection set is evaluated in accordance with the evaluation rule, so that it is possible to evaluate the combination of the selection item selected by the user in accordance with a specific standard. Further, the user can obtain a specific standard to make the selection set, so that it is possible to make the selection set in which the selection items are combined with each other so that the combination is highly evaluated in accordance with evaluations.

Further, in order to achieve the foregoing object, the computer-readable storage medium according to the present invention stores a program for carrying out the aforementioned selection set evaluating method.

With the foregoing configuration, it is possible to cause a general computer to carry out the aforementioned selection set evaluating method.

Further, in order to achieve the foregoing object, the product selling device according to the present invention, which enables a plurality of products to be sold as a combination, includes the aforementioned selection set evaluation device, or the aforementioned selection set making device, or the aforementioned selection set evaluating system.

With the foregoing configuration, the purchaser can obtain a clue for determining a combination upon combining a plurality of products so as to purchase the combination. Further, the user can purchase a combination of a plurality of products from the aforementioned selection set evaluation device, or the selection set making device, or the selection set evaluating system.

Note that, the evaluation rule storing means may include an evaluation rule to evaluate a specific order of the selection items included in the selection set.

Thus, the selection set evaluation device can evaluate the selection set taking the order of the selection items into consideration.

Further, the evaluation rule storing means may include an evaluation rule to evaluate a specific combination of the selection items included in the selection set.

Thus, the selection set evaluation device can evaluate the selection set taking the combination of the selection items into consideration.

Further, the evaluation rule storing means may include an evaluation rule by which characteristics concerning the selection items included in the selection set are referred to from the information stored in the selection item storing means so that the characteristics of the selection items are compared with each other so as to make an evaluation.

Thus, the selection set evaluation device can evaluate the selection set taking various characteristics of the selection items into consideration.

Further, the selection set evaluating means may rectify the selection condition parameter when the selection set is evaluated.

Thus, it is possible to adjust a degree at which the selection item contributes to the evaluation, so that it is possible to facilitate more appropriate evaluation.

Further, the selection set evaluation device of the present invention may include: evaluation rule indicating means for indicating the evaluation rule stored in the evaluation rule storing means to the user; and evaluation rule rectifying means by which the user rectifies the evaluation rule indicated by the evaluation rule indicating means, wherein the evaluation rule rectifying means updates the evaluation rule stored in the evaluation rule storing means.

Thus, the user can update the evaluation rule, so that it is possible to add an evaluation result favored by the user, and to indicate a new evaluation rule to another user.

Further, the selection set evaluation device of the present invention may include evaluation result informing means (evaluation result notifying means) for informing an evaluation result made by the selection set evaluating means to the user.

Thus, the user can learn the evaluation of the selection set, so that it is possible to rectify the selection set by checking the evaluation result.

Further, the evaluation result informing means may inform the user of a basis for the evaluation.

Thus, the user can learn the basis for the evaluation, so that it is possible to obtain a clue for rectifying the selection set by checking the evaluation result.

Further, the selection set evaluation device of the present invention may include selection set ranking means (selection set rating means) for ranking a plurality of selection sets in accordance with the evaluation made by the selection set evaluating means, wherein a rank of the selection set is informed to the user.

Thus, it is possible to compare a selection set made by a user with a selection set made by another user. Moreover, it is possible to use a selection set, highly evaluated, that has been made by another user.

Further, in order to achieve the foregoing object, the selection set evaluation device according to the present invention includes: selection item storing means for storing information concerning the selection item; selection item indicating means for indicating the selection item to a selecting user; selection item selecting means by which the selecting user selects the selection item, that has been indicated, so as to make the selection set; selection set indicating means for indicating the selection set, that has been made by the selecting user, to a plurality of evaluating users; and evaluation inputting means by which each of the evaluating users inputs an evaluation of the selection set that has been indicated.

With the foregoing configuration, the selecting user selects the selection item, stored in the selection item storing means, that has been indicated by the selection item indicating means, by using the selection item selecting means, so as to make the selection set. The selection set that has been made is indicated to the evaluating user by the selection set indicating means. The evaluating user inputs the evaluation of the selection set by using the evaluation inputting means, so that the evaluating user can evaluate a combination of the selection item selected by the selecting user.

As a result, the selecting user can refer to the evaluation of the selection set upon making a new selection set or rectifying the selection set that has been made.

In addition, the selection set evaluation device may include total evaluation deriving means for deriving a total evaluation from a plurality of evaluations with respect to the selection set that has been inputted by the plurality of evaluating users.

With the foregoing configuration, the plurality of evaluating users make the plurality of evaluations. Thus, even when a large quantity of evaluations are made with respect to the selection set, the total evaluation deriving means derives the total evaluation, so that the evaluating users can refer to the total evaluation without referring to respective evaluations. Further, the evaluations made by the evaluating users are subjective, but it is possible to derive an objective evaluation by deriving the total evaluation from a large quantity of evaluations.

In addition, the selection set evaluation device may include: evaluation result informing means for informing evaluation results, inputted by the evaluating users, to a user using the evaluation results; evaluation result adequacy setting means by which the user using the evaluation results sets adequacy of the evaluation results informed by the evaluation result informing means; and total evaluation deriving means for deriving the total evaluation in accordance with (a) a plurality of evaluations of the selection set that have been inputted by the plurality of evaluating users with the evaluation inputting means and (b) the adequacy of the evaluation results that have been set by the evaluation result adequacy setting means.

With the foregoing configuration, the user using the evaluation results sets the adequacy of the evaluation results, informed by the evaluation result informing means, by means of the evaluation result adequacy setting means. Thus, the total evaluation deriving means can derive the total evaluation so that an evaluation whose adequacy is regarded as high is emphasized and an evaluation whose adequacy is regarded as low is excluded, so that it is possible to derive a highly objective total evaluation.

In addition, the selection set evaluation device may be arranged so that: a basis for each evaluation is inputted together via the evaluation inputting means.

With the foregoing configuration, each of the evaluating users can input the basis for the evaluation by means of the evaluation inputting means, so that the user using the evaluation results can refer to the basis upon judging the adequacy of the evaluation results. Further, when the total evaluation deriving means derives the total evaluation in accordance with only an evaluation result inputted with a specific basis for the evaluation, such as "relevancy to theme" and "consistency of selection items", it is possible to derive the total evaluation from a specific view point. Thus, this makes it easier for the user using the evaluation results to use an evaluation result made from a desired view point.

Further, in order to achieve the foregoing object, the selection set evaluation result collecting device according to the present invention includes: selection item transmission controlling means for controlling transmission of information concerning the selection item to a first terminal operated by the user selecting the selection item so as to make the selection set; selection item transmission/reception controlling means for controlling (a) reception of the selection set from the first terminal and (b) transmission of the selection set to a second terminal operated by the evaluating user; and selection set evaluation reception controlling means for controlling reception of an evaluation of the selection set from the second terminal.

With the foregoing configuration, the selection item transmission controlling means transmits the information concerning the selection item to the first terminal. The user making the selection set, who is a user of the first terminal, selects the selection item so as to make the selection set. The selection set that has been made is received from the first terminal by the selection set transmission/reception controlling means. Further, the selection set transmission/reception controlling means transmits the selection set, that has been received from the first terminal, to the second terminal. The evaluating user, who is a user of the second terminal, evaluates the selection set. The evaluation result thereof is received from the second terminal by the selection set evaluation reception controlling means.

Thus, it is possible to use a wide range of terminal devices as the first or second terminal, so that it is possible to collect selection sets and evaluation results that have been made by a wide range of users.

Further, in order to achieve the foregoing object, the selection set making device according to the present invention is connected to the aforementioned selection set evaluation result collecting device, and is used to make a selection set constituted of one selection item or a plurality of selection items, and includes: selection item selecting means by which a user making the selection set selects the selection item, that has been indicated by the selection set evaluation result collecting device, so as to make the selection set; and selection set transmitting means for transmitting the selection set, that has been made by the user, to the selection set evaluation result collecting device.

With the foregoing configuration, the information concerning the selection item is indicated by the selection set evaluation result collecting device, so that the selection set making device itself is not required to store the information concerning the selection item. An amount of the information concerning the selection item is generally large, so that it is possible to save a memory capacity of the selection set making device.

Further, the selection set constituted of the selection item that has been selected by the user making selection with the selection item selecting means is transmitted by the selection set transmitting means to the selection set evaluation result collecting device. Thus, the selection set evaluation result collecting device transmits the selection set, that has been transmitted from the selection set making device, to the user making the evaluation, so that it is possible to collect evaluations of the selection set.

Further, in order to achieve the foregoing object, the selection set evaluation inputting device according to the present invention is connected to the aforementioned selection set evaluation result collecting device, and is used to input an evaluation with respect to a selection set constituted of one selection item or a plurality of selection items, and includes: evaluation inputting means by which an evaluating user inputs the evaluation of the selection set indicated by the selection set evaluation result collecting device; and evaluation transmitting means for transmitting the evaluation inputted by the evaluation inputting means to the selection set evaluation result collecting device.

With the foregoing configuration, the evaluating user inputs the evaluation of the selection set that has been indicated from the selection set evaluation result collecting device, by means of the evaluation inputting means, and transmits the evaluation to the selection set evaluation result collecting device by means of the evaluation transmitting means, so that it is possible to input the evaluation of the selection set made by another user. Thus, the selection set evaluation result collecting device can collect evaluations of the selection set made by the user making selection.

Further, in order to achieve the foregoing object, the selection set evaluating system according to the present invention includes: the aforementioned selection set evaluation result collecting device; the aforementioned selection set making device; and the aforementioned selection set evaluation inputting device.

With the foregoing configuration, it is possible to build a selection set evaluating system which covers a wide range of users.

Further, in order to achieve the foregoing object, the selection set evaluating method according to the present invention includes the steps of: indicating information concerning the selection item to a selecting user; indicating the selection set made by the selecting user to an evaluating user; and allowing the evaluating user to input an evaluation of the selection set that has been indicated.

With the foregoing configuration, the selecting user selects one selection item or a plurality of selection items that have been indicated in the step of indicating the selection item, so as to make the selection set. The selection set that has been made is indicated to the evaluating user in the step of indicating the selection item. The evaluating user inputs the evaluation of the selection set in the step of inputting the evaluation, so that the evaluating user can evaluate the selection set that has been made by the selecting user.

As a result, the selecting user can refer to the evaluation of the selection set upon making a new selection set and rectifying the selection set that has been made.

Further, in order to achieve the foregoing object, the computer-readable storage medium according to the present invention stores a program for carrying out the aforementioned selection set evaluating method.

With the foregoing configuration, it is possible to cause a general computer to carry out the selection set evaluating method.

Further, in order to achieve the foregoing object, the product selling device according to the present invention, which enables a plurality of products to be sold as a combination, includes the aforementioned selection set evaluation device, or the aforementioned selection set evaluation result collecting device, or the aforementioned selection set making device, or the aforementioned selection set evaluation inputting device, or the aforementioned selection set evaluating system.

With the foregoing configuration, the purchaser can refer to the evaluation result derived with respect to a combination of a plurality of products, and can obtain a clue for determining the combination, upon combining the plurality of products so as to purchase the combination. For example, when this is applied to a product selling device by which songs are combined as a music album so as to be purchased, the purchaser can learn whether the combination is preferable or not, and can make a new combination by referring to a combination, made by another purchaser, that is highly evaluated, so as to purchase the combination.

Further, in order to achieve the foregoing object, the communication supporting device according to the present invention includes the aforementioned selection set evaluation device, or the aforementioned selection set evaluation result collecting device, or the aforementioned selection set making device, or the aforementioned selection set inputting device, or the aforementioned selection set evaluating system.

With the foregoing configuration, it is possible to support exchange of messages and the like between a plurality of users talking about the evaluation of the selection set. For example, when this is applied to a device for supporting communications concerning music, a plurality of users can discus which part is preferable and which part is not preferable with respect to an arrangement of a music album made by combining songs.

Note that, the selection set evaluation device according to the present invention may include evaluation result informing means for informing the evaluation result, that has been inputted by the evaluating user with the evaluation inputting means, to the user using the evaluation result.

Thus, the user using the evaluation result can learn the evaluation of the selection set selected by the selecting user. Further, also the user who has selected the selection set can learn the evaluation of the selection set, so that he/she can rectify the selection set by checking the evaluation result.

Further, the selection set evaluation device according to the present invention may include total evaluation result informing means for informing the total evaluation result, that has been derived by the total evaluation deriving means, to the user using the evaluation result.

Thus, when a plurality of evaluating users make a plurality of evaluations with respect to the selection set selected by the selecting user, the user using the evaluation result can use the total evaluation result without referring to respective evaluations.

Further, the selection set evaluation device according to the present invention may be arranged so that: one selection item or a plurality of selection items to be evaluated, that are selected from the selection items included in the selection set, are specified via the evaluation inputting means by the evaluating user, so as to be inputted.

Thus, the evaluating user can specify the selection item to be evaluated, that is selected from the selection items included in the selection set, so that it is possible to evaluate a part of the selection set. Thus, it is possible to clearly indicate which part is evaluated, or it is possible to indicate a basis for the evaluation in detail.

Further, the selection set evaluation device according to the present invention may be arranged so that: the evaluation result informing means informs a basis for the evaluation together to the user using the evaluation result.

Thus, the user using the evaluation result can learn the basis for the evaluation of the selection set, so that it is possible to judge whether the evaluation is appropriate or not. Further, also the user who selects the selection set can learn the basis for the evaluation of the selection set, so that it is possible to obtain a clue for rectifying the selection set by checking the evaluation result.

Further, the selection set evaluation device according to the present invention may include selection set ranking means for ranking a plurality of selection sets in accordance with evaluations received from the evaluation inputting means or the total evaluation deriving means, wherein a ranking of the selection set is indicated to the user using the evaluation result.

Thus, the user using the evaluation result can compare the plurality of selection sets, that have been evaluated, with each other, this makes it easier to use a selection set which is highly evaluated.

Further, in order to achieve the foregoing object, the selection set evaluation device according to the present invention includes: evaluation rule storing means for storing an evaluation rule to evaluate the selection set made by a user making the selection set; selection set evaluating means for evaluating the selection set, in accordance with the evaluation rule stored in the evaluation rule storing means, so as to output an evaluating result, when the selection set is inputted; selection set indicating means for indicating the selection set, that has been inputted, to an evaluating user; evaluation inputting means by which the evaluating user inputs an evaluation of the selection set that has been indicated; and total evaluation deriving means for deriving a total evaluation result in accordance with (a) an evaluation result made by the selection set evaluating means and (b) the evaluation inputted by the evaluating user with the evaluation inputting means, so as to output a total evaluation result.

With the foregoing configuration, the selection set that has been made by the user making the selection set is evaluated by the selection set evaluating means in accordance with the evaluation rule stored in the evaluation rule storing means. Further, the selection set is indicated by the selection set indicating means to the evaluating user, and the evaluation made by the evaluating user is inputted by the selection set evaluating means. Moreover, the total evaluation deriving means derives the total evaluation result in accordance with (a) the evaluation result made by the selection set evaluating means and (b) the evaluation result inputted by the evaluation inputting means, so as to output the total evaluation result.

Thus, the total evaluation result is derived totally in accordance with (a) the evaluation result based on the evaluation rule which is a specific objective standard and (b) the evaluation made from a view point different from the evaluation rule, so that it is possible to obtain a more appropriate evaluation result. Thus, the selecting user can refer to the evaluation result of the selection set upon making a new selection set and rectifying the selection set that has been made.

In addition, the selection set evaluation device may include: selection item storing means for storing information concerning the selection item; selection item indicating means for indicating the selection item to the user making the selection set; and selection item selecting means by which the user making the selection set selects the selection item that has been indicated.

With the foregoing configuration, the selection item indicating means indicates the information concerning the selection item stored in the selection item storing means to the user making the selection set, and the user making the selection set selects the selection item, that has been indicated, by using the selection item selecting means so as to make the selection set, and makes a combination, so that the user making the selection set can make the selection set. The evaluation result of the selection set is derived as described above, so that the selecting user can make a new selection set and rectify the selection set by referring to the evaluation result of the selection set.

In addition, the selection set evaluation device may include evaluation rule setting means for adding or deleting or rectifying the evaluation rule, wherein the evaluation rule setting means updates the evaluation rule stored in the evaluation rule storing means.

With the foregoing configuration, it is possible to update the evaluation rule by means of the evaluation rule setting means, so that it is possible to add or delete or change the evaluation rule. Thus, it is possible to store a more appropriate evaluation rule in the evaluation rule storing means.

In addition, the selection set evaluation device may include evaluation rule extracting means for extracting the evaluation rule from the evaluation inputted by the evaluating user with the evaluation inputting means, wherein the evaluation rule setting means updates the evaluation rule stored in the evaluation rule storing means by using the evaluation rule that has been extracted by the evaluation rule extracting means.

With the foregoing configuration, the evaluation rule extracting means extracts the evaluation rule from the evaluation inputted by the evaluating user with the evaluation inputting means, and the evaluation rule that has been extracted is added and stored in the evaluation rule storing means by the evaluation rule setting means. By using the evaluation rule that has been newly extracted in this manner, the selection set evaluating means can evaluate a new selection set. Thus, even when the selection set is not evaluated by the evaluating user, or even when the selection set is evaluated by few evaluating users, the selection set evaluating means can make the evaluation more exactly.

Further, the evaluation rule stored in the evaluation rule storing means is added. Thus, when the selection set evaluation device continues to be operated and more evaluations are made by the evaluating user, the selection set evaluating means can make a more appropriate evaluation.

In addition, the selection set evaluation device may include evaluation result adequacy setting means by which a user referring to the evaluation result sets adequacy of (a) the evaluation result made by the selection set evaluating means or (b) the evaluation inputted by the evaluating user with the evaluation inputting means, wherein the evaluation rule extracting means extracts the evaluation rule corresponding to the adequacy of the evaluation that has been set by the evaluation result adequacy setting means.

With the foregoing configuration, a user referring to the evaluation result sets the adequacy of the evaluation result by means of the evaluation result adequacy setting means, and the evaluation rule extracting means extracts the evaluation rule according to the adequacy. Thus, it is possible to extract the evaluation rule taking the adequacy of the evaluation result into consideration, for example, a point corresponding to an evaluation rule extracted from an evaluation result whose adequacy is set to high is regarded as high, or an evaluation rule is not extracted from an evaluation result whose adequacy is low, so that it is possible to extract a more appropriate evaluation rule.

Further, in order to achieve the foregoing object, includes: selection set transmission/reception controlling means for (a) receiving the selection set, that has been made by a first terminal operated by the user making the selection set, from the first terminal, and (b) transmitting the selection set to a second terminal operated by an evaluating user; evaluation rule storing means for storing an evaluation rule to evaluate the selection set; selection set evaluating means for evaluating the selection set, that has been received from the first terminal, in accordance with the evaluation rule stored in the evaluation rule storing means, so as to output an evaluation result; selection set evaluation reception controlling means for controlling reception of an evaluation of the selection set from the second terminal; and total evaluation deriving means for deriving a total evaluation result in accordance with (a) the evaluation result made by the selection set evaluating means and (b) the evaluation received by the selection set evaluation reception controlling means.

With the foregoing configuration, the selection set made by the user, making the selection set, who is a user of the first terminal, is received from the first terminal by the selection set transmission/reception controlling means. The selection set that has been received is evaluated by the selection set evaluating means in accordance with the evaluation rule stored in the evaluation rule storing means. Further, the selection set is transmitted to the second terminal by the selection set transmission/reception controlling means. The evaluation of the selection set that has been made by the evaluating user, who is a user of the second terminal, is received from the second terminal by the selection set evaluation receiving means. Further, the total evaluation deriving means derives the total evaluation result in accordance with (a) the evaluation result made by the selection set evaluating means and (b) the evaluation result that has been received by the selection set evaluation receiving means, so as to output the total evaluation result.

Thus, it is possible to use a wide range of terminal devices as the first or second terminal, so that a wide range of users can make selection sets and evaluation results can be collected.

Further, in order to achieve the foregoing object, the selection set evaluation inputting device according to the present invention is connected to the aforementioned selection set evaluation result collecting device, and is used to input an evaluation of a selection set constituted of one selection item or a plurality of selection items, and includes: selection item storing means for temporarily or continuously storing information concerning the selection item; selection item indicating means for indicating the selection item to a user making the selection set; selection item selecting means by which the user selects the selection item, that has been indicated, so as to make the selection set; and selection set transmitting means for transmitting the selection set, that has been made, to the selection set evaluation result collecting device.

With the foregoing configuration, the selecting user selects the selection item, temporarily or continuously stored in the selection item storing means, by means of the selection item selecting means, so as to make the selection set, and the selection set that has been made is transmitted to the selection set evaluation result collecting device by means of the selection set transmitting means. Thus, the selection set evaluation result collecting device outputs the evaluation result, based on the evaluation rule, with respect to the selection set that has been transmitted from the selection set making device, and transmits the evaluation result to the evaluating user, so that it is possible to collect evaluations of the selection set.

Thus, even when the selection set making device does not store the evaluation rule to evaluate the selection set, it is possible to obtain the evaluation of the selection set, that has been made, by means of the selection set evaluation result collecting device. Further, a large number of evaluating users can access the selection set evaluation result collecting device, so that it is possible to obtain various and a large quantity of evaluations with respect to the selection set that has been made.

Further, in order to achieve the foregoing object, the selection set evaluation inputting device according to the present invention is connected to the aforementioned selection set evaluation result collecting device, and is used to input an evaluation of a selection set constituted of one selection item or a plurality of selection items, and includes: evaluation inputting means by which an evaluating user inputs the evaluation of the selection set that has been indicated by the selection set evaluation result collecting device; and evaluation transmitting means for transmitting the evaluation, that has been inputted by the evaluation inputting means, to the selection set evaluation result collecting device.

With the foregoing configuration, the evaluating user inputs the evaluation of the selection set, that has been indicated by the selection set evaluation result collecting device, by means of the evaluation inputting means, and transmits the evaluation to the selection set evaluation collecting device by means of the evaluation transmitting means, so that it is possible to input the evaluation of the selection set that has been made by another user.

Further, in order to achieve the foregoing object, the selection set evaluating system according to the present invention includes: the aforementioned selection set evaluation result collecting device; the aforementioned selection set making device; and the aforementioned selection set evaluation inputting device.

With the foregoing configuration, it is possible to build a selection set evaluating system which covers a wide range of users.

Further, in order to achieve the foregoing object, the selection set evaluating method according to the present invention includes the steps of: (i) evaluating the selection set, in accordance with an evaluation rule to evaluate the selection set that has been made by a user making the selection set, so as to output an evaluation result; (ii) indicating the selection set to an evaluating user; (iii) accepting the evaluating user to input an evaluation of the selection set that has been indicated; and (iv) deriving a total evaluation result in accordance with (a) the evaluation result obtained in the step (i) and (b) the evaluation inputted in the step (iii), so as to output the total evaluation result, wherein a program causes a computer to carry out the steps.

With the foregoing configuration, the selection set that has been made by the user making the selection set is evaluated in the step (i) in accordance with the evaluation rule. Further, the selection set is indicated to the evaluating user in the step (ii), and the evaluation made by the evaluating user is inputted in the step (iii). Further, the total evaluation deriving means derives a total evaluation result in accordance with (a) the evaluation result obtained in the step (i) and (b) the evaluation inputted in the step (iii), so as to output the total evaluation result.

Thus, the total evaluation result is derived in accordance with (a) the evaluation result based on the evaluation rule which is a specific objective standard and (b) the evaluation made from a view point different from the evaluation rule, so that it is possible to obtain a more appropriate evaluation result. Thus, the selecting user can refer to the evaluation result of the selection set upon making a new selection set and rectifying the selection set that has been made.

Further, the computer-readable storage medium according to the present invention stores a selection set evaluation program which causes a computer to carry out the means included in the aforementioned selection set evaluation device, or the means included in the aforementioned selection set evaluation result collecting device, or the means included in the aforementioned selection set making device, or the means included in the aforementioned selection set evaluation inputting device.

With the foregoing configuration, a general computer can be used as the selection set evaluation device, or the selection set evaluation result collecting device, or the selection set making device, or the selection set evaluation inputting device, and it is possible to build the selection set evaluating system by means of a computer which operates in accordance with such program.

Further, in order to achieve the foregoing object, the product selling device, which enables a plurality of products to be sold in combination, includes the aforementioned selection set evaluation device, or the aforementioned selection set evaluation result collecting device, or the aforementioned selection set making device, or the aforementioned selection set inputting device, or the aforementioned selection set evaluating system.

With the foregoing configuration, the purchaser can refer to the evaluation result derived with respect to a combination of a plurality of products, and can obtain a clue for determining the combination, upon combining the plurality of products so as to purchase the combination. For example, when this is applied to a product selling device by which songs are combined as a music album so as to be purchased, the purchaser can learn whether the combination is preferable or not, and can make a new combination by referring to a selection set, made by another purchaser, that is highly evaluated, so as to purchase the selection set.

Further, in order to achieve the foregoing object, the communication supporting device according to the present invention, which enables messages and the like to be exchanged between a plurality of users, includes the aforementioned selection set evaluation device, or the aforementioned selection set evaluation result collecting device, or the aforementioned selection set making device, or the aforementioned selection set inputting device, or the aforementioned selection set evaluating system.

With the foregoing configuration, it is possible to support exchange of messages and the like between a plurality of users taking about the evaluation of the selection set. For example, when this is applied to a device for supporting communications concerning music, a plurality of users can discus which part is preferable and which part is not preferable with respect to an arrangement of a music album made by combining songs.

Note that, the selection set evaluation device according to the present invention may be arranged so that: one selection item or a plurality of selection items to be evaluated, that are selected from the selection items included in the selection set, are specified via the evaluation inputting means by the evaluating user, so as to be inputted.

Thus, the evaluating user can specify the selection item to be evaluated, that is selected from the selection items included in the selection set, so that it is possible to evaluate a part of the selection set. Thus, it is possible to clearly indicate which part is evaluated, or it is possible to indicate a basis for the evaluation in detail.

Further, the selection set evaluation device may be arranged so that: a basis for the evaluation is inputted together via the evaluation inputting means.

Thus, the evaluating user can input the basis for the evaluation by means of the evaluation inputting means, so that the user using the evaluation result can refer to the basis upon judging the adequacy of the evaluation result. Further, when the total evaluation deriving means derives the total evaluation in accordance with only an evaluation result inputted with a specific basis for the evaluation, such as "relevancy to theme" and "consistency of selection items", it is possible to derive the total evaluation from a specific view point. Thus, this makes it easier for the user using the evaluation result to use an evaluation result given from a desired view point.

Further, the selection set evaluation device according to the present invention may include total evaluation result informing means for informing the total evaluation result, that has been derived by the total evaluation deriving means, to the user using the evaluation result.

Thus, the user using the evaluation result can learn the total evaluation result of the selection set selected by the selecting user. Further, also the user who has selected the selection set can learn the total evaluation of the selection set, so that he/she can rectify the selection set by checking the evaluation result.

Further, the selection set evaluation device according to the present invention may be arranged so that: the total evaluation result informing means informs the basis for the evaluation together to the user using the evaluation result.

Thus, the user using the evaluation result can learn the basis for the evaluation of the selection set, so that it is possible to judge whether the evaluation is appropriate or not. Further, also the user who has selected the selection set can learn the basis for the evaluation of the selection set, so that it is possible to obtain a clue for rectifying the selection set by checking the evaluation result.

Further, the selection set evaluation device according to the present invention may include selection set ranking means for ranking a plurality of selection sets in accordance with the evaluation result received from the evaluation inputting means or the total evaluation deriving means, wherein a ranking of the selection set is indicated to the user using the evaluation result.

Thus, the user using the evaluation result can compare the plurality of selection sets, that have been evaluated, with each other, so that this makes it easier to use a selection set which is highly evaluated.

Further, in order to achieve the foregoing object, the sale management device according to the present invention manages via a network a sale of a product set which is a combination of a plurality of products or a plurality of selective items, and includes: product information indicating means for indicating information concerning the products to a product set maker who is an unspecified user; product set storing means for storing the product set, that has been made by the product set maker, in accordance with the information concerning the products; and product set indicating means for indicating to a purchaser (a) the product set stored in the product set storing means and (b) the information concerning the products.

With the foregoing configuration, the product set maker who is the unspecified user stores the product set, that has been made in accordance with the information concerning the product indicated by the product information indicating means, in the product set storing means. The product set stored in the product set storing means is indicated to the purchaser by the product set indicating means, so that the purchaser do not have to take any trouble in determining which combination of products or which combination of selection items is to be purchased. Further, the seller do not have to take any trouble in making the product set.

Moreover, it is possible to indicate a product set including a product, which has never been sold, or a selection item, which has not been selected, to the purchaser. The product set maker can freely make a special product set based on a specific theme, so that it is possible to indicate a product set, which cannot be made by a conventional method, to the purchaser.

Note that, an example of the aforementioned selection item is data (music, image, moving image, character information etc.) having a selling value as a product. Further, examples of how the information is indicated to the product set maker or the purchaser include various forms such as print output, image display, transmission output to a communication device, and the like.

Further, in order to achieve the foregoing object, the sale management device according to the present invention manages a sale of a product set which is a combination of a plurality of products or a plurality of selective items by transmitting/receiving information to/from a device having a communication function and via a network, and include: product information indicating means for transmitting information concerning the products to a first device in response to a request from the first device; product set storing means for receiving the product set, that has been made by an unspecified product set maker in accordance with the information concerning the products, from the first device, so as to store the product set; and product set indicating means for transmitting (a) the product set stored in the product set storing means and (b) the information concerning the products to the second device from which a request for transmission, which may be identical with the first device.

With the foregoing configuration, the product information indicating means transmits the information concerning the product to the first device in response to the request from the first device. The product set maker who is a user of the first device makes the product set by means of the first device in accordance with the information concerning the product indicated by the product information indicating means.

The product set that has been made is transmitted from the first device to the sale management device according to the present invention, and is received by the product set storing means, so as to be stored. The product set that has been stored in the product set storing means is indicated to the purchaser, who is a user of the second device, by means of the product set indicating means, so that the purchaser do not have to take any trouble in determining which combination of products or which combination of selection items is to be purchased. Further, the seller do not have to take any trouble in making the product set.

Moreover, it is possible to indicate a product set including a product, which has never been sold, or a selection item, which has not been selected, to the purchaser. The product set maker can freely make a special product set based on a specific theme, so that it is possible to indicate a product set, which cannot be made by a conventional method, to the purchaser. The product set maker can freely make a special product set based on a specific theme, so that it is possible to indicate a product set, which cannot be made by a conventional method, to the purchaser.

Note that, the second device includes the first device, so that the product set maker may be the purchaser.

Further, examples of the device include not only a portable or desk-top type terminal computer, but also a computer and a work station constituting a client/server system, or a cellar phone and the like.

In addition, the sale management device may include additional information obtaining means for receiving additional information from the first device, wherein the product set storing means stores the product set and the additional information together, and the product set indicating means transmits the additional information together to the second device.

With the foregoing configuration, the product set storing means receives the additional information, such as a name of the product set, theme of the product set, an image and sound expressing an impression of the product set, and a comment by which a basis for selecting products or selection items included in the product set is explained, from the first device, so as to transmit the product set and the additional information in combination.

The product set indicating means transmits the additional information together to the second device, so that the purchaser, who is a user of the second device, can obtain a clue for selecting the product set. Further, when information concerning the maker is added as the additional information, the purchaser can refer to the information concerning the maker upon selecting the product set, so that it is possible to obtain a clue for selecting the product set by selecting the product set that has been made by a maker having similar preference.

In addition, the sale management device may include: user information obtaining means for receiving (a) information concerning the product set maker from the first device and (b) information concerning a purchaser of the product set from the second device; user information comparing means for comparing (a) the information concerning the product set maker and (b) the information concerning the purchaser, so as to derive compatibility therebetween, wherein the product set indicating means transmits the product set such that the compatibility between (a) the information concerning the product set maker and (b) the information concerning the purchaser is high, in preference, to the second device.

With the foregoing configuration, the user information comparing means compares the information concerning the product set maker that has been received from the first device and the information concerning the purchaser of the product set that has been received from the second device by means of the user information obtaining means so as to derive the adequacy. The product set indicating means transmits preferentially a product set, in which the adequacy derived by the user information comparing means is high, to the second device.

Thus, it is possible to indicate preferentially a product set made by a product set maker having preference similar to that of the purchaser, so that this makes it easier to indicate a product set that satisfies the preference of the purchaser.

In addition, the sale management device according to the present invention may include product set maker selecting means for selecting the product set maker from the additional information stored in the product set storing means so as to give a benefit to the product set maker who has made the product set when an instruction to purchase the product set is received from the second device, wherein the additional information includes information for identifying the product set maker.

With the foregoing configuration, receiving the instruction to purchase the product set from the second device, the product set maker selecting means refers to the additional information of the product set, and specifies the product set maker, so as to select the product set maker. The product set maker that has been selected in this manner can obtain benefit when the product set that has been made is sold, so that it is possible to motivate the product set maker to make the product set.

Further, the sale management device may include ranking means for sorting (a) the product set stored in the product set storing means or (b) the product set maker, in accordance with a specific rule, wherein the additional information includes information for identifying the product set maker, and the product set indicating means transmits a result of sorting performed by the ranking means to the second device.

With the foregoing configuration, the product set indicating means transmits the result of sorting performed by the ranking means to the second device. Thus, by referring to the ranking of the product set, the purchaser who is a user of the second device can learn which product set is well sold based on a specific standard, and by referring to the ranking of the product set maker, the purchaser purchases a product set made by a product set maker making a popular product set. In this manner, it is possible to give the purchaser a clue for selecting the product set.

Further, in order to achieve the foregoing object, the product set making device according to the present invention is connected to the aforementioned sale management device, and makes a product set which is a combination of a plurality of products or a plurality of selective items, and includes: product information storing means for temporarily or continuously storing information concerning the products; product set making means by which a product set maker selects the information concerning the products, that has been stored in the product information storing means, so as to make the product set; and product set transmitting means for transmitting the product set, that has been made by the product set maker, to the sale management device.

With the foregoing configuration, the product information storing means indicates to the product set maker (a) the information concerning the product continuously stored in the product information storing means and (b) the information concerning the product temporarily stored in the product information storing means after having been received from the sale management device for example. The product set maker selects the information concerning the indicated product by means of the product set making means, so as to make the product set. The product set that has been made is transmitted to the sale management device by the product set transmitting means, so as to be stored. Thus, it is possible to collect product sets made by a large number of product set makers by means of the sale management device.

Further, in order to achieve the foregoing object, the product set purchasing device according to the present invention is connected to the aforementioned sale management device, and is used to purchase a product set which is a combination of a plurality of products or a plurality of selective items, and includes: product set receiving means for receiving the product set from the sale management device; product set purchasing means to which a purchaser of the product set inputs the information to purchase the product set by selecting the product set that has been received by the product set receiving means; and purchase information transmitting means for transmitting information to purchase the product set inputted by the product set purchasing means to the sale management device.

With the foregoing configuration, the product set that has been indicated by the sale management device is received by the product set receiving means. The purchaser inputs information to select and purchase the product set, received by the product set receiving means, by means of the product set purchasing means, and the information to purchase is transmitted to the sale management device by the purchase information transmitting means. Thus, the product set purchasing device is not required to store the information concerning the product set, and it is possible to sell the product set to a large number of product set purchasers.

Further, in order to achieve the foregoing object, the sale management system according to the present invention includes: the aforementioned sale management device; the aforementioned product set making device; and the aforementioned product set purchasing device.

With the foregoing configuration, it is possible to build a sale management system which covers a wide range of users.

Further, in order to achieve the foregoing object, the sale management method according to the present invention manages a sale of a product set which is a combination of a plurality of products or a plurality of selective items by transmitting/receiving information via a device having a communication function and a network, and includes the steps of: transmitting information concerning the products to a first device in response to a request from the first device; receiving the product set from the first device that has been made by an unspecified product set maker in accordance with the information concerning the products, so as to store the product set; and transmitting (a) the product set that has been stored and (b) the information concerning the products to a second device from which a request for transmission has been received, and the product set is transmitted to also the first device in case the request for transmission is received from the first device, wherein the steps are carried out by a computer.

With the foregoing configuration, in the step of indicating the product information, the information concerning the product is transmitted to the first device in response to the request from the first device. The product set maker, who is an unspecified user of the first device, makes the product set by means of the first device in accordance with the information concerning the product transmitted in the step of indicating the product information.

The product set that has been made is transmitted from the first device, and is received in the step of storing the product set so as to be stored. The product set stored in the step of storing the product set is indicated to the purchaser who is a user of the second device in the step of indicating the product set, so that the purchaser do not have to take any trouble in determining which combination of products or which combination of selection items is to be purchased.

Further, the seller do not have to take any trouble in making the product set. Moreover, it is possible to indicate a product set including a product, which has never been sold, or a selection item, which has not been selected, to the purchaser. The product set maker can freely make a special product set based on a specific theme, so that it is possible to indicate a product set, which cannot be made by a conventional method, to the purchaser.

Further, in order to achieve the foregoing object, the computer-readable storage medium according to the present invention stores a sale management program for causing a computer to carry out the means included in the aforementioned sale management device, or the means included in the aforementioned product set making device, or the means included in the aforementioned product set purchasing device.

With the foregoing configuration, a general computer can be used as the sale management device, or the product set making device, or the product set purchasing device, or the sale management system, and it is possible to build the sale management system by means of a computer which operates in accordance with such program.

Note that, the sale management device according to the present invention may include user information storing means for storing (a) information, concerning the product set maker, or (b) information, concerning a user, which is information concerning the purchaser, wherein the information concerning the user is specified with an identifier, such as a user ID and a number, which is uniquely allocated to indicate information stored in the user information storing means.

Thus, once the information concerning the user is inputted, the user has only to input the identifier without inputting the information every time needed, so that the user does not have to take any trouble in inputting the information.

Further, the sale management device according to the present invention may be arranged so that: the ranking means sorts the product set in accordance with the number of times the product set has been purchased.

Thus, the purchaser can learn which product set is well sold, so that the purchaser can obtain a clue for selecting the product set.

Further, the sale management device according to the present invention may be arranged so that: the ranking means sorts the product set maker in accordance with a value obtained by totaling the number of times the product set made by the product set maker has been purchased.

Thus, the purchaser can learn the product set maker who makes a good-selling product set, so that he/she can obtain a clue for selecting the product set.

BRIEF DESCRIPTION OF THE DRAWINGS

FIG. 4 shows an example of an evaluation rule.

FIG. 15 shows an example of a selection item.

FIG. 16 shows an example of a selection set.

FIG. 17 shows an example of an evaluation result.

FIG. 28 shows an example of a selection item.

FIG. 29 shows an example of a selection set.

FIG. 30 shows an example of an evaluation rule.

FIG. 31 shows an example of the evaluation result concerning the selection set.

FIG. 32 shows an example of the partial evaluation result concerning the selection set.

FIG. 34 illustrates a concrete example of an evaluation result informing image by which a total evaluation result concerning the selection set is made as a ranking and the ranking of the selection set is informed to the ordinary user.

FIG. 44 shows an example of a product set.

FIG. 47 shows a concrete example according to one embodiment of the present invention, and illustrates an example of an image by which a purchaser confirms a content of the product set so as to purchase the product set.

FIG. 49 is a block diagram showing the sale management system according to one embodiment of the present invention.

FIG. 50 shows an example of information concerning the product.

FIG. 51 shows an example of information concerning a user.

FIG. 54 shows a concrete example according to one embodiment of the present invention, and illustrates an example of an image by which user information is inputted.

FIG. 57 shows an example where a ranking of sold music CDs is displayed in a conventional manner.

BEST MODE FOR CARRYING OUT THE INVENTION

The following description will discuss one embodiment of the present invention referring to FIG. 1 to FIG. 12.

Figure 1:
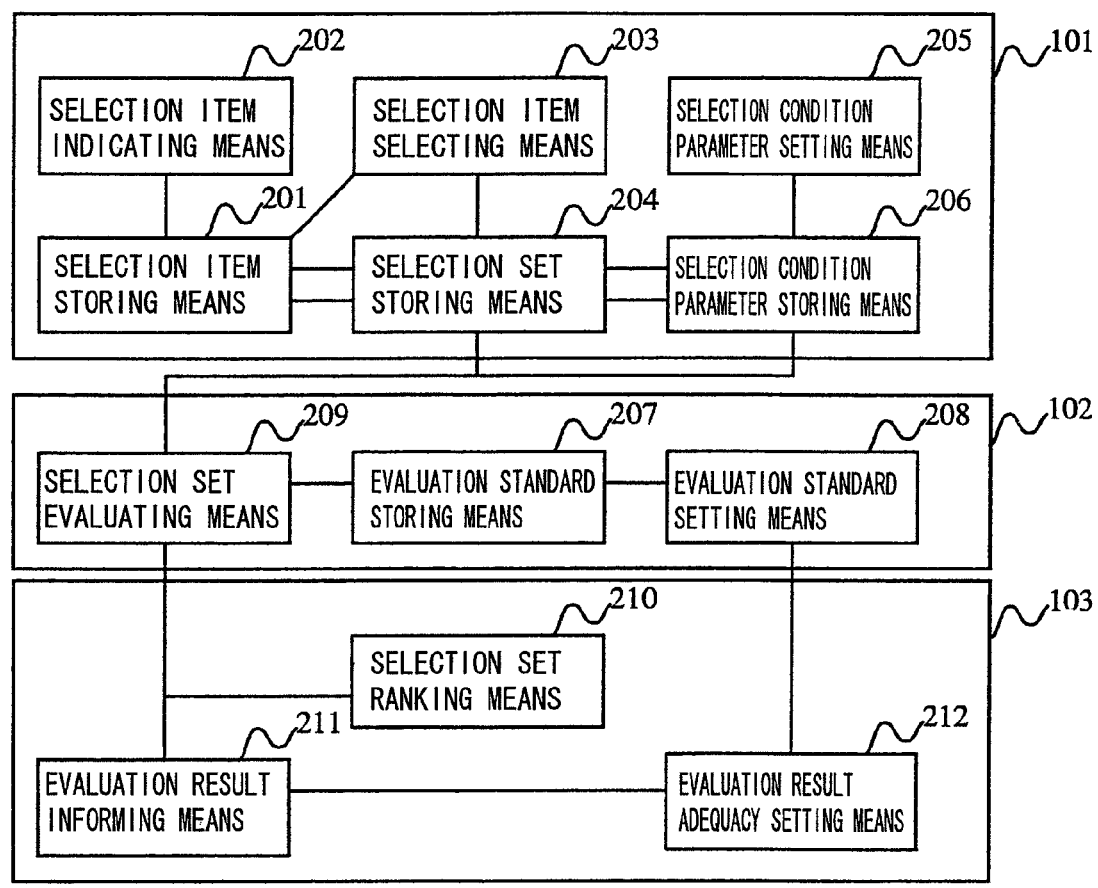
FIG. 1 is a block diagram showing a rough arrangement of one embodiment of a selection set evaluation device according to the present invention.

FIG. 1 is a block diagram showing an arrangement of one embodiment of the selection set evaluation device of the present invention.

In FIG. 1, 101 is a selection item indicating section which indicates the selection items to the selection user, who makes selection thereof, so as to lead the selection user to specify desired selection items and to make a combination thereof as the selection set, and 102 is a selection set evaluating section which evaluates the selection set made by the selection item indicating section 101 in accordance with a certain evaluation rule, and 103 is an evaluation result informing section which informs an evaluation result made by the selection set evaluating section 102 to an ordinary user.

The foregoing components may be directly connected to each other, or may be connected to each other via a network using a telephone line, a radio communication, the internet, and the like. Further, the selection item indicating section 101 may be simultaneously used by a plurality of users, and the evaluation result informing section 103 may be simultaneously used by a plurality of users.

Next, 201 is selection item storing means which stores information concerning target selection items, and 202 is selection item indicating means which indicates one selection item or a plurality of selection items selected from the selection items stored in the selection item storing means 201 to the selection user, and 203 is selection item selecting means by which the selecting user sets each selection item, indicated by the selection item indicating means 202, to a selection or non-selection state, and 204 is selection set storing means (selection set storage means) which stores a combination of the selection items, selected by the selecting user with the selection item selecting means 203, as the selection set, and 205 is a selection condition parameter setting means which sets a selection condition parameter indicative of differences between the selection items in terms of importance etc. of the respective selection items selected in the selection item selecting means 203, and 206 is selection condition parameter storing means which stores the selection condition parameter set by the selection condition parameter setting means 205, and the respective means 201 to 206 constitute the selection item indicating section 201.

Next, 207 is evaluation rule storing means which stores an evaluation rule for determining whether a combination of the selection items included in the selection set is preferable or not, and 208 is evaluation rule setting means which adds or deletes or rectifies and sets the evaluation rule stored in the evaluation rule storing means 207, and 209 is selection set evaluating means which evaluates the selection set, stored in the selection set storing means 204 in accordance with the evaluation rule stored in the evaluation rule storing means 207, by referring to the selection condition parameter stored in the selection condition parameter storing means 206, and the respective means 207 to 209 constitute the selection set evaluating section 102.

Further, 210 is selection set ranking means which makes a ranking of a plurality of selection sets in accordance with the evaluation result made by the selection set evaluating means 209, and 211 is evaluation result informing means which informs the ordinary user of (a) an evaluation of the selection set evaluated by the selection set evaluating means 209 and (b) an evaluation of the plurality of selection sets ranked by the selection set ranking means 210, and 212 is evaluation result adequacy setting means by which the ordinary user sets the adequacy of the evaluation result which is information used by the evaluation rule setting means 208 to rectify the evaluation rule stored in the evaluation rule storing means 207, and the respective means 210 to 212 constitute the evaluation result informing section 103.

Figure 2:
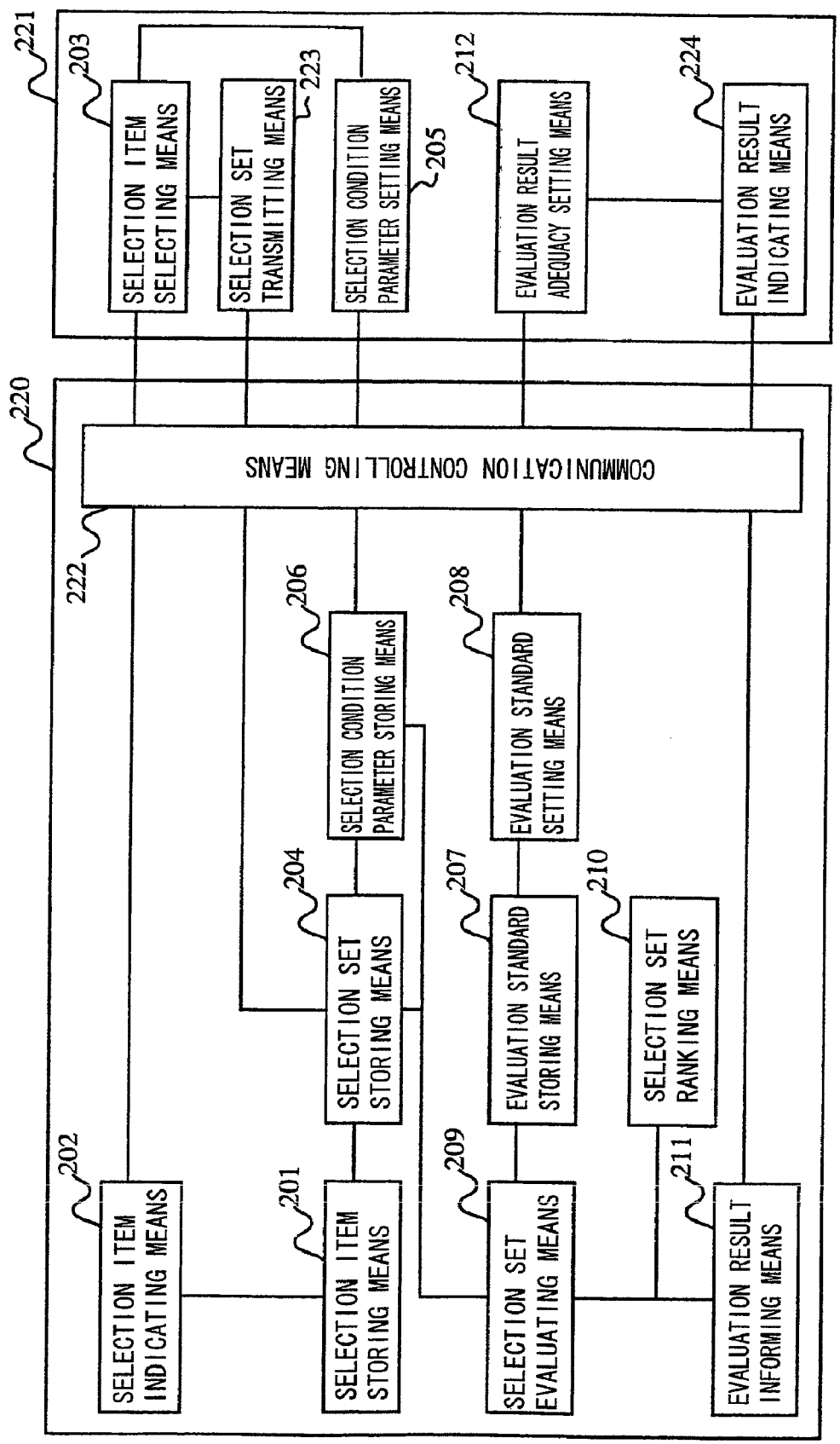
FIG. 2 is a block diagram showing a detail arrangement of one embodiment of the selection set evaluation device according to the present invention.

FIG. 2 is a block diagram showing an arrangement of one embodiment of the selection set evaluating system of the present invention. An arrangement of the selection set evaluating system is basically similar to the arrangement shown in FIG. 1, but the arrangement of FIG. 2 is different from FIG. 1 in that the system is constituted of (a) a selection set evaluation device 220 for evaluating the selection set and (b) a selection set making device 221 for making the selection set.

In FIG. 2, the means 201 to 212 are the same as those shown in FIG. 1, so that description thereof is omitted. 222 is communication controlling means, provided in the selection set evaluation device 220, which controls a communication with a selection set making device 221 connected to the selection set evaluation device 220. In the selection set making device 221, the selection item indicating means 202, the selection condition parameter storing means 206, the evaluation rule setting means 208, the evaluation result informing means 211, and the communication controlling means 222 are connected to each other.

While, in the selection set making device 221, 223 is selection set transmitting means which transmits the selection set made by the selection item selecting means 203 to the selection set evaluation device 220, and 224 is evaluation result displaying means which receives the evaluation result informed by the evaluation result informing means 211 via the communication controlling means 222 so as to display the evaluation result in the selection set making device 221.

The communication controlling means 222 functions as selection item transmitting means, which transmits information concerning the selection items to the selection set making device 221, in combination with the selection item indicating means 202. That is, the communication controlling means 222 transmits information concerning the selection items indicated by the selection item indicating means 202 to the selection set making device 221.

Further, the communication controlling means 222 functions as selection set receiving means which receives the selection set from the selection set making device 221. That is, the communication controlling means 222 receives the selection set transmitted from the selection set transmitting means 223, and stores the selection set in the selection set storing means 204.

FIG. 2 shows only one selection set making device 221, but a plurality of selection set making devices 221 may be connected to the selection set evaluation device 220 so as to constitute a network using a telephone line, a radio communication, the Internet, and the like. By making such an arrangement, it is possible to make the selection set and evaluate the selection set that has been made covering a wide range of users.

Figure 3:
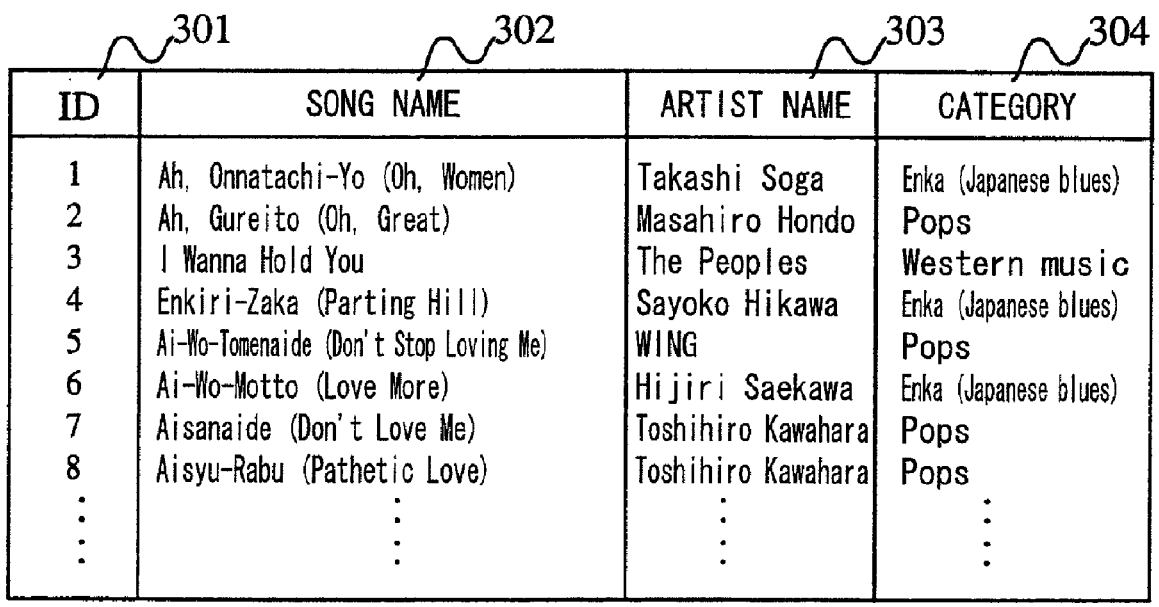
FIG. 3 shows an example of a selection item.

FIG. 3 shows an example of the selection items stored in the selection item storing means 201. FIG. 3 shows music data as an example. In FIG. 3, 301 is an ID which is identification information of the selection item, and 302 is a song name, and 303 is an artist name, and 304 is a category indicative of a type of the song. Thus, one selection item is constituted of the ID 301, the song name 302, the artist name 303, and the category 304 that are correspondingly combined with each other. More generally speaking, one selection item is constituted of identification information, content information, and attribute information.

FIG. 4 shows an example the evaluation rule, evaluating the selection set, which is stored in the evaluation rule storing means 207. In FIG. 4, 401 are evaluation rule numbers uniquely allocated in sequence to the evaluation rules stored in the evaluation rule storing means 207, and 402 is an evaluation rule type indicative of a type of the evaluation rule, and 403 is an evaluation pattern indicative of a concrete content of the evaluation rule, and 404 is a grade, set for each evaluation value, that is used to calculate the evaluation result of the selection set.

Thus, one evaluation rule is constituted of the evaluation rule number 401, the evaluation rule type 402, the evaluation pattern 403, and the grade 404, that are correspondingly combined with each other. In FIG. 4, the respective evaluation rules are categorized in accordance with the evaluation rule type 402, but the evaluation rule type 402 may be omitted by writing a type of the evaluation rule in the evaluation pattern 403.

The selection set evaluating means 209 judges whether or not the evaluation rule stored in the evaluation rule storing means 207 corresponds to the target selection set. When the evaluation rule corresponds to the selection set, the selection set evaluating means 209 evaluates the selection set in accordance with a calculation result calculated by using the grade 404, for example, by adding points of the grade 404.

The following description concretely exemplifies the evaluation rule shown in FIG. 4. An evaluation rule 405 whose evaluation rule number 401 is 1 is an evaluation rule for evaluating a specific order of the selection items included in the selection set. The evaluation rule 405 shows that: when the selection item whose ID 301 is 7 and the selection item whose ID 301 is 8 are sequentially selected, the grade 404 is 10.

An evaluation rule 406, another example, whose evaluation rule number 401 is 3 shows that: when the selection item whose ID 301 is 1, the selection item whose ID 301 is 4, and the selection item whose ID 301 is 3 are sequentially selected, the grade 404 is 7. As exemplified, successive selection items can take arbitrary numbers.

Further, it is not necessary that the order is in sequence, but the evaluation pattern 403 may be such that: arbitrary selection items are included therebetween.

An evaluation rule 407, still another example, whose evaluation rule number 401 is 4 is an evaluation rule for evaluating a specific combination of the selection items included in the selection set. This evaluation rule shows that: when the selection item whose artist name 303 is "Masahiro Hondo" and the selection item whose artist name 303 is "Toshihiro Kawahara" are included in the selection set, the grade 404 is 5.

Note that, in the evaluation rule for evaluating the combination, when a plurality of selection items which can be combined with each other exist in the selection set, it is possible to make such an interpretation that all the combinations of the respective selection items are to be evaluated, so that the grade may be counted by adding points of all the combinations, or it is possible to make such an interpretation that the combination is a single combination, so that the grade may be counted with respect to any one of the combinations.

For example, as to the evaluation rule 407 whose evaluation rule number 401 is 4, it is assumed that the target selection set includes (a) two selection items each of which has "Masahiro Hondo" in its artist name 303 and (b) two selection items each of which has "Toshihiro Kawahara" in its artist name 303. When this is interpreted as four combinations, the grade is 20, and when this is interpreted as a single combination, the grade is 5.

In this manner, as the number of the target selection items included in the selection set is larger, the grade is further increased, based on the former interpretation, so that as more songs are covered, the theme is more emphasized, which is suitable for making an evaluation taking each arrangement into consideration. Further, even though there are many covered selection items included in the selection set, the grade does not change, based on the latter interpretation. Thus, in case of a personal computer, even when a plurality of the same parts are included, it is possible to give the same evaluation to them when there is no change in a function, so that this is suitable for making an evaluation taking all the selection sets into consideration. Which interpretation is to be performed may be set for each evaluation rule, or may be set by means of the selection set evaluating means 209.

Note that, as another example where it is possible to apply the latter interpretation, the following case may be possible: when a plurality of same type (price) products are included in a foodstuff assortment such as condiments presented as a summer gift or a year-end gift, and there is no change in a quality rank of the foodstuff assortment, the same evaluation is made.

Further, other evaluation rules 408, 409, and 410 which are respectively 7, 8, and 9 in terms of the evaluation rule number 401 are evaluation rules for comparing characteristics of the selection items, included in the selection set, so as to evaluate the selection set. The evaluation rule 408 whose evaluation rule number 401 is 7 shows that: when the selection set includes n numbers of selection items each of which has a song name 302 beginning with a word "Ai (love)", the grade is n points. Further, another evaluation rule 409 whose evaluation rule number 401 is 8 shows that: when n numbers of selection items whose category 304 is "Japanese blues (Enka)", the grade is n points. Further, the evaluation rule 410 whose evaluation rule number 401 is 9 shows that: when a ratio of (a) selection items each of which indicates "pops" as the category 304 and (b) selection items each of which indicates "Western music" as the category 304 is 2:1 in a selection set, the grade is 5. It is possible to evaluate balance of a combination of the selection items included in the selection set in accordance with the evaluation rule for evaluating the ratio.

The evaluation rule described above is stored in the evaluation rule storing means 207, but the evaluation rule setting means 208 adds or deletes the evaluation rule as rectification so as to reset the evaluation rule during a process in which the selection set evaluation device of the present invention is operated, so that it is possible to make the evaluation rule converge.

It is not necessary that the selection set evaluating means 209 uses all the evaluation rules stored in the evaluation rule storing means 207 upon evaluating the selection set. For example, when only the evaluation rules based on a specific theme are used, it is possible to obtain an evaluation from a specific view point, for example, the evaluation rule can be changed according to the intended use of a personal computer which is to be built.

Figure 5:
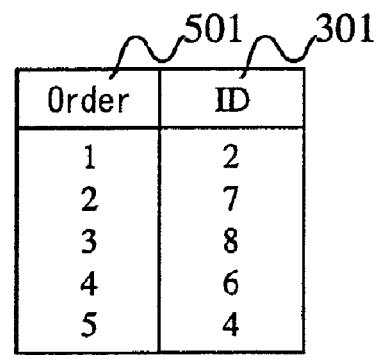
FIG. 5 shows an example of a selection set.

FIG. 5 shows an example of the selection set stored in the selection set storing means 204. In FIG. 5, examples of the selection items shown in FIG. 3 are combined with each other, and the IDs 301 are stored according to the order 501.

Referring to FIG. 3 to FIG. 5, the following description will discuss an example where the selection set evaluating means 209 evaluates the selection set shown in FIG. 5 in accordance with the evaluation rules, having values of 1 to 9 in terms of the evaluation rule number 401, that are exemplified in FIG. 4. In FIG. 5, the selection items having values of 2 and 3 in terms of a number 501 are selected with them having values of 7 and 8 in terms of the ID 301 in order, so that the evaluation rule 405 whose evaluation rule number 401 is 1 is applied. The selection items having values of 1 and 2 in terms of the order 501 correspond to a combination of (a) a selection item whose artist name 303 is "Masahiro Hondo" and (b) a selection item whose artist name 303 is "Toshihiro Kawahara", so that the evaluation rule 407 whose evaluation rule number 401 is 4 is applied. The selection items having values of 1 and 3 in terms of the order 501 correspond to a combination of (a) a selection item whose artist name 303 is "Masahiro Hondo" and (b) a selection item whose artist name 303 is "Toshihiro Kawahara", so that the evaluation rule 407 whose evaluation rule number 401 is 4 is applied. Each of selection items having values of 2 and 4 in terms of the order 501 includes the song name 302 beginning with a word "Ai (love)", so that the evaluation rule 408 whose evaluation rule number 401 is 7 is applied. Selection items having values of 4 and 5 in terms of the order 501 are such that the category 304 is "Japanese Blues (Enka)", so that the evaluation rule 409 whose evaluation rule number 401 is 8 is applied. As a result, the grade of the selection set is as follows: 10+5+5+2+2=24.

Figure 6:
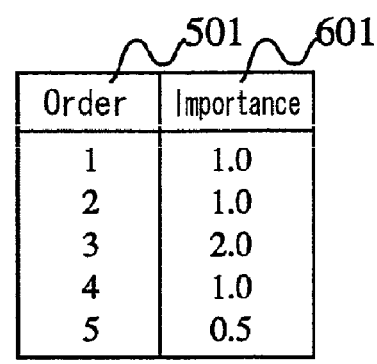
FIG. 6 shows an example of a selection condition parameter.

Further, FIG. 6 shows an example of the selection condition parameter stored in the selection condition parameter storing means 206. FIG. 6 is different from FIG. 5 in that there is stored an importance 601 which is an example of the selection condition parameter according to the order 501. Referring to FIG. 3 to FIG. 6, the following description will discuss an example where the selection set evaluating means 209 evaluates the selection set shown in FIG. 5 while referring to the selection state parameter shown in FIG. 6 in accordance with the evaluation rules having values of 1 to 9 in terms of the evaluation rule number 401 shown in FIG. 4.

Note that, the selection set evaluating means 209 multiplies a grade of a certain evaluation rule by the importance 601 which is the selection condition set for each selection item that is to be evaluated based on the evaluation rule. In case the evaluation is made in this manner, when the grade is based on the evaluation rule for the selection item whose importance is set to high, the grade is also high, so that it is possible to adjust a degree at which the selection condition parameter contributes to the evaluation by setting the importance of the important selection item, which is an essential item of the selection set, to be high.

In FIG. 5, selection items having values of 2 and 3 in terms of the order 501 selected with them having values of 7 and 8 in terms of the ID 301 in order, so that the evaluation rule 405 whose evaluation rule number 401 is 1 is applied, and the importance 601 of a selection item having a value 2 in terms of the order 501 is 1.0, and the importance 601 of a selection item having a value 3 in terms of the order 501 is 2.0, so that the grade based on the evaluation rule 405 is as follows: 10×1.0×2.0=20.

Likewise, the evaluation rule 407 whose evaluation rule number 401 is 4 is applied to selection items having values of 1 and 2 in terms of the orders 501, and the importance 601 of the selection items having values of 1 and 2 in terms of the order 501 are 1.0 and 1.0, so that the grade is as follows: 5×1.0×1.0=5. The evaluation rule 407 whose evaluation rule number 401 is 4 is applied to selection items having values of 1 and 3 in terms of the order 501, and selection items having values of 1 and 3 in terms of the order 501 are respectively 1.0 and 2.0 in terms of the importance 601, so that the grade is as follows: 5×1.0×2.0=10. The evaluation rule 408 whose evaluation rule number 401 is 7 is applied to selection items having values of 2 and 4 in terms of the order 501, and selection items having values of 3 and 4 in terms of the order 501 are 1.0 and 1.0 in terms of the importance 601, so that the grade is as follows: 2×1.0×1.0=2. The evaluation rule 409 whose evaluation rule number 401 is 8 is applied to selection items having values of 4 and 5 in terms of the order 501, and selection items having values of 4 and 5 in terms of the order 501 are respectively 1.0 and 0.5 in terms of the importance 601, so that the grade is as follows: 2×1.0×0.5=1. The grade of the selection set is a total of the foregoing points as follows: 20+5+10+2+1=38.

The importance is set for each selection item in this manner, so that the grade of the evaluation rule applied to the selection item whose importance is set to high largely contributes to the evaluation result compared with the case where the importance of all the selection items is 1.0. Inversely, the grade of the evaluation rule applied to the selection item whose importance is set to low less contribute to the evaluation result. Thus, the selecting user can obtain the evaluation result in which the selection item whose importance is set to high is emphasized.

The selection set evaluating means 209 multiplies the selection condition parameter by the grade 403 which have been set for each evaluation rule so as to make an evaluation. Other than this, the selection condition parameter set with respect to a target selection item may be evaluated so that the evaluation rule is applied to the selection condition parameter.

In the case of the music album for example, when the selection condition parameter denotes an editorial effect of music such as fade-in and fade-out, the evaluation rule storing means 207 stores the evaluation rule applied to such combination of the selection items that: a selection condition parameter for a certain selection item denotes fade-out, and another evaluation condition parameter for another selection item following to that selection item denotes fade-in. By arranging in this manner, it is possible to evaluate the selection condition parameter which can be additionally set for the selection item by the selecting user.

Further, a value of the selection condition parameter may be rectified when the selection set evaluating means 209 evaluates the selection set. For example, when the selection condition parameter is used to count the number of times the evaluation rule is applied for each selection item so as to increase the value every time the evaluation rule is applied, the value of the selection condition parameter denotes a degree at which the selection item contributes to the grade.

Thus, the evaluation result informing means 211 informs the user of the selection condition parameter reflecting the number of times the evaluation rule is applied, so that it is possible to inform the user of which selection item is important.

More concretely, when the selection set evaluating means 209 makes the evaluation in accordance with the evaluation rules, having values of 1 to 9 in terms of the evaluation rule number 401, which are exemplified in FIG. 4 showing an example of the selection set shown in FIG. 5, the selection condition parameter is increased by 1 every time the evaluation rule is applied. When it is assumed that the selection condition parameter for each selection item included in the selection set is 0, the evaluation rule is applied as described above, so that each of the selection condition parameters for the selection items having values of 1 to 5 in terms of the order 501 is set to a value equal to the number of times the evaluation rule is applied. That is, the selection condition parameter for the selection items having values of 1, 3, and 4 in terms of the order 501 is 2, and the selection condition parameter for the selection item having a value 2 in terms of the order 501 is 3, and the selection state parameter for the selection item having a value 3 in terms of the order 501 is 1. The values of the selection condition parameters are informed, so that the user can learn that the selection item having a value 3 in terms of the order 501 greatly contributes to the evaluation of the selection set.

Figure 7:
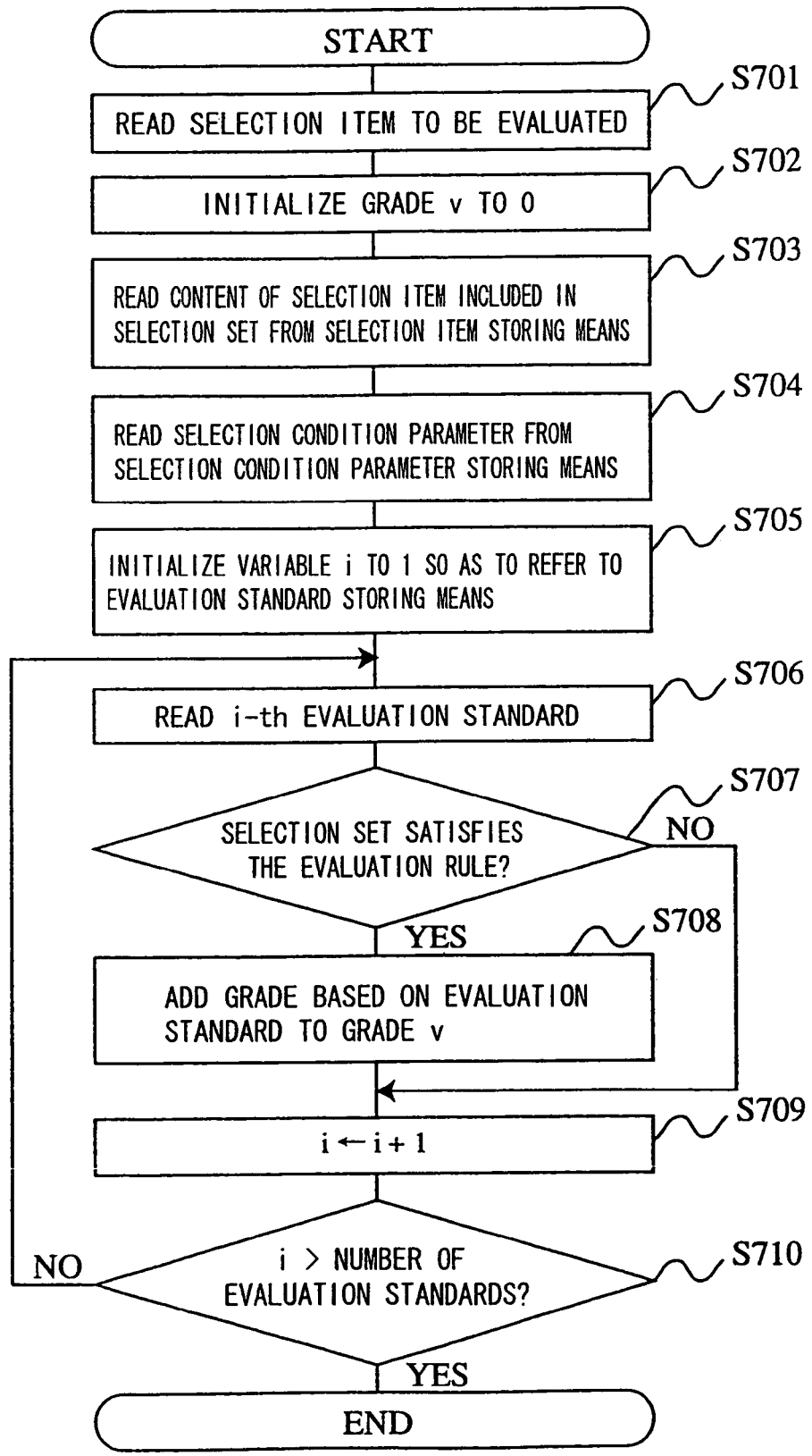
FIG. 7 is a flow chart for illustrating a processing flow in which the selection set is evaluated.

FIG. 7 is a flow chart for illustrating a processing flow in which the selection set evaluating means 209 of the selection set evaluation device whose arrangement is shown in FIG. 1 evaluates the selection set stored in the selection set storing means 204. This process is started (a) when a specific operation is performed, for example, the user pushes a button for starting the evaluation, or (b) right after a new selection set is made and is registered into the selection set storing means, or (c) when a combination of the selection items included in the selection set being made is changed, or (d) on a specific time and date, and the like.

First, the selection set evaluating means 209 reads a target selection set stored in the selection set storing means 204 (step 701; hereinbelow referred to as S701 for short). The selection set is additionally made by the selecting user with the selection item selecting means 203. The selection set is as exemplified in FIG. 5.

Next, a grade v of the selection set that is stored in the selection set evaluating means 209 is initialized (S702).

Next, a content of the selection item included in the selection set is read from the selection item storing means 201 (S703). For example, the selection item whose order 501 shown in FIG. 5 corresponds to the selection item whose ID 301 shown in FIG. 3 is 2, so that the content of the selection item (song name 302, artist name 303, category 304) is read. This process is performed with respect to all the selection items included in the selection set.

Next, the selection condition parameter set for each selection item included in the selection set is read from the selection condition parameter storing means 206 (S704). For example, the importance 601 shown in FIG. 6 is read.

Next, in order to refer to the evaluation rule stored in the evaluation rule storing means 209, a value of a variable stored in the selection set evaluating means 209 is initialized (S705).

Next, the evaluation rule having an i-th evaluation rule number is read from the evaluation rule storing means 207 (S706). For example, in an example of the evaluation rule shown in FIG. 4, when the i value is 1, the evaluation rule 405 having a value 1 in terms of the evaluation rule number 401 is read.

Next, whether the evaluation rule read in S706 is applied to the selection set or not is judged (S707). The concrete example is as described above. In case where the evaluation rule is applied, the process proceeds to S708, and in case where the evaluation rule is not applied, the process proceeds to S709.

Next, the grade is calculated based on the evaluation rule, and are added to the grade v (S708). The concrete example is as described above.

Next, the value i is increased by 1 (S709).

Next, whether the i value is larger than the number of the evaluation rules stored in the evaluation rule storing means 207 or not is judged (S710). In case where the i value is larger than the number of the evaluation rules, this means that the evaluation based on all the evaluation rules stored in the evaluation rule storing means 207 is finished, so that the process is finished. In case where the i value is lower than or equal to the number of the evaluation rules, this means that the evaluation rule which has not been evaluated exists in the evaluation rule storing means 207, so that the process returns to S706 so as to continue the process.

Each of FIG. 8 to FIG. 12 illustrates a concrete example of an image of the selection set evaluation device according to the present invention. The selection set evaluation device described in this example also functions as a product selling device for selling the selection set, that has been made, to the selection user or the ordinary user.

Figure 8:
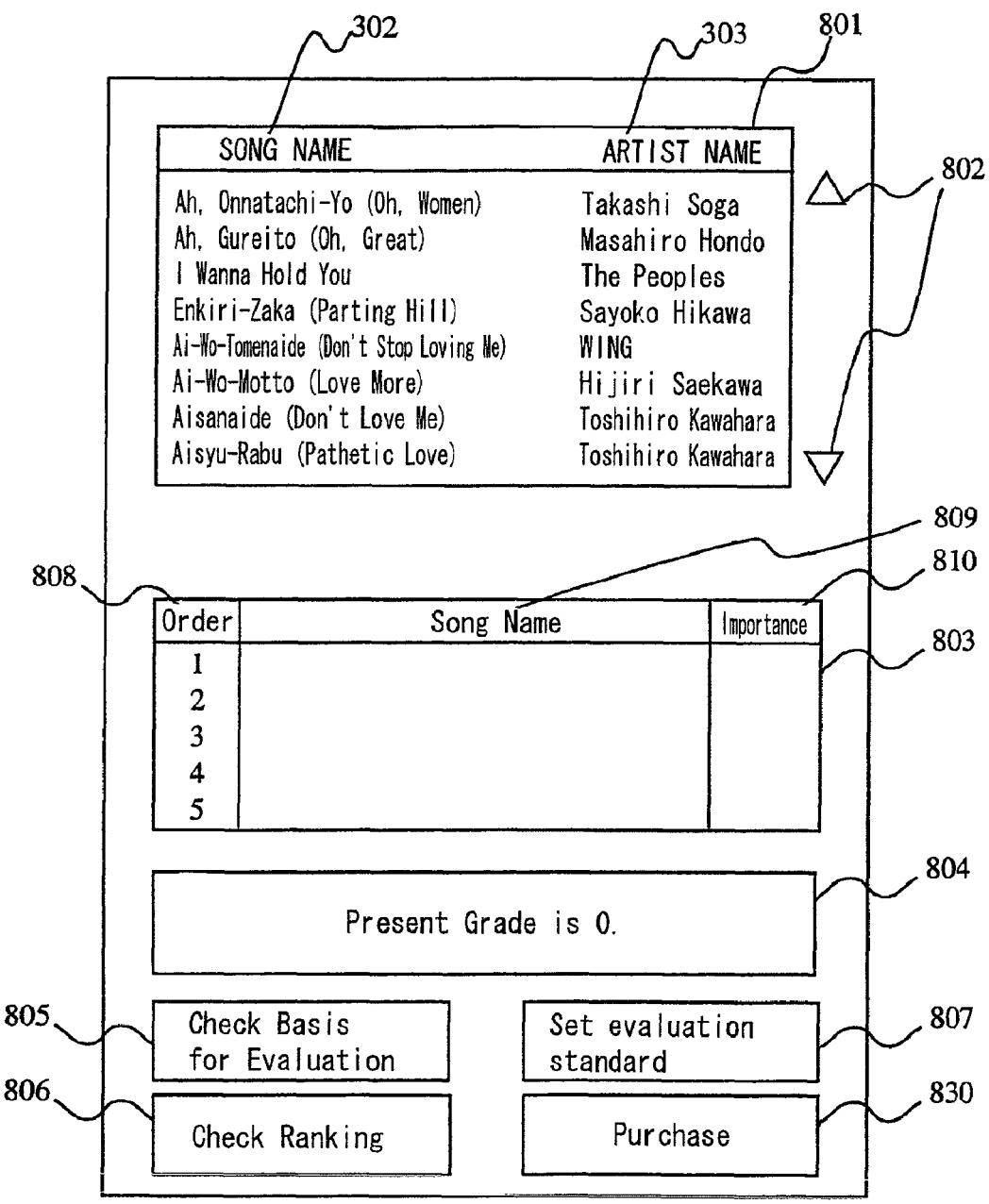
FIG. 8 shows an initial image of the selection set evaluation device according to the present invention, and illustrates the initial image by which a user selects the selection items so as to make the selection set.

FIG. 8 illustrates an example of an initial state of an image by which the user selects the selection items so as to make the selection set. In FIG. 8, 801 is a selection item indicating area for indicating to the user information concerning the selection items to be selected, and 802 is a scroll button for switching the information concerning the selection item displayed in the selection item indicating area 801 to information concerning another selection item, and 803 is a selection set display area for displaying the content of the selection set, being made, which is a combination of the selection items selected by the user, and 804 is a message display area for displaying a message, and 805 is an evaluation reason display button for displaying a basis for making the evaluation result made by the selection set evaluating means 209, and 806 is a ranking display button for displaying a ranking of the evaluation results of plural selection sets, and 807 is an evaluation rule setting button for setting the evaluation rule, and 830 is a selection set purchase button for inputting an instruction for purchasing the selection set that has been made.

Further, the song name 302 and the artist name 303 are displayed in the selection item indicating area 801 as information concerning the respective selection items, and an order 808 of the selection item, a song name 809 of the selection item, and importance 810 are displayed in the selection set display area 803.

In an example of the image, the selection item indicating means 202 is provided as the selection item indicating area 801, and the selection item selecting means 203 is provided as the selection item display area 801 and the selection set display area 803, and the selection condition parameter setting means 205 is provided as the importance 810 of the selection set display area 803, and the evaluation result informing means 211 is provided as the message display area 804.

In order to select the selection item displayed in the selection item indicating area 801, any one of the displayed song names 302 or any one of the displayed artist names 303 is pointed by means of a pointing tool such as a mouse so as to click it. Alternately, a touch panel may be used so as to give instructions by directly touching the panel, or a key board may be used so as to give instructions by moving a cursor displayed in the selection item indicating area 801. Hereinbelow, the operation for selecting a displayed target is referred to merely as "click".

The selected selection item is added to the selection set being made, and is displayed in the selection set display area 803. At this time, the importance 810 of a newly added selection item is set to "middle" as an initial state. The importance 810 is used to adjust the degree at which the selection item contributes to the evaluation as described above. In this example, the importance 810 is expressed as "high", "middle", and "low" so as to facilitate understanding, and these expressions are converted into specific values, for example, "high" is 2.0, and "middle" is 1.0, and "low" is 0.5, so that these values are used for an internal process such as calculation of the points based on the evaluation rule.

In order that the user changes the importance 810, the importance 810 of the selection item, displayed in the selection set display area 803, that is to be changed, is clicked, so that the values are changed in a sequential order. Alternately, a pop-up menu may be displayed upon clicking the importance 810, so as to select a value to be changed from the menu.

In order to delete the selection item displayed in the selection set display area 803 from the selection set being made, the song name 809 of the selection item to be deleted that is displayed in the selection set display area 803 is clicked.

Figure 9:
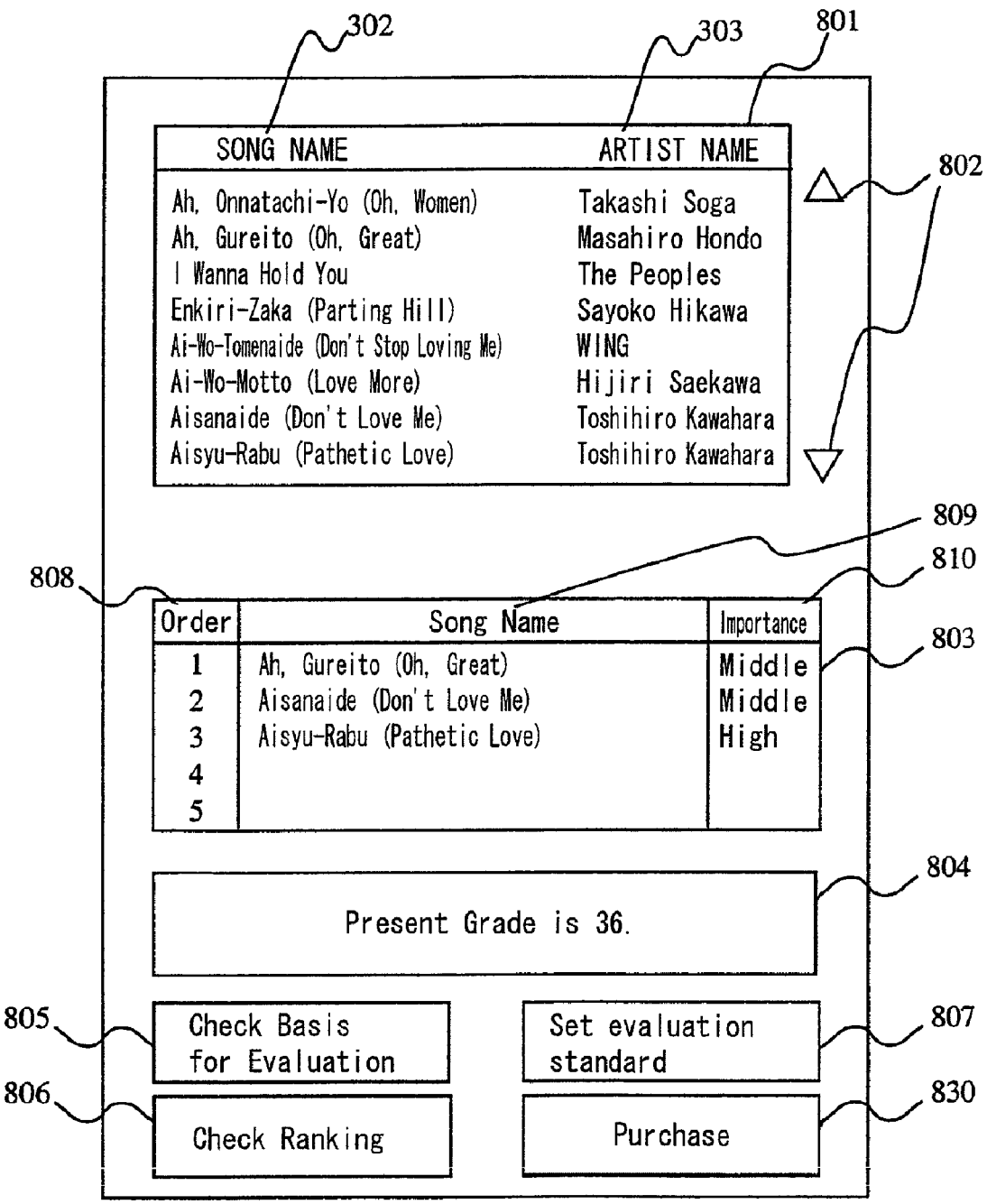
FIG. 9 illustrates an example of the image in which three selection items are selected and the selected items are included in the selection set being made.

FIG. 9 illustrates an example of a condition under which three selection items are selected and included in the selection set being made. In the selection set display area 803, the selection items having a value 1 to 3 in terms of the order 808 are displayed. Further in this example, the importance 810 of the selection item having a value 3 in terms of the order 808 is set to "high" by the user. Further, the evaluation result made by the selection set evaluating means 209 with respect to the selection set being made, that is displayed in the selection set display area 803, is displayed in the message display area 804.

In this manner, every time a condition of the selection set being made is changed, for example, a new selection item is added to the selection set, or the selection item is deleted from the selection set, or the importance 810 of the selection item included in the selection set is changed, the selection set evaluating means 209 evaluates the selection set in real time so as to update the display of the message display area 804, so that the user can immediately learn how the evaluation result is changed due to the change of the selection set being made, thereby facilitating making and rectifying of the selection set.

Figure 10:
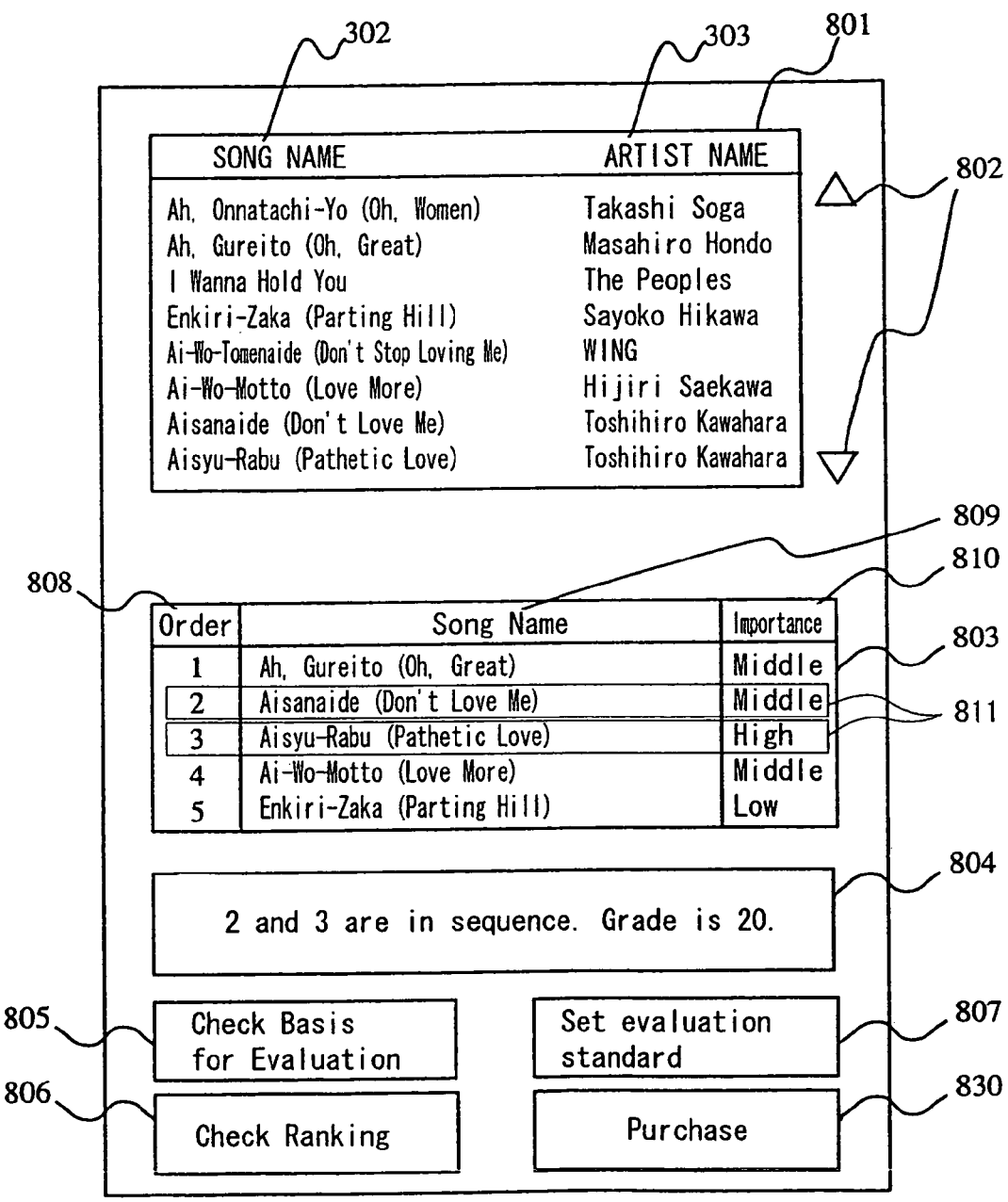
FIG. 10 illustrates an example of the image in which an evaluation basis display button is clicked and a basic judgment which supports an evaluation result made by selection set evaluating means is displayed.

FIG. 10 illustrates an example where a basis for the evaluation result made by the selection set evaluating means 209 is displayed by clicking the evaluation basis display button 805 so that five selection items are selected and included in the selection set being made. In the message display area 804, a message generated in accordance with a content of the evaluation rules applied to the selection set is displayed. Further, a frame 811 is given to a selection item, targeted in terms of the evaluation rule, out of the selection items in the selection set display area 803.

That is, FIG. 10 shows a condition under which the evaluation rule 405, shown in FIG. 4 as an example of the evaluation rule, whose evaluation rule number 401 is 1 is applied to the selection items having values of 2 and 3 in terms of an order and are displayed in the selection set display area 804. The frame 811 is given to the selection items having values of 2 and 3 in terms of the order so as to be displayed, and the message display area 804 displays (a) a character string "2 and 3 are in sequence" generated in accordance with the content of the evaluation pattern 403 of the evaluation rule 405, and (b) a character string "grade is 20" generated in accordance with the grade 10×1.0×2.0=20.0 brought about by the evaluation rule 405.

In case where there are a plurality of evaluation rules applied to the selection set displayed in the selection set display area 803, the target evaluation rule may be switched every time the evaluation basis display button 805 is pushed, or the evaluation rule automatically displayed may be switched at certain intervals. Alternately, a whole display image may be switched so that the basis for the evaluation result made by the selection set evaluating means is displayed in detail.

Figure 11:
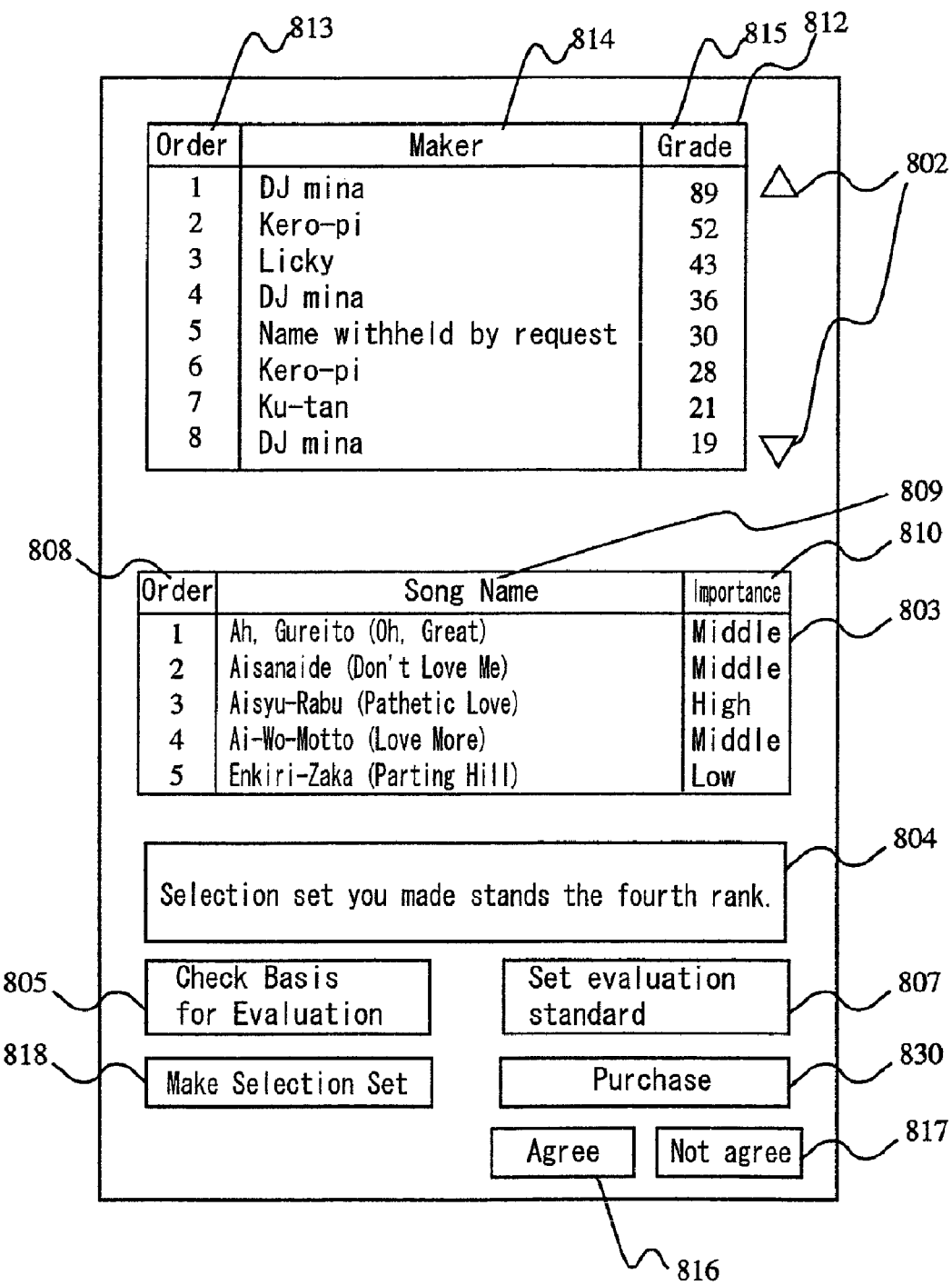
FIG. 11 illustrates an example where a ranking of the evaluation result of the selection set is displayed by pushing a ranking display button of the image illustrated in FIG. 10.

FIG. 11 shows an example where the selection set ranking means 210 makes a ranking of the evaluation results of a plurality of selection sets stored in the selection set storing means 204 by pushing the ranking display button 806 shown in FIG. 10. 812 is a ranking display area for displaying the ranking, and the ranking display area 812 displays an order 813, a maker 814, and a grade 815 of each selection set. The message display area 804 displays a message for informing the user of the order of the selection set, being made, upon pushing the ranking display button 806.

In this manner, by referring to the ranking of the selection set that has been made, it is possible to compare the selection set with another selection set made by another user, so that it is possible to obtain a motivation for making a better selection set. Further, it is also possible to refer to a content of another selection set, made by another user, which receives a high evaluation, upon making the selection set. Further, the selection set displayed in the ranking display area 812 is selected, and the selection set purchase button 830 is pushed, so that it is possible to purchase the selection set. Thus, even when the selection set has not been made, it is possible to purchase the selection set, made by another user, which receives a high evaluation.

Note that, the operation in which the user pushes the selection set purchase button 830 causes the selection set making device 221 shown in FIG. 2 to transmit a purchase instruction to the selection set evaluation device 220 for example, and purchase process controlling means (not shown) of the selection set evaluation device 220 carries out specification of the selection set, acknowledgement of the purchasing user, a charging process, and the like.

In order to confirm the content of another selection set displayed in the ranking display area 812, the selection item included in the selection set is displayed in the selection set display area 803 when the order 813 or the maker 814 or the grade 815 of the selection set required to be confirmed is clicked.

Next, 816 is an evaluation agree button which is pushed in case where the selecting user or the ordinary user reads the evaluation of the selection set that is displayed in the selection set display area 803 and the user agrees with the evaluation, and 817 is an evaluation not-agree button which is pushed in case where the selection user or the ordinary user reads the evaluation of the selection set that is displayed in the selection set display area 803 and the user does not agree with the evaluation. The buttons 816 and 817 do not have to be pushed.

Next, the evaluation rule setting means 208 raises the grade of the evaluation rule, applied to the selection set, that is stored in the evaluation rule storing means 207, in case where the evaluation agree button 816 is pushed, and the evaluation rule setting means 208 drops the grade in case where the evaluation not-agree button 817 is pushed, so as to update the evaluation rule. In the example of the evaluation rule shown in FIG. 4, a value of the grade 404 is increased by 1 when the evaluation agree button 816 is pushed, and the value is decreased by 1 when the evaluation not-agree button 817 is pushed. Alternately, the value may be updated at a constant rate, for example, the value of the grade 404 is increased by ten percents or is decreased by ten percents. Further, the upper limit or the lower limit of the grade 404 may be set in advance so that the value of the updated grade 404 is not more or less than the foregoing range. When the value of the grade 404 is updated so as to be less than the lower limit, this means that the adequacy of the evaluation rule is extremely underestimated, so that the evaluation rule may be deleted from the evaluation rule storing means 207.

In this manner, the ordinary user inputs "agree" or "not agree" with respect to the evaluation, so that it is possible to render the evaluation rule generally appropriate while operating the selection set evaluation device of the present invention.

Note that, when the image of FIG. 11 is to be restored to an image for making the selection set that is shown in FIG. 8, a selection set making button 818 is clicked.

Figure 12:
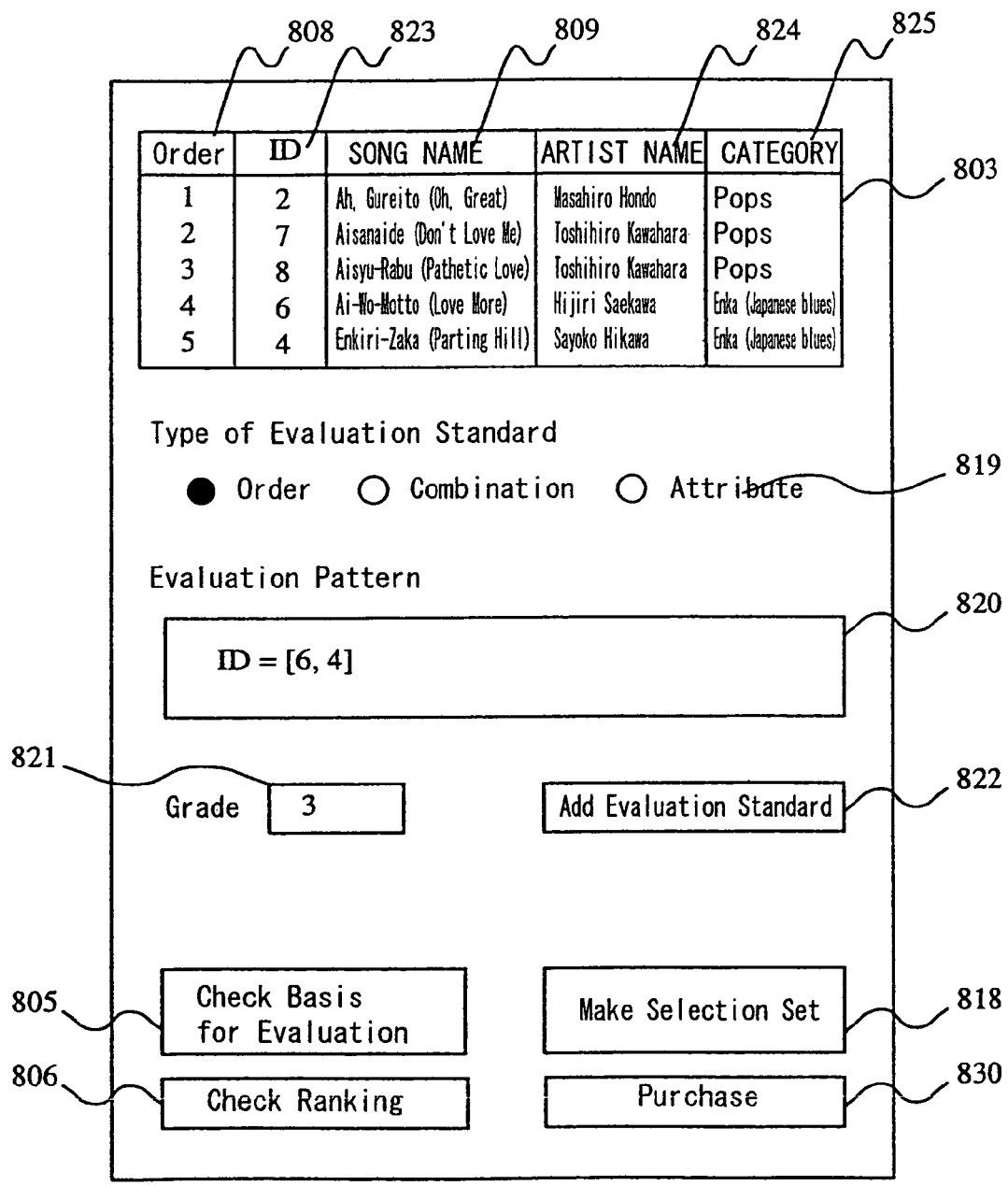
FIG. 12 illustrates an example where the image is switched to another image for setting the evaluation rule by clicking an evaluation rule setting button of the image illustrated in FIG. 10.

FIG. 12 shows an example where an image is switched to the image for setting the evaluation rule by clicking the evaluation rule setting button 807 shown in FIG. 10. In FIG. 12, 819 is an evaluation rule type setting button for setting a type of the evaluation rule, and 820 is an evaluation pattern setting area for inputting or displaying the evaluation pattern, and 821 is a grade setting area for setting a grade of the evaluation rule, and 822 is an evaluation rule adding button for setting the evaluation rule, that has been set, in the evaluation rule storing means 207. Further, the selection set display area 803 displays an ID 823, an artist name 824, and a category 825, that are information concerning the respective selection items, as references for setting the evaluation rules.

The following description will discuss an example of a procedure in which a new evaluation rule is set, which is shown in FIG. 12. First, "sequence" is selected as a type of the evaluation rule by using the evaluation rule type setting button 819. Next, 6 and 4 displayed in a column of the ID 823 in the selection set display area 803 are sequentially clicked. Thus, there is displayed an evaluation pattern that is applied when (a) a selection item whose ID is 6 and (b) a selection item whose ID is 4 are sequentially selected. Next, 3 is set in the grade setting area 821 as a grade of the evaluation rule being set. Here, an inputted grade is an arbitrary value. Next, the evaluation rule adding button 822 is clicked. Thus, the evaluation rule, in which the evaluation rule type is "sequence" and the evaluation pattern is "ID=[6,4]" and the grade is "3", is added to the evaluation rule storing means 207.

In the foregoing example, a content of the selection item displayed in the selection set area 803 so as to set the evaluation pattern, but the evaluation rule may be directly inputted to the evaluation pattern setting area by using a keyboard and the like. Further, in case where an evaluation rule identical to a newly set evaluation rule in terms of the evaluation pattern has been stored in the evaluation rule storing means 207, the newly set evaluation rule may be kept from being stored. It may be so arranged that: a confirming image is displayed so as to confirm whether or not to overwrite the evaluation rule, and when permission of overwriting is inputted, the evaluation rule stored in the evaluation rule storing means 207 is deleted, and the newly set evaluation rule is stored in the evaluation rule storing means 207.

As described above, the user newly sets an evaluation rule so as to make the evaluation rule storing means 207 store the newly set evaluation rule, so that it is possible to enrich variation of the evaluation rule while operating the selection set evaluation device of the present invention, thereby rendering the evaluation rule more appropriate.

The following description will discuss another embodiment of the present invention referring to FIG. 13 to FIG. 25.

Figure 13:
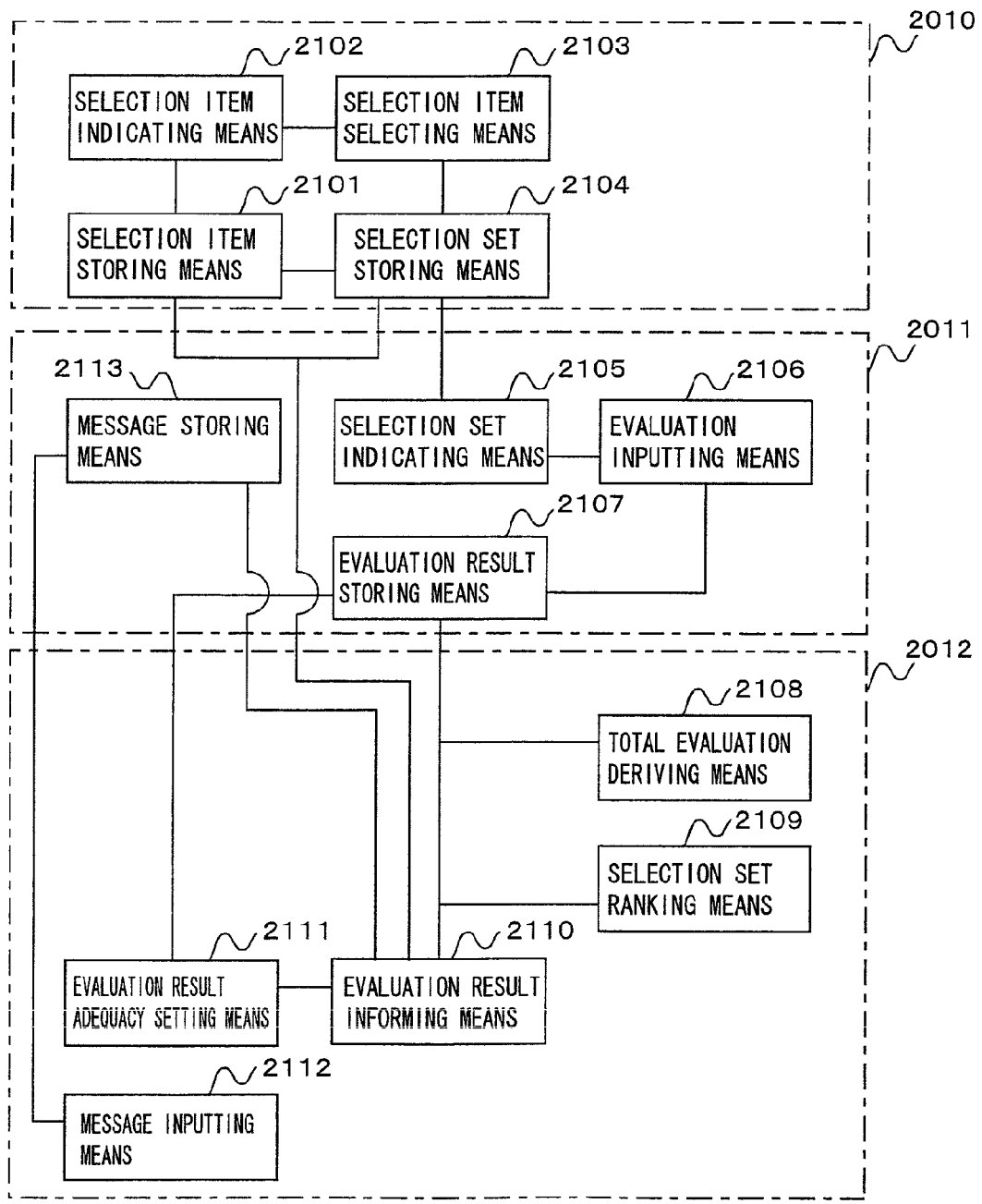
FIG. 13 is a block diagram showing an arrangement of one embodiment of the selection set evaluation device according to the present invention.

FIG. 13 is a block diagram showing one embodiment of the selection set evaluation device of the present invention.

In FIG. 13, 2010 is a selection item indicating section in which selection items to be selected are indicated to the selecting user who makes selection and the selecting user specifies desired selection items so as to make a selection set, and 2011 is a selection set evaluation result collecting section in which the selection set made by the selection item indicating section 2010 is indicated to the evaluating user who evaluates the selection set and the evaluation user inputs the evaluation so that the evaluation result is stored, and 2012 is an evaluation result informing section in which the evaluation result collected in the selection set evaluation result collecting section 2011 is informed to the selecting user or the ordinary user who refers to or purchases the selection set.

Next, 2101 is selection item storing means for storing information concerning the selection item, and 2102 is selection item indicating means for indicating one selection item or a plurality of selection items, selected from the selection items stored in the selection item storing means 2101, to the selecting user, and 2103 is selection item selecting means by which the selecting user sets a selection or non-selection state of each selection item indicated by the selection item indicating means 2102, and 2104 is selection set storing means for storing a combination of selection items the selection user selects by means of the selection item selecting means 2103 as the selection set, and the respective means 2101 to 2104 constitute the selection item indicating section 2010.

Further, 2105 is selection set indicating means for indicating the selection set stored in the selection set storing means 2104 to the evaluating user, and 2106 is evaluation inputting means by which the evaluating user inputs the evaluation of the selection set indicated by the selection set indicating means 2105, and 2107 is evaluation result storing means for storing the evaluation result, given by the evaluating user, that is inputted by the evaluation inputting means 2106, and 2113 is message storing means for storing a message inputted by means of message inputting means 2112 described later, and the respective means 2105 to 2107 and 2113 constitute the selection set evaluation result collecting section 2011.

Further, 2108 is total evaluation deriving means for deriving a total evaluation result from a plurality of evaluation results of a certain selection set, and 2109 is selection set ranking means for ranking a plurality of selection sets in accordance with (a) the evaluation result stored in the evaluation result storing means 2107 or (b) the total evaluation result derived by the total evaluation deriving means 2108, and 2110 is evaluation result informing means for informing (a) the evaluation result stored in the evaluation result storing means 2107, or (b) the total evaluation result derived by the total evaluation deriving means 2108, and (c) the message stored in the message storing means 2113, to the selecting user or the ordinary user, in accordance with the ranking determined by the selection set ranking means 2107, and 2111 is evaluation result adequacy setting means by which the selecting user or the ordinary user sets the adequacy of the evaluation result, stored in the evaluation result storing means 2107, that is informed by the evaluation result informing means 2110, and 2112 is message inputting means by which the selecting user or the ordinary user inputs the message concerning the evaluation result informed by the evaluation result informing means 2110, and the respective means 2108 to 2112 constitute the evaluation result informing section 2012.

The foregoing components may be directly connected to each other, or they may be connected to each other via a network using a telephone line, a radio communication, the Internet, and the like. Further, it is not necessary that different users function as the selecting user, the evaluating user, and the ordinary user separately, but a user may functions as a plurality of users. Further, the selection item indicating means 2102 may be simultaneously used by a plurality of selecting users, or the evaluation inputting means 2106 may be simultaneously used by a plurality of evaluating users, or the evaluation result informing means 2110 may be simultaneously used by a plurality of ordinary users.

Further, it is needless to say that: it does not matter whether the storing means 2101 and 2104 store information temporarily or continuously, and it is possible to select the temporary storage or continuous storage as usage, and it does not matter whether the storing means 2101, 2104, 2107, and 2113 are internally provided or externally provided or detachably provided.

Figure 14:
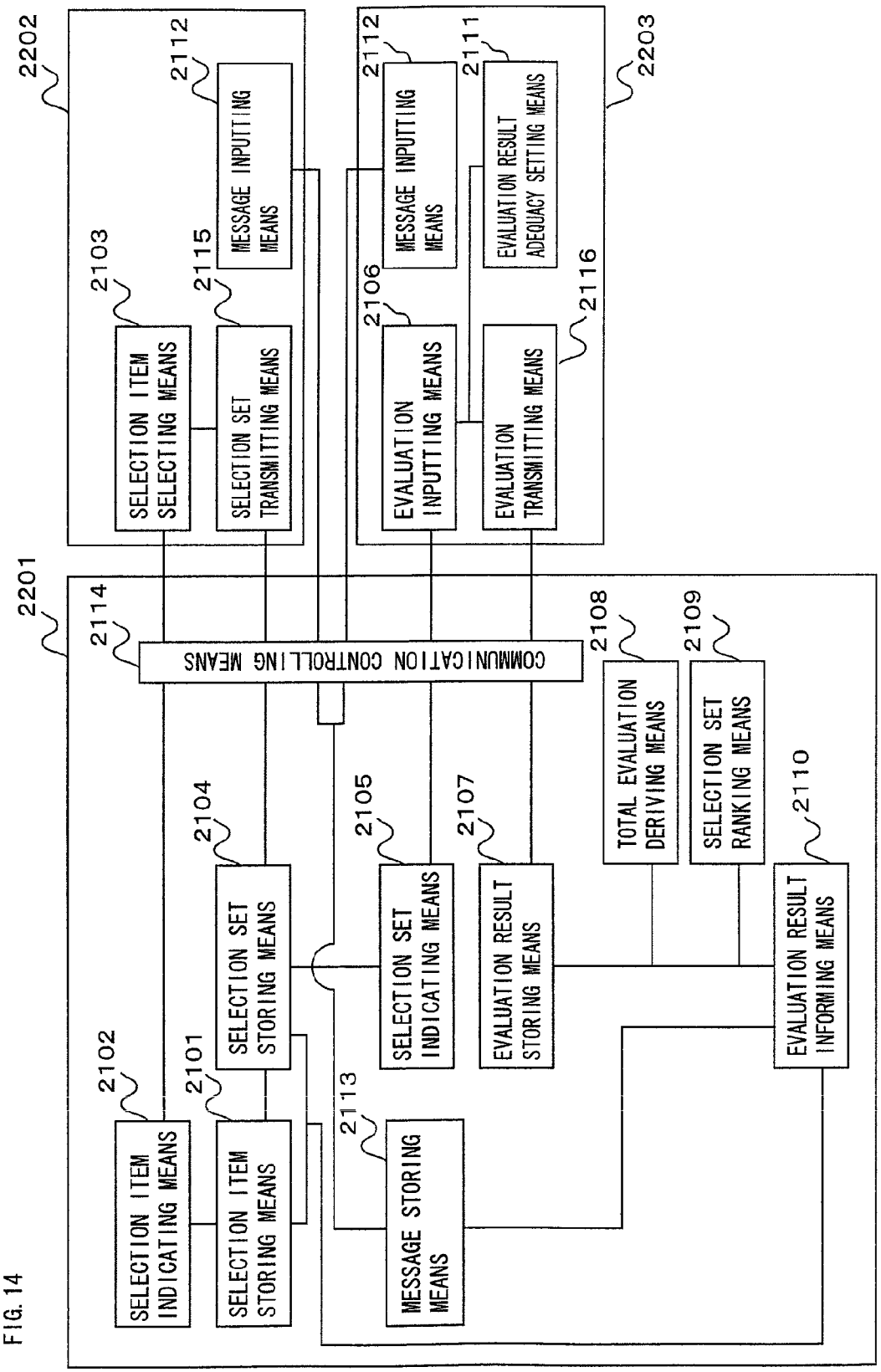
FIG. 14 is a block diagram showing an arrangement of one embodiment of a selection set evaluating system according to the present invention.

FIG. 14 is a block diagram showing an arrangement of one embodiment of the selection set evaluating system of the present invention. This is basically the same arrangement as the arrangement shown in FIG. 13, but it is different in that: this system includes: a selection set evaluation result collecting device 2201 for collecting the evaluation results given by the evaluating user; a selection set making device 2202 for making the selection set; and a selection set evaluation inputting device 2203 for inputting the evaluation of the selection set.

In FIG. 14, 2101 to 2113 are the same as in FIG. 13, so that description thereof is omitted. In the selection set evaluation result collecting device 2201, 2114 is communication controlling means for controlling communication with (a) the selection set making device 2202 and (b) the selection set evaluation inputting device 2203 that are connected to the selection set evaluation result collecting device 2201, and 2115 is selection set transmitting means for transmitting the selection set made by the selection item selecting means 2103 to the selection set evaluation result collecting device 2201, and 2116 is evaluation transmitting means for transmitting the evaluation inputted by the evaluation inputting means 2106 to the selection set evaluation result collecting device 2201.

In combination with the selection item indicating means 2102, the communication controlling means 2114 functions as selection item transmission controlling means for controlling transmission of information concerning the selection item to the selection set making device 2202. That is, information concerning the selection item indicated by the selection item indicating means 2102 is transmitted to the selection set making device 2102.

Further, in combination with the selection set indicating means 2105, the communication controlling means 2114 functions as selection set transmission/reception controlling means for receiving the selection set from the selection set making device 2202 and transmitting the selection set to the selection set evaluation inputting device 2203. That is, the selection set transmitted from the selection set transmitting means 2115 is received, and the selection set is stored in the selection set storing means 2104, and the selection set indicated by the selection set indicating means 2105 is transmitted to the selection set evaluation inputting device 2203.

Further, the communication controlling means 2114 functions as selection set evaluation reception controlling means, and receives the evaluation transmitted from the evaluation transmitting means 2116, and the evaluation is stored in the evaluation result storing means 2107.

The message inputting means 2112 are provided in the selection set making device 2202 and the selection set evaluation inputting device 2203, and a message inputted by the selecting user or the evaluating user with the message inputting means 2112 is received, and is stored in the message storing means 2113. The message stored in the message storing means 2113 is informed by the evaluation result informing means 2110 in combination with the selection set and the evaluation result, so that it is possible to support communication performed by exchanging messages concerning the selection set and the evaluation result between the selecting user, the evaluating user, and the ordinary user.

In FIG. 14, only one selection set making device 2202 and only one selection set evaluation inputting device 2203 are illustrated, but a plurality of selection set making devices 2202 and a plurality of selection set evaluation inputting devices 2203 may be connected to the selection set evaluation result collecting device 2201 so that a network using a telephone line, a radio communication, the Internet, and the like is constituted. By arranging in this manner, it is possible to make the selection sets and collect the evaluations of the selection sets so that a wide range of users are covered.

FIG. 15 shows an example of the selection item stored in the selection item storing means 2101. FIG. 15 exemplifies music data. In FIG. 15, 2301 is an ID which is identification information of the selection item, and 2302 is a song name, and 2303 is an artist name, and 2304 is a category indicative of a song type. Thus, a single selection item is constituted of the ID 2301, the song name 2302, the artist name 2303, and the category 2304, that correspond to each other so as to make a combination. More generally speaking, one selection item is constituted of identification information, content information, and attribute information.

FIG. 16 shows an example of the selection set stored in the selection set storing means 2104. The ID 2301 of the selection item is stored in accordance with the order 2402 so as to correspond to a selection set number 2401 uniquely added to distinguish one selection set from other selection sets. In the example shown in FIG. 16, the selection items exemplified in FIG. 15 are combined with each other. Further, a maker 2403 who made the selection set and a comment 2404 added to the selection set are stored in combination.

In this example, a name of the maker 2403 is stored as character string data, but this may be stored in such a manner that: managing data such as a managing number is added to the name of the maker so as to be stored, and the selection set storing means 2104 stores the managing data.

FIG. 17 shows an example of the evaluation result stored in the evaluation result storing means 2107. One evaluation result or a plurality of evaluation results 2501 are stored so as to correspond to the selection set number 2401 shown in FIG. 16. In the example of FIG. 16, the evaluation result 2501 includes: an evaluation number 2502 uniquely added to distinguish one evaluation result 2501 from other evaluation results 2501; an evaluator 2503 which is a name of the user inputting the evaluation result 2501; a comment 2504 added to the evaluation result 2501; a grade 2505 described later; and a content of the adequacy 2506 of the evaluation result 2501 set by the evaluation result adequacy setting means 2111.

In this example, the evaluator 2503 is stored as character string data, but when data for managing the name of the evaluator is additionally prepared as described above, the managing number may be stored.

The grade 2505 is an arbitrary value inputted by the evaluation inputting means 2106 in accordance with a subjective evaluation of the evaluator 2503 that is given with respect to the selection set. In this example, the grade 2505 ranges from 0 to 100, but the range of the grade is not limited to this.

The adequacy 2506 is a value for indicating the adequacy of the evaluation result 2501. As to the adequacy 2506, a value in an initial state is 1.0, and the value is updated in accordance with the content that the user using the evaluation result inputted by means of the evaluation result adequacy setting means 2111. The using method and the updating method of the adequacy 2506 are more concretely exemplified later.

The following description will discuss an example where the total evaluation deriving means 2108 derives the total evaluation result corresponding to the evaluation result 2501 shown in FIG. 17. Three evaluation results: an evaluation result 2507 whose evaluation number 2502 is 1, an evaluation result 2508 whose evaluation number 2502 is 2, and an evaluation result 2509 whose evaluation number 2502 is 3, are stored corresponding to a selection set whose selection set number 2401 is 1. For example, when it is assumed that the total evaluation result is derived by averaging products of the adequacy 2506 and the grades of the respective evaluation results, the total evaluation result of the selection set whose selection set number 2401 is 1 is (92×1.0+40×0.7+80×1.2)/3=72. Other than such deriving method, the total evaluation result may be derived as follows: distributions of the grade 2505 and the adequacy 2506 are calculated in accordance with a statistical technique, and an evaluation result having an idiosyncratic value that should be rejected is excluded, and other evaluation results are averaged.

The ordinary user refers to the total evaluation result derived in this manner, so that even when a large number of evaluations are made with respect to the selection set, it is possible to grasp an entire evaluation appropriately without referring to individual evaluation results. Further, the total evaluation result is derived by using the adequacy as described above, so that it is possible to obtain the total evaluation result emphasizing the evaluation result whose adequacy is set to high.

The following description discuss a concrete example of the selection set evaluation device of the present invention referring to FIG. 18 to FIG. 21.

Figure 18:
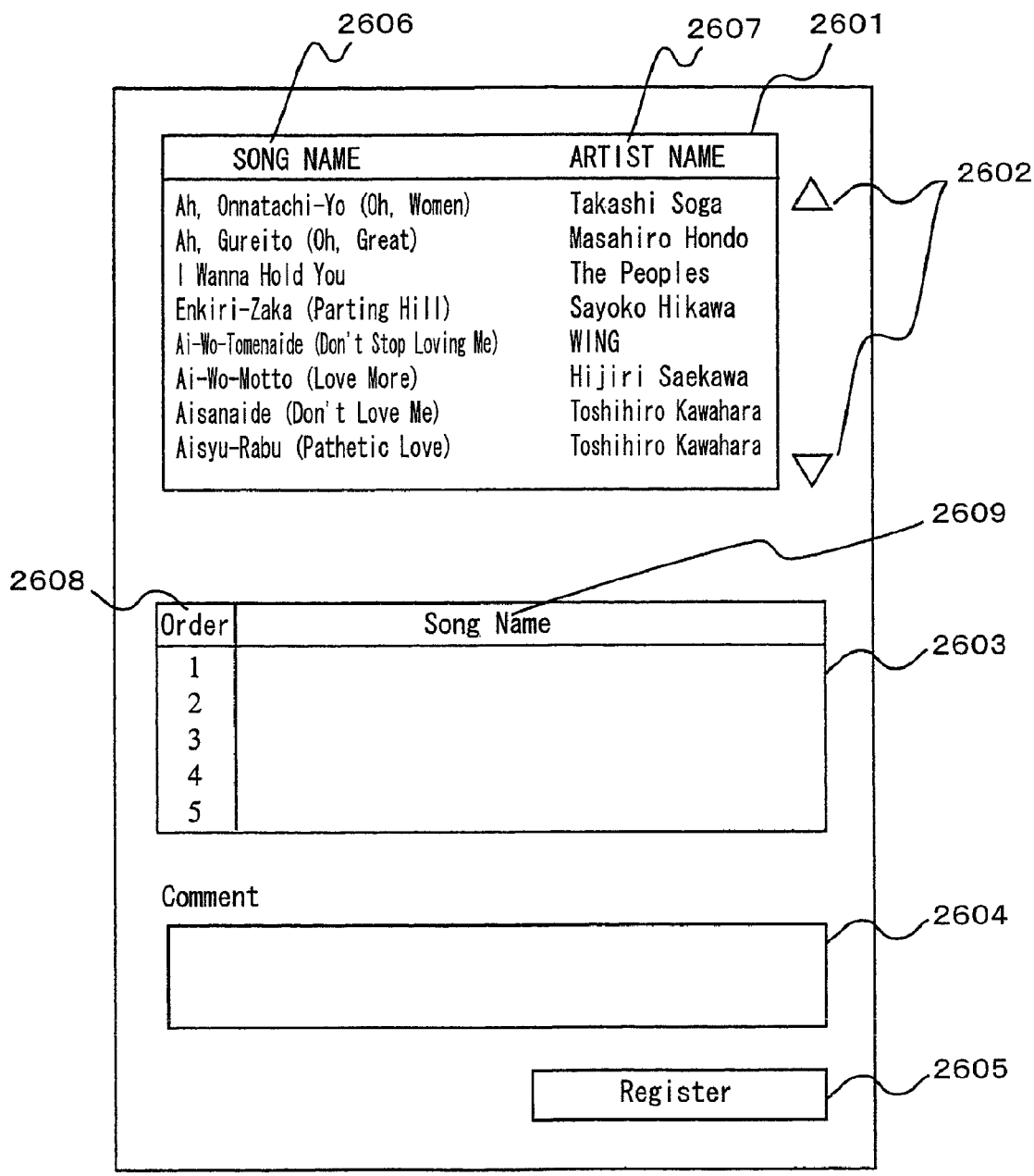
FIG. 18 shows an image of the selection set evaluation device according to the present invention, and illustrates an example of the image by which a selecting user makes the selection set.

FIG. 18 shows a concrete example of an image of the selection item selecting means 2103 by which the selecting user selects an indicated selection item so as to make a selection set.

In FIG. 18, 2601 is a selection item indicating area for displaying information, concerning a selection item to be selected, indicated to the selecting user by the selection item indicating means 2102, and 2602 is a scroll button for switching the information concerning the selection item displayed in the selection item indicating area 2601 to information concerning another selection item, and 2603 is a selection set display area for displaying a content of a selection set, being made, that is a combination of the selection items selected by the selecting user, and 2604 is a comment input area to which the selection user inputs a comment (message) concerning the selection set, and 2605 is a registration button for causing the selection set storing means 2104 to store the selection set displayed in the selection set display area 2603.

Further, in the selection item indicating area 2601, a song name 2606 and an artist name 2607 are displayed as information concerning the respective selection items, and in the selection set display area 2603, an order 2608 and the song name 2609 of the selection item are displayed.

In order to select the selection item displayed in the selection item indicating area 2601, a displayed song name or artist name is pointed by using a pointing tool such as a mouse, so as to click a button thereof. Alternately, a touch panel may be used so as to give instructions by directly touching the panel, or a key board may be used so as to give instructions by moving a cursor displayed in the selection item indicating area 2601. Hereinbelow, the operation for selecting a displayed target is referred to merely as "click".

The selected selection item is added to the selection set being made, and is displayed in the selection set display area 2603. Inversely, in order to delete the selection item displayed in the selection set display area 2603 from the selection set being made, the song name 2609 of the selection item to be deleted that is displayed in the selection set display area 2603 is clicked.

The selecting user repeats an operation for selecting a selection item displayed in the selection item indicating area 2601 so as to add the selection item to the selection set being made, or an operation for selecting a selection item displayed in the selection item indicating area 2601 so as to delete the selection item from the selection set being made, so that the selection set that is desired by the user is made. It is possible to store the selection set, that has been made, in the selection set storing means 2104 by pushing the registration button 2605.

In addition to the example shown in FIG. 18, when there is further provided a maker name input area by which the selecting user inputs his/her own name, it is possible to input a name of the maker 2403 of the selection set exemplified in FIG. 16, so as to be stored in the selection set storing means 2104 in combination. Alternately, a name of the selecting user, such as a log-in name, that has been inputted upon using a terminal or a software using the image for making the selection set that is shown in FIG. 18, may be stored in the selection set storing means 2104 as the maker 2403 in the selection set exemplified in FIG. 16.

Figure 19:
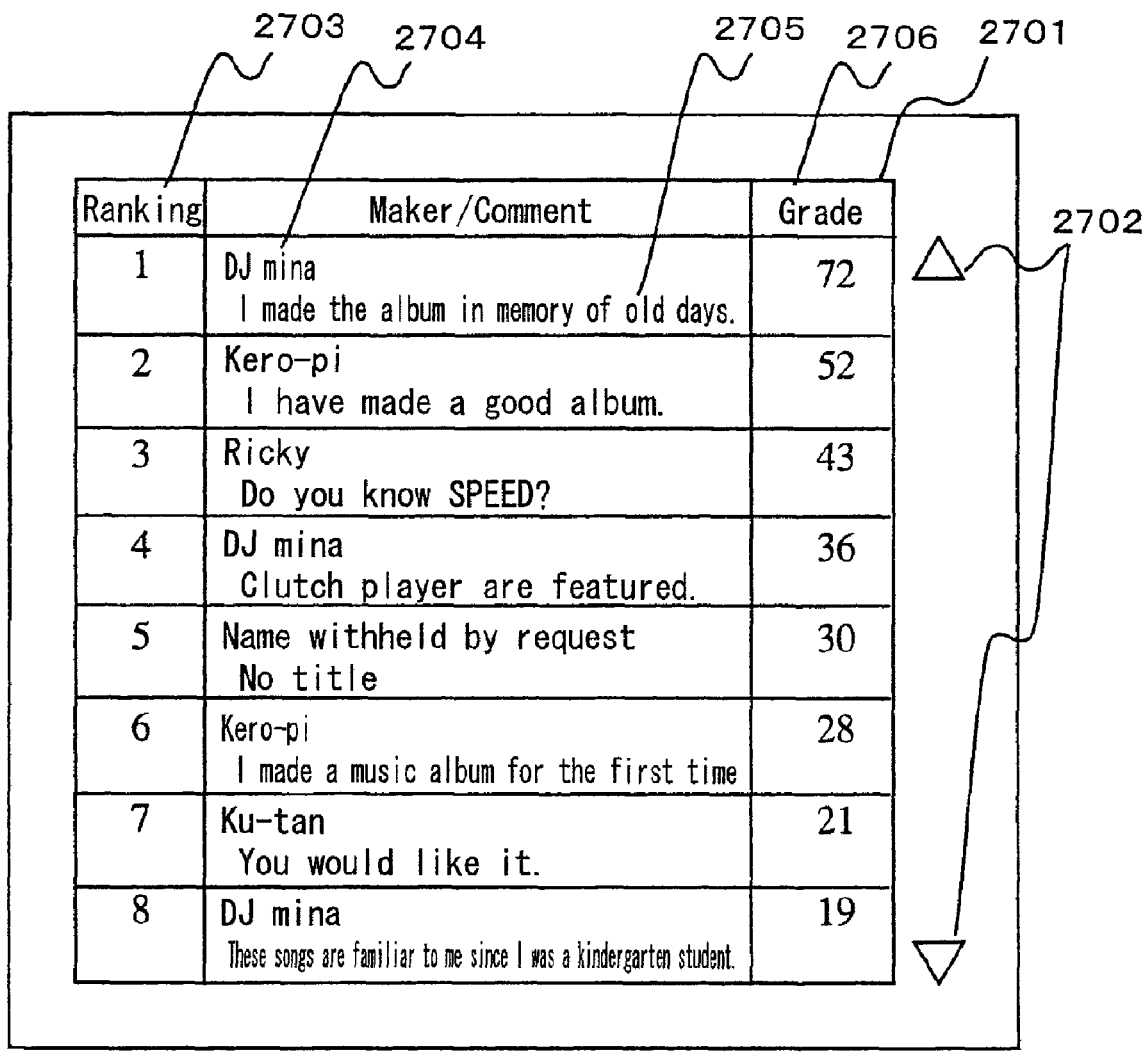
FIG. 19 shows an image of the selection set evaluation device according to the present invention, and illustrates an example of the image by which the evaluation result is informed to an ordinary user.

FIG. 19 illustrates an example of an evaluation result informing image such that: the total evaluation results derived by the total evaluation deriving means 2108 from the evaluation results stored in the evaluation result storing means 2107 are ranked by the selection set ranking means 2109, and the evaluation result informing means 2110 informs the evaluation results to the ordinary user.

The ordinary user can grasp which selection set is highly evaluated by referring to a list of the selection sets, ranked in accordance with the total evaluation results, that are displayed in the evaluation result informing image, so that it is possible to make a new selection set by referring to a combination of the selected items included in a highly-evaluated selection set. Alternately, in the product selling device including the selection set evaluation device of the present invention or the selection set evaluating system of the present invention, the selection set that is displayed can be purchased as it is, so that it is not required to select the selection items upon purchasing the selection set, and it is possible to purchase the combination of the selected items included in the highly-evaluated selection set.

In FIG. 19, 2701 is a ranking display area for displaying a ranking of the selection sets, and 2702 is a scroll button for switching the selection sets displayed in the ranking display area 2701. Further, in the ranking display area 2701, an order 2703 of the ranking, a maker 2704 of the selection set, a comment 2705 on the selection set, and a grade 2706 are correspondingly displayed. In the grade 2706 of the selection set, a grade of the total evaluation result derived by the total evaluation deriving means 2108 is displayed. A concrete example of deriving the total evaluation result is as described above.

For example, it is assumed that: the grade of the total evaluation result derived, with respect to the selection set exemplified in FIG. 16, from the evaluation result exemplified in FIG. 17 is 2072, and the selection set ranking means 2109 ranks the selection set as a top. Thus, the order 2703 in the ranking display area 2701 corresponds to the top, and "DJ mina" a content of the maker 2403 shown in FIG. 16 is displayed in the maker 2704, and "I made the album in memory of old days" a content of the comment 2404 shown in FIG. 16 is displayed in the comment 2705, and 72 which is a grade of the total evaluation result derived by the total evaluation deriving means 2108 is displayed in the grade 2706.

In FIG. 19, the selection set, having been evaluated by the evaluating user, which has some points as the grade, is displayed, but a selection set that has not been evaluated may be displayed in the ranking so that the selection set has a predetermined grade such as 0 point. At this time, when a mark indicating that the selection set has not been evaluated is displayed, the ordinary user can distinguish the selection set, that has not been evaluated, from other selection sets. Alternately, a display area for displaying only a selection set that has not been evaluated may be additionally prepared.

Figure 20:
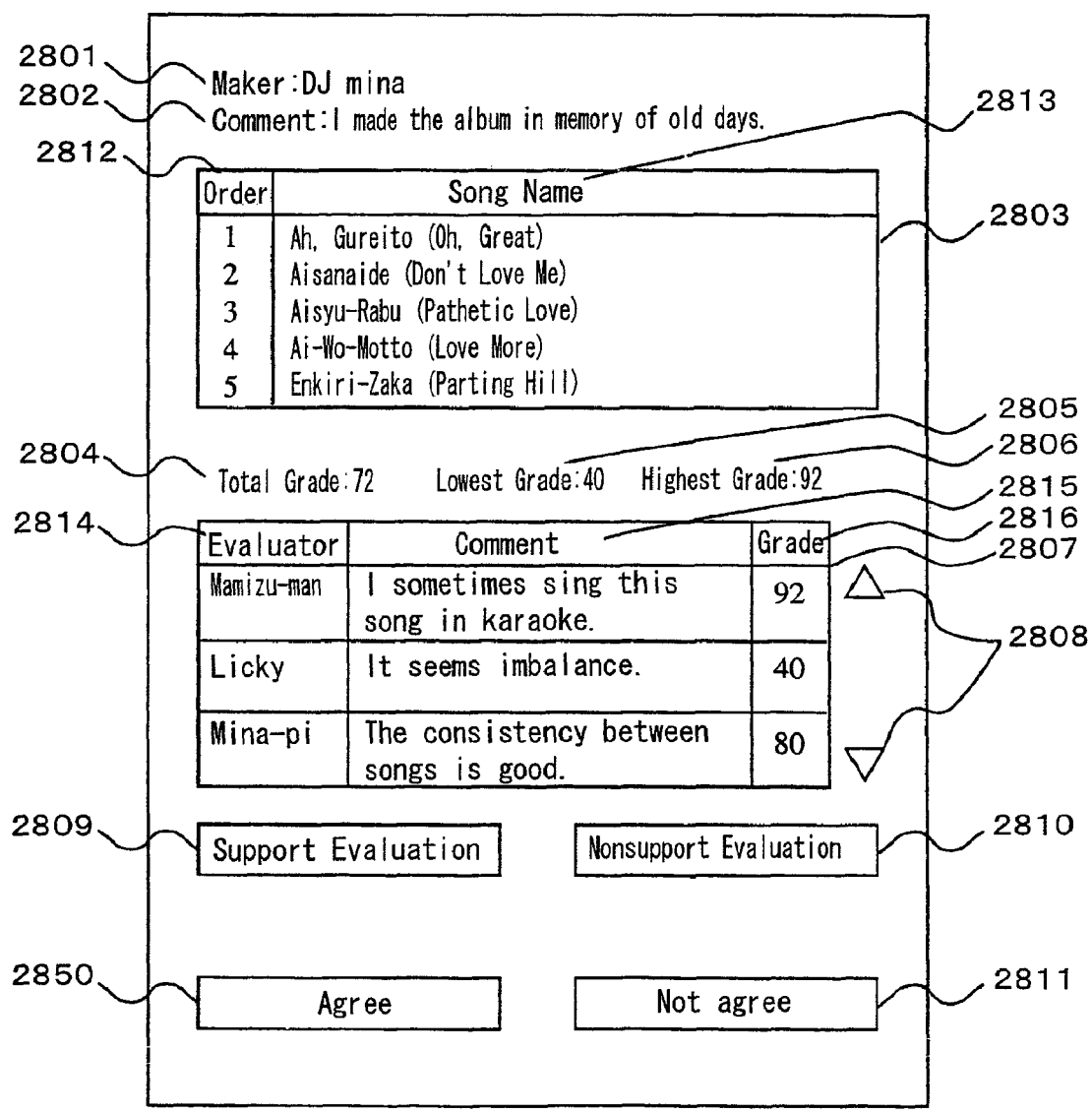
FIG. 20 shows an image of the selection set evaluation device according to the present invention, and illustrates an example where a detail evaluation concerning the selection set is displayed.

When a selection set displayed in the ranking display area 2701 is clicked, the image is switched to an image for displaying detail information of the selection set as shown in FIG. 20. FIG. 20 shows an example where the evaluation result informing means 2110 displays the detail evaluation content concerning the selection set selected in FIG. 19.

In FIG. 20, 2801 is a maker display area for displaying a name of the selecting user who made the selection set, and 2802 is a comment display area for displaying a comment the selection user inputted upon making the selection set, and 2803 is a selection set display area for displaying selection items included in the selection set, and 2804 is a total evaluation result display area for displaying a total evaluation result of the selection set that has been derived by the total evaluation deriving means 2108, and 2805 is a lowest grade display area for displaying the lowest grade of the evaluation results stored in the evaluation result storing means 2107, and 2806 is a highest grade display area for displaying the highest grade of the evaluation results stored in the evaluation result storing means 2107, and 2807 is an evaluation result display area for displaying a list of the evaluation results of the selection set that are stored in the evaluation result storing means 2107, and 2808 is a scroll button for switching the evaluation results displayed in the evaluation result display area 2807, and 2809 is an evaluation agree button which is pushed in case where the selecting user or the ordinary user agrees with one of the evaluation results displayed in the selection set display area 2807, and 2810 is an evaluation not-agree button which is pushed in case where the selecting user or the ordinary user does not agree with one of the evaluation results displayed in the selection set display area 2807, and 2811 is an evaluation input button for switching to an image in which a new evaluation of the selection set is inputted, and 2850 is a selection set purchase button for purchasing the selection set. Note that, an example of the image for inputting a new evaluation is described later in FIG. 21.

Further, in the selection set display area 2803, the selection item's order 2812 and the selection item's song name 2813 are correspondingly displayed, and in the evaluation result display area 2807, (a) the evaluator 2814 which is a name of the evaluating user who made the evaluation, (b) the comment 2815 which the evaluation user inputted as to the evaluation result, and (c) the grade 2816 which is the evaluation result are correspondingly displayed.

One of the evaluation results displayed in the evaluation result display area 2807 is selected by clicking, and the evaluation agree button 2809 or the evaluation not-agree button 2810 is pushed, so that the ordinary user can set the adequacy 2506 of the evaluation result. The adequacy 2506 is expressed in a form of a value stored in the evaluation result storing means 2107 in combination with the evaluation results, as described based on FIG. 17.

For example, as a value in an initial state of the adequacy 2506, 1.0 is set with respect to a newly inputted evaluation result 2501. Every time the ordinary user pushes the evaluation agree button 2809 as to the evaluation result 2501, the value of the adequacy 2506 is increased by 0.1, and every time the ordinary user pushes the evaluation not-agree button 2810 as to the evaluation result 2501, the value of the adequacy 2506 is decreased by 0.1. For example, in case where the adequacy 2506 stored in the evaluation result storing means 2107 is 1.2, when the evaluation agree button 2809 is pushed one time, the value of the adequacy 2506 is updated to 1.3.

The value of the adequacy 2506 updated in this manner is multiplied by the grades of the respective evaluation results 2501 as described in the example where the total evaluation deriving means 2108 derives the total evaluation result, so that it is possible to derive the total evaluation result so that the evaluation result 2501 whose adequacy 2506 is high is emphasized.

Note that, the value at which the adequacy 2506 is updated is not limited to the foregoing example. Further, when the lower limit and the upper limit are given to the value of the adequacy 2506 in advance, it is possible to prevent the value of the adequacy 2506 from being reflected to the total evaluation result.

In combination with each evaluation result displayed in the evaluation result display area 2807, the value of the adequacy 2506 of the evaluation result is displayed, so that it is possible to give the ordinary user a clue for judging whether the evaluation result is reliable or not. In this case, when marks such as asterisks whose quantity corresponds to the value of the adequacy 2506 are added, or a display color of the evaluation result is changed, instead of indicating the adequacy 2506 in a form of a value, it is possible to intuitively judge the reliability.

Further, as described above, the ordinary user selects the selection set in the evaluation result informing image as described in FIG. 19, and confirms its content and the evaluation result, made by the evaluation user, by means of the image displaying the detail evaluation content concerning the selection set described in FIG. 20, and pushes the selection set purchase button 2850, so that the ordinary user can purchase the selection set. Thus, the ordinary user can purchase the selection set, which has been made by other user and is highly evaluated by the evaluating user, without making the selection set.

Figure 21:
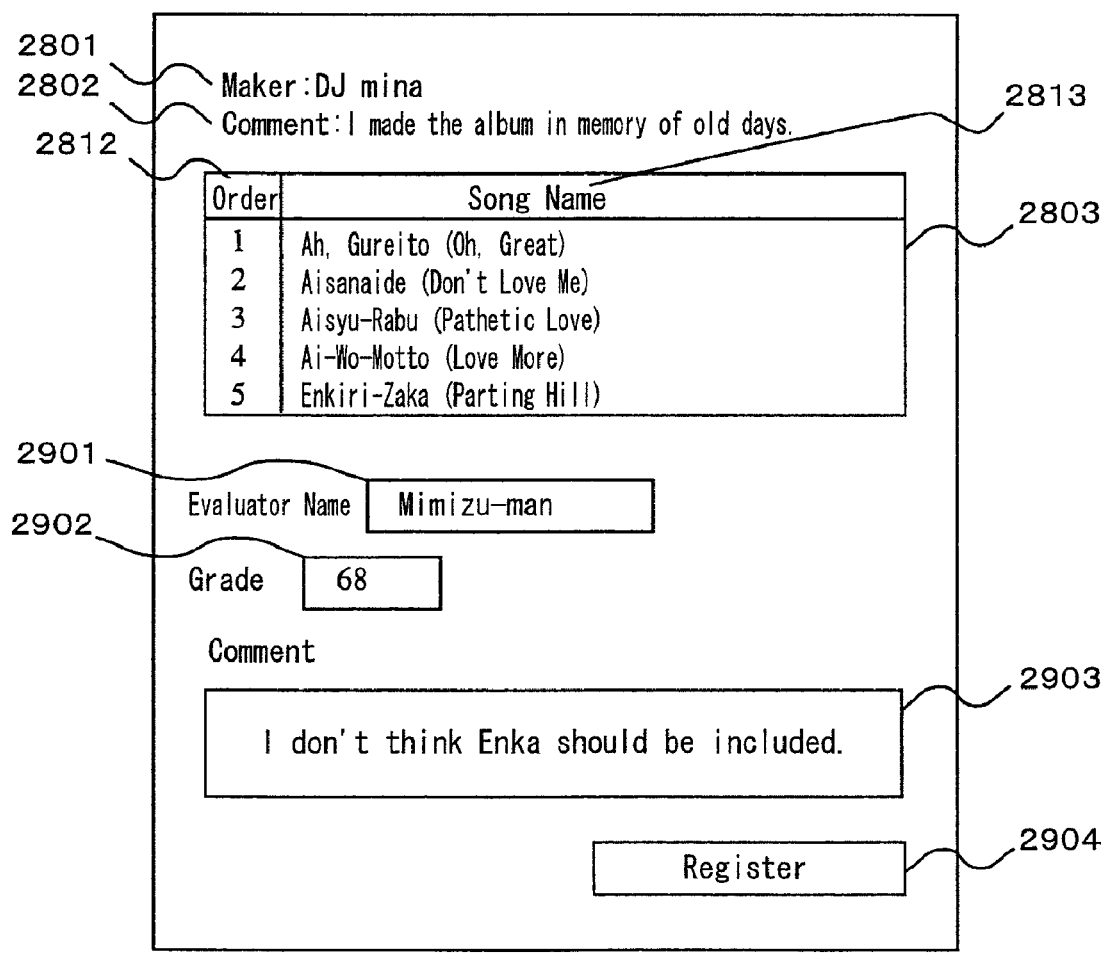
FIG. 21 shows an image of the selection set evaluation device according to the present invention, and illustrates an example of the image by which an evaluating user inputs an evaluation concerning the selection set.

Next, FIG. 21 illustrates an example of an image by which the evaluating user inputs the evaluation with respect to the selection set indicated by the selection set indicating means 2105. Concretely, when the evaluation input button 2811 is pushed with respect to the selection set whose contents are displayed in the maker display area 2801, the comment display area 2802, and the selection set display area 2803 that are shown in FIG. 20, the image shown in FIG. 20 is switched to the image shown in FIG. 21, so that the evaluating user can input the evaluation with respect to the selection set.

In FIG. 21, 2801 is a maker display area for displaying a name of the selecting user who made the selection set, and 2803 is a selection set display area for displaying the selection items included in the selection set, and an order 2812 of the selection item and a song name 2813 of the selection item are displayed in the selection set display area 2803. In this point, FIG. 21 is the same as FIG. 20.

In addition, 2901 is an evaluator name input area for inputting a name of the evaluating user, and 2902 is a grade input area for inputting a grade subjectively determined by the evaluating user as the evaluation result of the selection set displayed in the selection set display area 2803, and 2903 is a comment input area for inputting a comment such as a basis for the evaluation result made by the evaluator, and 2904 is a registration button by which the evaluation results inputted in the evaluator name input area 2901, the grade input area 2902, and the comment input area 2903 are registered so as to be stored in the evaluation result storing means 2107.

Figure 22:
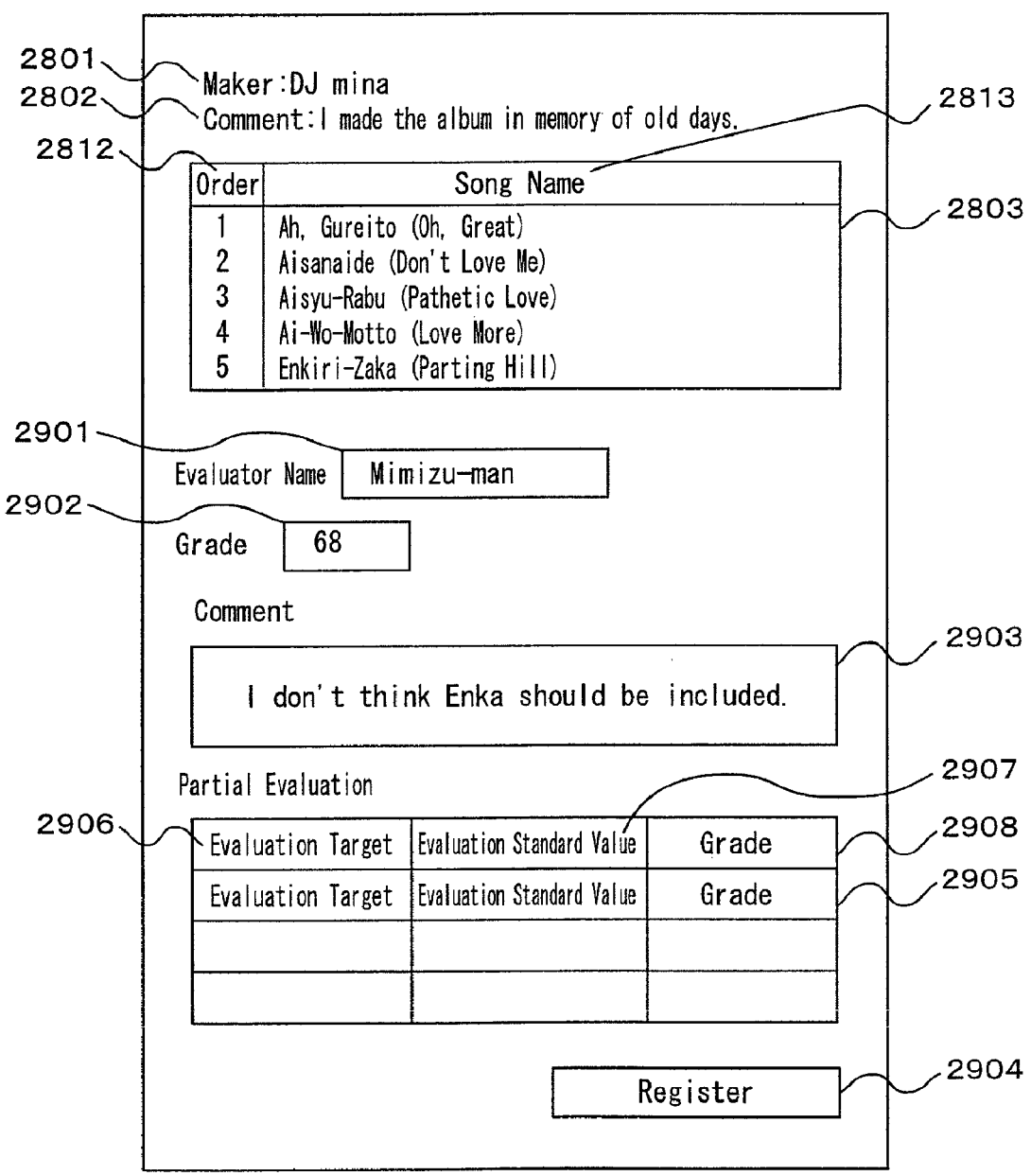
FIG. 22 shows an image of the selection set evaluation device according to the present invention, and illustrates an example of the image by which the evaluating user inputs a partial evaluation concerning the selection set.

Note that, in the foregoing description, the grade that the evaluating user inputs to the grade input area 2902 is subjectively determined, but the input of the grade may be performed as follows: one or a plurality of evaluated selection items included in the selection set are specified via the evaluation inputting means 2106 by the evaluating user so that partial evaluations can be inputted, so as to indicate a basis for determining the grade. FIG. 22 shows an example of an image for inputting such partial evaluations.

In FIG. 22, a partial evaluation input area 2905 is added to the evaluation input image shown in FIG. 21, and a displaying state thereof is shown. The partial evaluation input area 2905 includes: an evaluation target input area 2906 in which the selection item included in the selection set is specified and inputted; an evaluation focus input area 2907 for inputting an evaluation focus which indicates which point of the selection set is focused on upon performing the partial evaluation; and a partial grade input area 2908 for inputting a partial grade indicative of the partial evaluation result.

Note that, examples of the evaluation focus include (a) an order concerning how the selection items included in the selection set are successively disposed, (b) a combination of the selection items, (c) whether the selection item is based on the theme or not when the selection items are songs, (d) a combination ratio of categories of the songs, (e) a combination ratio of tempos of songs, and the like.

Further, the evaluating user can freely make the following decision: (a) whether or not to input all the partial grades which are bases for the grades inputted to the grade input area 2902 by the evaluating user so that a total of the partial grade is identical to the grade inputted to the grade input area 2902, or (b) whether or not to input only the partial evaluation result.

Thus, the example of FIG. 22 shows only three columns, disposed in the partial evaluation input area 2905, in which the partial evaluations are inputted, but the number of the partial evaluations that can be inputted by the evaluating user is not limited to this. For example, there is additionally provided a scroll button for switching the display state so that fourth and more columns can receive inputs of the partial evaluations, thereby inputting new partial evaluations.

Besides, the order 2812 of the selection items displayed in the selection set display area 2803 is inputted to the evaluation target input area 2906. When a desired order 2812 is clicked, a number of the clicked order 2812 to be added to the evaluation target input area 2906 that is being subjected to the input. This makes it easier to perform the input.

Figure 23:
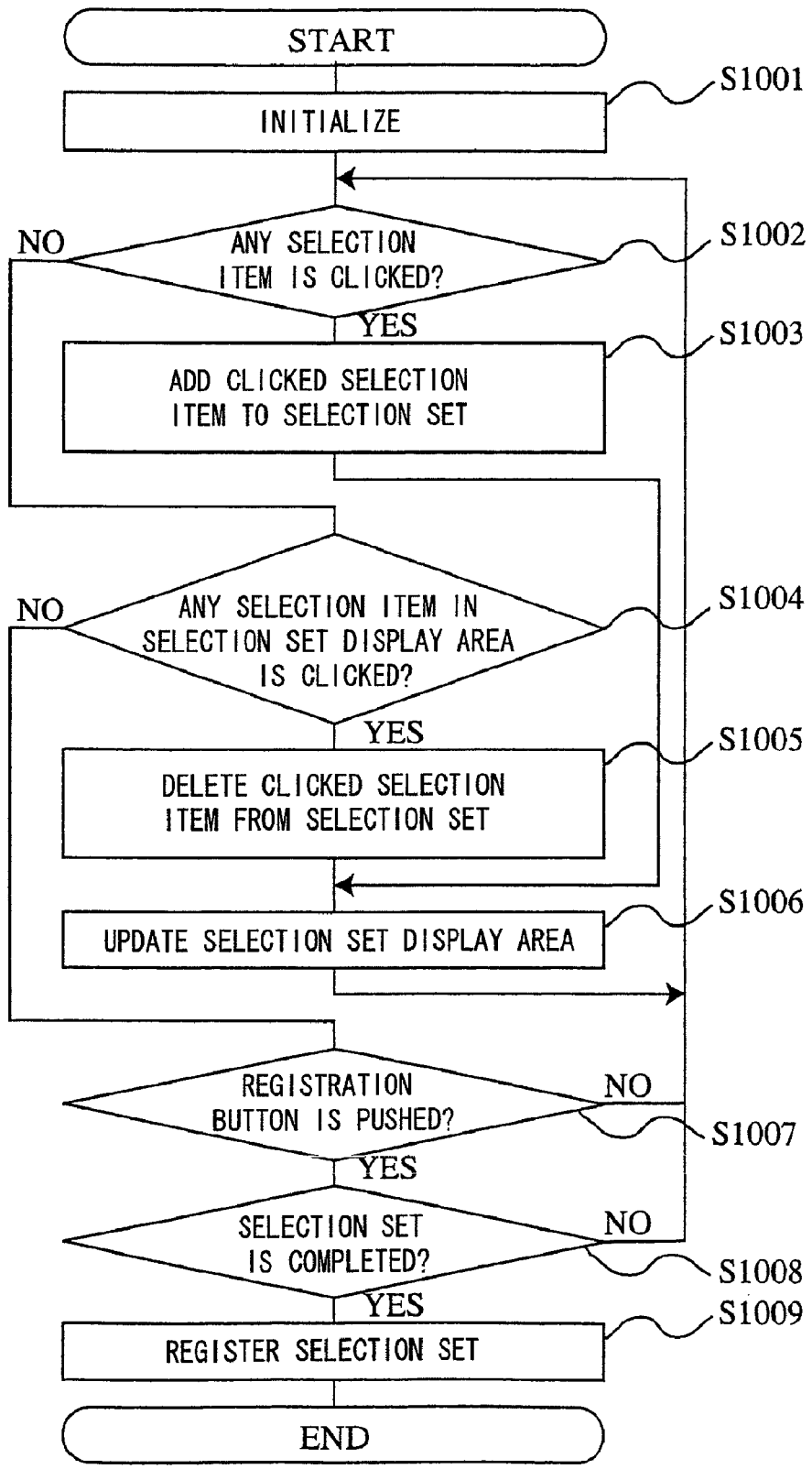
FIG. 23 is a flow chart for illustrating a processing flow in which the selection set is made.

Next, FIG. 23 is a flow chart for illustrating a processing flow in which the selection set is made in the image, exemplified in FIG. 18, by which the selecting user makes the selection set by selecting the indicated selection items.

First, the process is entirely initialized (step 1001; hereinbelow referred to as S1001 for short). In the example shown in FIG. 18, some of the selection items stored in the selection item storing means 2101 are displayed in the selection item indicating area 2601 as a process of S1001, and the selection set display area 2603 and the comment input area 2604 are cleared. Further, the selection set, being made, that is stored in the selection item selecting means 2103, is cleared. Any selection item can be displayed in the selection item indicating area 2601, but it is preferable to display a displayable number of the selection items, stored in the selection item storing means 2101, in the selection item indicating area 2601.

Next, judgment is given on whether the selection item displayed in the selection item indicating area 2601 has been clicked or not (S1002). In a case where the selection item has been clicked, the process proceeds to S1003, and in a case where the selection item has not been clicked, the process proceeds to S1004.

In the case where the selection item has been clicked in S1002, the selection item is added to the selection set being made (S1003). Thereafter, the process proceeds to S1006.

In the case where the selection item has not been clicked in S1002, judgment is given on whether the selection item, included in the selection set, that is displayed in the selection set display area 2603, has been clicked or not (S1004). In a case where the selection item has been clicked, the process proceeds to S1005, and in a case where the selection item has not been clicked, the process proceeds to S1007.

In the case where the selection item has been clicked, the selection item is deleted from the selection set being made (S1005).

Next, after the processes S1003 and S1005, the display of the selection set display area 2603 is updated in accordance with a content of the selection set being made (S1006). Thereafter, the process returns to S1002.

In the case where the selection item has not been clicked in S1004, judgment is given on whether the registration button 2605 has been pushed or not (S1007). In a case where the registration button 2605 has been pushed, the process proceeds to S1008. In the case where the registration button 2605 has not been pushed, the process returns to S1002.

In the case where the registration button 2605 has been pushed in S1007, judgment is given on whether the selection set being made has been completed or not (S1008). That is, when at least one selection item is not included in the selection set, it is judged that the selection set has not been completed. In a case where a predetermined number of selection items are included in the selection set, whether it is regarded as completion or not is a matter of design variation. In the case where the selection set being made has been completed, the process proceeds to S1009. In the case where the selection set being made has not been completed, the process returns to S1002.

In the case where the selection set being made has been completed in S1008, the selection set being made is registered and stored in the selection set storing means 2104 in combination with the comment inputted to the comment input area 2604 (S1009), and the process is finished.

Figure 24:
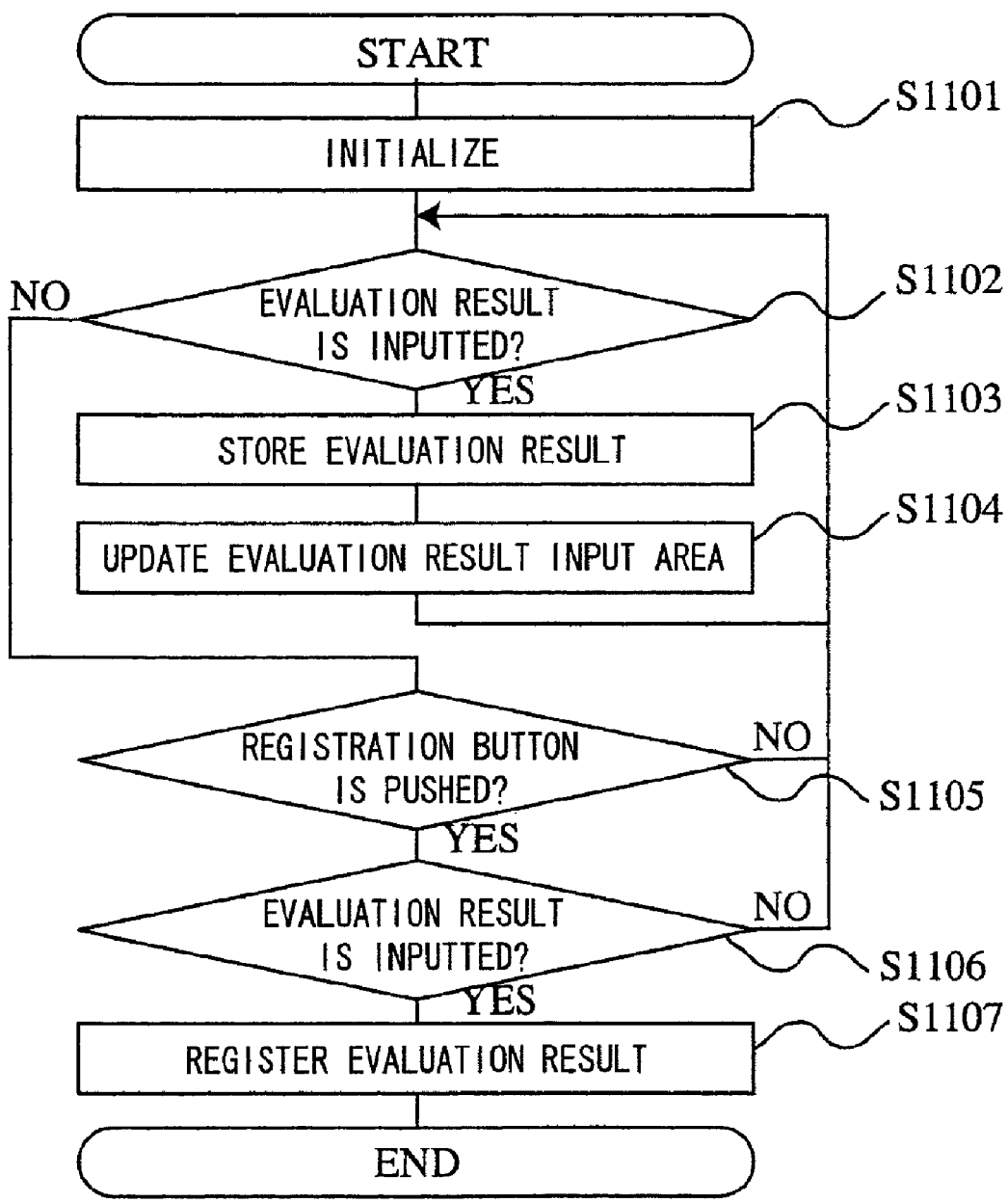
FIG. 24 is a flow chart for illustrating a processing flow in which the evaluation result is inputted.

Next, FIG. 24 is a flow chart for illustrating a processing flow in which the evaluation result is inputted in the image, exemplified in FIG. 21, by which the evaluating user inputs the evaluation of the selection set indicated by the selection set indicating means 2105.

First, the process is entirely initialized (S101). In the example shown in FIG. 21, a content of the selection set that is to be evaluated is referred to in accordance with the selection set storing means 2104, and the maker 2403 is displayed in the maker display area 2801 and the comment 2404 is displayed in the comment display area 2802. Further, information concerning the selection item included in the selection set is referred to in accordance with the selection item storing means 2101 so as to be displayed in the selection set display area 2803. Further, the evaluator name input area 2901, the grade input area 2902, and the comment input area 2903 are cleared.

Hereinbelow, areas for inputting the evaluation results, such as the evaluator name input area 2901, the grade input area 2902, and the comment input area 2903, are collectively referred to as an evaluation result input area.

Next, judgment is given on whether the evaluation result has been inputted to the evaluation result input area or not (S1102). In a case where the evaluation result has been inputted, the process proceeds to S1103, and in a case where the evaluation result has not been inputted, the process proceeds to S1105.

In the case where the evaluation result has been inputted in S1102, the inputted evaluation result is stored (S1103). The inputted evaluation result may be stored in a temporary storage area provided in the evaluation inputting means 2106, or may be stored in the respective evaluation result input areas.

After S1103, the display content of the evaluation result input area is updated so as to correspond to the evaluation result inputted in S1103 (S1104). Thereafter, the process returns to S1102.

In the case where the evaluation result has not been inputted in S1102, judgment is given on whether the registration button 2904 has been pushed or not (S1105). In a case where the registration button 2904 has been pushed, the process proceeds to S1106. In a case where the registration button 2904 has not been pushed, the process returns to S1102.

In the case where the registration button 2904 is judged to have been pushed, judgment is given on whether an essential matter of the evaluation result has been inputted or not (S1106). As exemplified in FIG. 21, in a case where there are a plurality of evaluation result input areas, it is a matter of design variation which evaluation result input area needs to receive the input. In the case where the essential matter of the evaluation result has been inputted, the process proceeds to S1107. In the case where the essential matter of the evaluation result has not been inputted, the process returns to S1102.

In the case where the essential matter of the evaluation result is judged to have been inputted in S1106, the inputted evaluation result is registered to the evaluation result storing means 2107 (S1107), and the process is finished.

Figure 25:
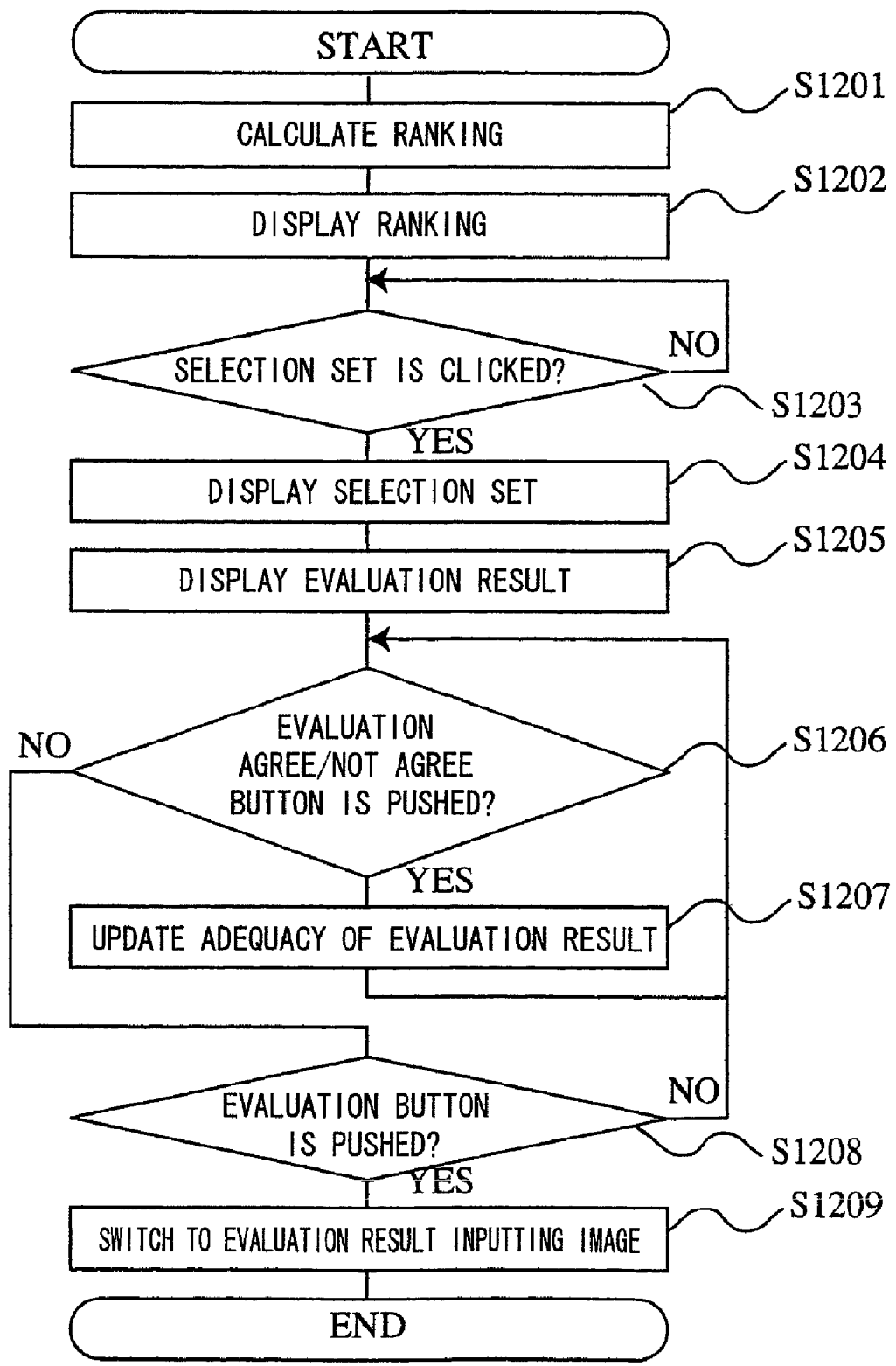
FIG. 25 is a flow chart for illustrating a processing flow in which the detail evaluation is confirmed.

Lastly, referring to (a) the example of the evaluation result informing image shown in FIG. 19 and (b) the example where the detail evaluation content of the selection set shown in FIG. 20 is displayed, FIG. 25 illustrates a processing flow in which the ordinary user confirms the detail evaluation content of the selection set by checking the ranking of the selection set.

First, the selection set ranking means 2109 sorts the selection sets stored in the selection set storing means 2104 in descending order of the total evaluation results derived, by the total evaluation deriving means 2108, from the evaluation results, made with respect to the selection sets, that are stored in the evaluation result storing means 2107 (S1201). A generally-known sorting algorithm is used, so that detail description thereof is omitted.

Next, the evaluation result informing means 2110 displays the selection set in accordance with the ranking derived in S1201 (S1202). A concrete example of the display is as illustrated in FIG. 19.

Next, judgment is given on whether the selection set displayed in S1202 has been clicked or not (S1203). In a case where the selection set has been clicked, the process proceeds to S1204. In a case where the selection set has not been clicked, the process returns to S1203.

In the case where the selection set has been clicked in S1203, the evaluation result informing means 2110 displays the detail content of the selection set by referring to the selection set storing means 2104 and the selection item storing means 2101 (S1204). A concrete example of the display is as exemplified by the maker display area 2801, the comment display area 2802, and the selection set display area 2803 shown in FIG. 20.

Next, the evaluation result informing means 2110 displays the detail evaluation result of the selection set that is stored in the evaluation result storing means 2107 (S1205). A concrete example thereof is as exemplified by the total evaluation result display area 2804, the lowest grade display area 2805, the highest grade display area 2806, and the evaluation result display area 2807, that are shown in FIG. 20.

Next, judgment is given on whether the evaluation agree button 2809 or the evaluation not-agree button 2810, shown in FIG. 20, that is the evaluation result adequacy setting means 2111, has been pushed or not (S1206). In a case where each of the buttons has been pushed, the process proceeds to S1207. In a case where each of the buttons has not been pushed, the process proceeds to S1208.

In the case where the evaluation agree button 2809 or the evaluation not-agree button 2810 has been pushed, the evaluation result adequacy setting means 2111 updates the adequacy of the evaluation result, concerning the selection set stored in the evaluation result storing means 2107, in accordance with a type of the pushed button (S1207). An example of how the adequacy is updated is as described above. After performing the process of S1207, the process returns to S1206.

In S1206, in the case where neither the evaluation agree button 2809 nor the evaluation not-agree button 2810 have been pushed, judgment is given on whether the evaluation input button 2811 has been pushed or not (S1208). In a case where the evaluation input button 2811 has been pushed, the process proceeds to S1209. In a case where the evaluation input button 2811 has not been pushed, the process returns to S1206.

In the case where the evaluation input button 2811 has been pushed in S1207, the display image is switched to the image, shown in FIG. 21, by which the evaluation is inputted (S1209), and the process is finished.

The following description will discuss still another embodiment referring to FIG. 26 to FIG. 40.

Figure 26:
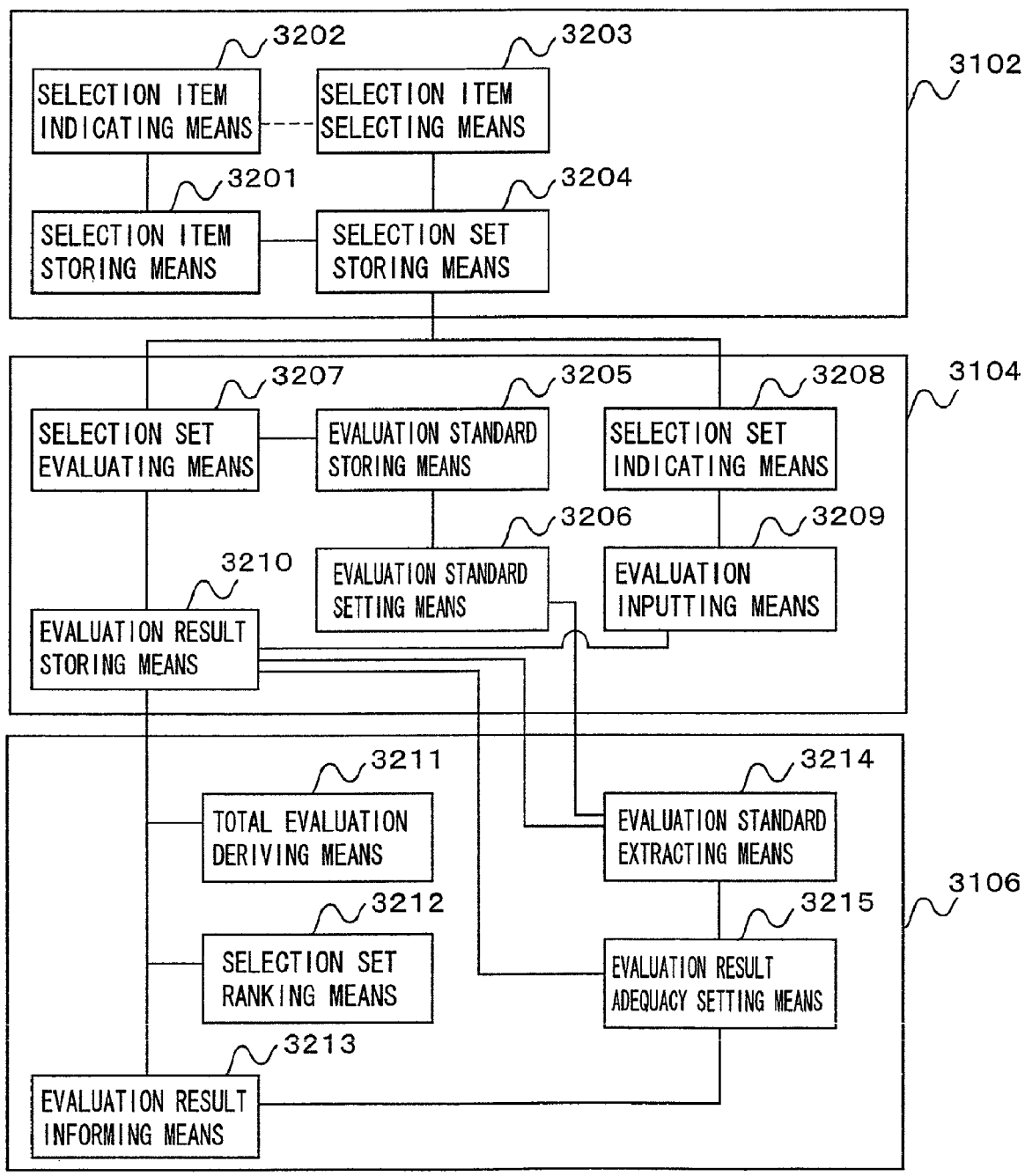
FIG. 26 is a block diagram showing an arrangement of one embodiment of the selection set evaluation device according to the present invention.

FIG. 26 is a block diagram showing an arrangement of one embodiment of the selection set evaluation device of the present invention.

In FIG. 26, 3102 is a selection item indicating section which indicates selection items to a selecting user who makes selection so that the selecting user specifies desired selection items so as to make a combination of the specified selection items as a selection set, and 3104 is a selection set evaluating section which derives evaluation results, concerning the selection set made by the selection item indicating section 3102, in accordance with a certain evaluation rule, and indicates the selection set to an evaluating user who makes an evaluation so that the evaluating user inputs the evaluation, and collects the evaluation results, and 3106 is an evaluation result informing section which informs the evaluation results derived or collected by the selection set evaluating section 3104 to the selecting user or an ordinary user who refers to or purchases the selection set.

Next, 3201 is selection item storing means for storing information concerning target selection items, and 3202 is selection item indicating means for indicating one selection item or more selection items of the selected items stored in the selection item storing means 3201 to the selecting user, and 3203 is selection item selecting means for setting a selection or non-selection state of each selection item indicated by the selecting user with the selection item indicating means 3202, and 3204 is selection set storing means for storing a combination of the selection items selected by the selecting user with the selection item selecting means 3203, and the respective means 3201 to 3204 constitute the selection item indicating section 3102.

Next, 3205 is evaluation rule storing means for storing an evaluation rule by which whether the combination of the selection items included in the selection set is preferable or not is evaluated, and 3206 is evaluation rule setting means which sets the evaluation rule, stored in the evaluation rule storing means 3205, by adding or deleting or rectifying the evaluation rule, and 3207 is selection set evaluating means for evaluating the selection set, stored in the selection set storing means 3204, in accordance with the evaluation rule stored in the evaluation rule storing means 3205, and 3208 is selection set indicating means for indicating the selection set stored in the selection set storing means 3203 to the evaluating user, and 3209 is evaluation inputting means by which the evaluating user inputs the evaluation of the selection set indicated by the selection set indicating means 3208, and 3210 is evaluation result storing means which stores (a) the evaluation result made by the selection set evaluating means 3207 and (b) the evaluation result, made by the evaluating user, that has been inputted by the evaluation inputting means 3209, and stores the adequacy of the evaluation result, set by evaluation result adequacy setting means 3215 described later, in combination with a corresponding evaluation result, and the respective means 3205 to 3210 constitute the selection set evaluating section 3104.

Further, 3211 is total evaluation deriving means for deriving a total evaluation result in accordance with a plurality of evaluation results of a certain selection set that is stored in the evaluation result storing means 3210, and 3213 is selection set ranking means for ranking a plurality of selection sets in accordance with the evaluation results stored in the evaluation result storing means 3210 or the total evaluation result derived by the total evaluation deriving means 3211, and 3213 is evaluation result informing means which informs the evaluation results, stored in the evaluation result storing means 3210, or the total evaluation result, derived by the total evaluation deriving means 3211, to the selecting user or the ordinary user, in accordance with the ranking determined by the selection set ranking means 3212, and 3214 is evaluation rule extracting means which extracts a new evaluation rule from at least either (a) the evaluation result, stored in the evaluation result storing means 3210, that has been inputted by the evaluating user, or (b) adequacy of the evaluation result that has been set by evaluation result adequacy setting means 3215 described later, so as to add the new evaluation rule to the evaluation rule storing means 3205 via the evaluation rule setting means 3206 or update the evaluation rule via the evaluation rule setting means 3206, and 3215 is the evaluation result adequacy setting means by which the ordinary user sets the adequacy of the evaluation result which is information used so that the evaluation rule setting means 3206 rectifies the evaluation rule stored in the evaluation rule storing means 3205 or used so that the evaluation rule extracting means 3214 extracts the new evaluation rule, and the respective means 3211 to 3215 constitute the evaluation result informing section 3106.

The foregoing components may be directly connected to each other, or they may be connected to each other via a network using a telephone line, a radio communication, the Internet, and the like. Further, a plurality of recommended selection indicating sections 3102 may be simultaneously used by a plurality of selecting users, or a plurality of selection set evaluating sections 3104 may be simultaneously used by a plurality of evaluating users, or a plurality of evaluation result informing sections 3106 may be simultaneously used by a plurality of ordinary users.

Further, it is needless to say that: it does not matter whether the storing means 3201 and 3204 store information temporarily or continuously, and it is possible to select the temporary storage or continuous storage as required, and it does not matter whether the storing means 3201, 3204, 3205, and 3210 are internally provided or externally provided or detachably provided.

Figure 27:
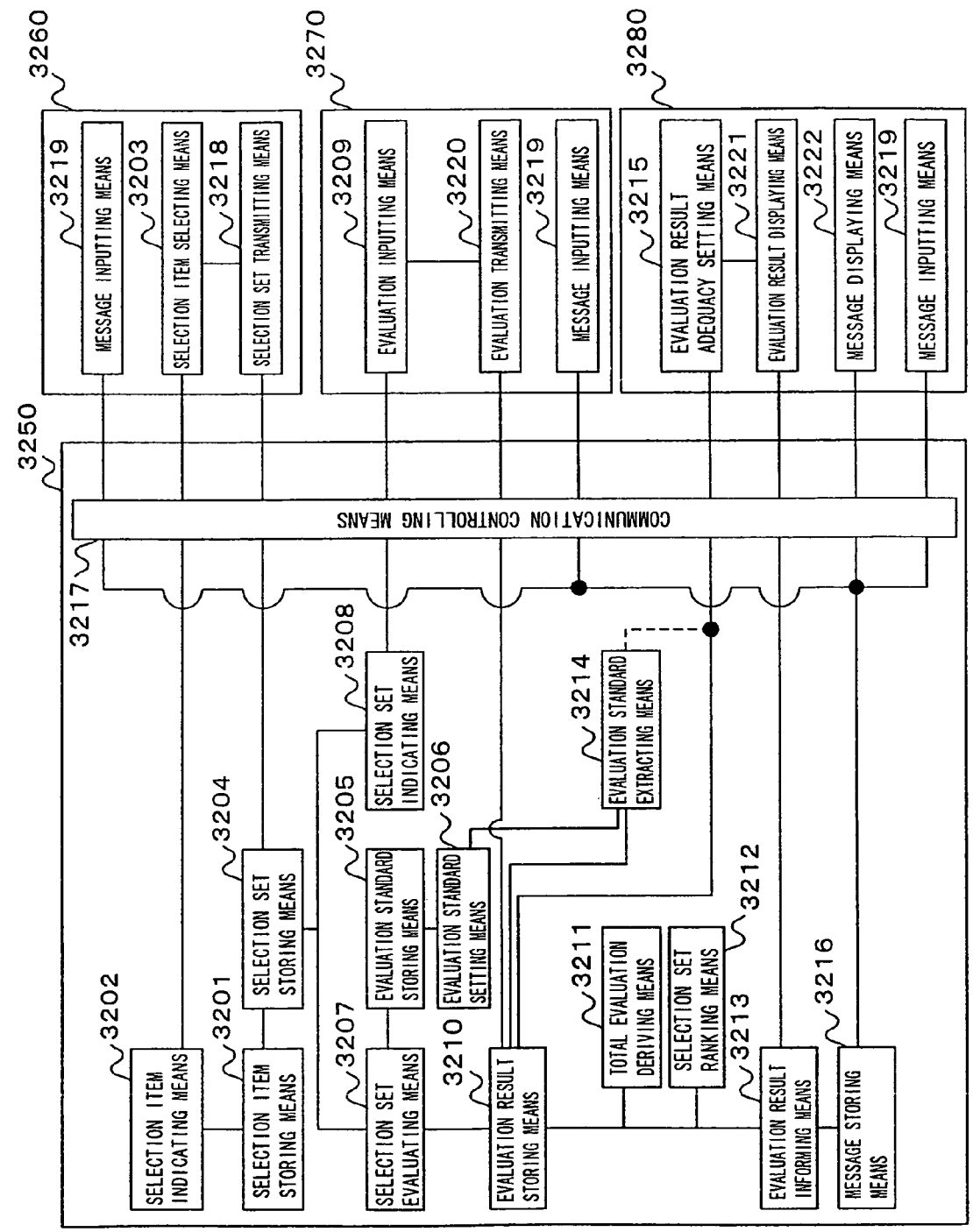
FIG. 27 is a block diagram showing an arrangement of one embodiment of the selection set evaluating system according to the present invention.

FIG. 27 is a block diagram showing an arrangement of one embodiment of the selection set evaluating system of the present invention. This is basically the same arrangement as the arrangement shown in FIG. 26, but is different in that: this system includes: a selection set evaluation result collecting device 3250 for collecting the evaluation results made by the evaluating user; a selection set making device 3260 for making the selection set; a selection set evaluation inputting device 3270 for inputting the evaluation of the selection set; and an evaluation result using device 3280 by which the ordinary user refers to and uses the evaluation results collected by the selection set evaluation result collecting device 3250.

In FIG. 27, 3201 to 3215 are the same as in FIG. 26, so that description thereof is omitted. In the selection set evaluation result collecting device 3250, 3216 is message storing means for storing a message, concerning the selection set and the evaluation result, that has been received from (a) the selection set making device 3260, or (b) the selection set evaluation inputting device 3270, or (c) the evaluation result using device 3280, and 3217 is communication controlling means for controlling communication with (a) the selection set making device 3260, (b) the selection set evaluation inputting device 3270, and (c) the selection set evaluation inputting device 3280, that are connected to the selection set evaluation result collecting device 3250.

Further, in the selection set making device 3260, 3218 is selection set transmitting means for transmitting the selection set made by the selection item selecting means 3203 to the selection set evaluation result collecting device 3250, and 3219 is a message inputting device for inputting a message such as a comment concerning the selection set and the evaluation result so as to transmit the message to the selection set evaluation result collecting device 3250. Note that, the message inputting devices 3219 are provided in the selection set evaluation inputting device 3270 and the selection set evaluation inputting device 3280.

Further, in the selection set evaluation inputting device 3270, 3220 is evaluation transmitting means for transmitting the evaluation inputted by the evaluation inputting means 3209 to the evaluation result collecting device 3250. In the selection set evaluation inputting device 3280, 3221 is evaluation result displaying means for displaying the evaluation result received from the evaluation result informing means 3213, and 3222 is message displaying means for displaying a message received from the message storing means 3216.

Note that, in combination with the selection item indicating means 3202, the communication controlling means 3217 functions as selection item transmission controlling means for controlling transmission of information concerning the selection item to the selection set making device 3260. That is, the information concerning the selection item indicated by the selection item indicating means 3202 is transmitted to the selection set making device 3202.

Further, in combination with the selection set indicating means 3208, the communication controlling means 3217 functions as selection set transmission/reception controlling means which receives the selection set from the selection set making device 3260 and transmits the selection set to the selection set evaluation inputting device 3270. That is, the selection set transmitted by the selection set transmitting means 3218 is received, and the selection set is stored in the selection set storing means 3204, and the selection set indicated by the selection set indicating means 3208 is transmitted to the selection set evaluation inputting device 3270.

Further, the communication controlling means 3217 functions as selection set evaluation reception controlling means, and receives the evaluation transmitted from the evaluation transmitting means 3220, and stores the evaluation in the evaluation result storing means 3210.

A message inputted by the selecting user or the evaluating user or the ordinary user via message inputting means 3208 provided in the selection set making device 3260, the selection set evaluation inputting device 3270, and the evaluation result using device 3280 is received by the communication controlling means 3217, and is stored in the message storing means 3216. The message storing means 3216 causes the evaluation result informing means 3213 to transmit the message, stored corresponding to the selection set and the evaluation result, to the evaluation result using device 3280.

In this manner, it is possible to support the communication performed by exchanging a message concerning the selection set and the evaluation result between the selecting user, the evaluating user, and the ordinary user.

In FIG. 27, only one selection set making device 3260 and only one selection set evaluation inputting device 3270 and only one evaluation result using device 3280 are illustrated, but a plurality of selection set making devices 3260 and a plurality of selection set evaluation inputting devices 3270 and a plurality of evaluation result using devices 3280 may be connected to the selection set evaluation result collecting device 3250 so that a network using a telephone line, a radio communication, the Internet, and the like is constituted. By arranging in this manner, it is possible to make the selection sets and collect the evaluations of the selection sets so that a wide range of users are covered.

Further, it is not necessary that the selection set making device 3260 and the selection set evaluation inputting device 3270 and the evaluation result using device 3280 are separately provided, but they may be combined with each other as a single terminal device. For example, when the selection set making device 3260 and the evaluation result using device 3280 are combined with each other as a single terminal device, the selection set and the evaluation result that have been received from the selection set evaluation result collecting device 3250 can be referred to so as to make a new selection set. This can be realized also by a program which causes a device such as a typical personal computer to function as the selection set making device 3260, the selection set evaluation inputting device 3270, and the evaluation result using device 3280.

FIG. 28 shows an example of the selection item stored in the selection item storing means 3201. FIG. 28 exemplifies music data. In FIG. 28, 3301 is an ID which is identification information of the selection item, and 3302 is a song name, and 3303 is an artist name, and 3304 is a category indicative of a song type. Thus, a single selection item is constituted of the ID 3301, the song name 3302, the artist name 3303, and the category 3304, that correspond to each other so as to make a combination. More generally speaking, one selection item is constituted of identification information, content information, and attribute information.

FIG. 29 shows an example of the selection set stored in the selection set storing means 3204. The ID 3301 of the selection item is stored in accordance with the order 3402 so as to correspond to a selection set number 3401 uniquely added to distinguish one selection set from other selection sets. In the example shown in FIG. 29, the selection items exemplified in FIG. 28 are combined with each other. Further, a maker 3403 who made the selection set and a comment 3404 added to the selection set are stored in combination. In this example, a name of the maker 3403 is stored as character string data, but this may be stored in such a manner that: a managing number is added to the name of the maker so as to be stored, and the selection set storing means 3104 stores the managing number.

FIG. 30 shows an example of the evaluation rule, used to evaluate the selection set, which is stored in the evaluation rule storing means 3205. In FIG. 30, 3501 is an evaluation rule number uniquely allocated in sequence to the evaluation rule stored in the evaluation rule storing means 3205, and 3502 is an evaluation rule type which indicates a type of the evaluation rule, in other words, indicates an evaluation focus specifying a certain point of the selection set upon evaluation, and 3503 is an evaluation pattern indicative of a concrete content of the evaluation rule, and 3504 is a grade, set for each evaluation value, that is used to calculate the evaluation result of the selection set. Thus, one evaluation rule is constituted of the evaluation rule number 3501, the evaluation rule type 3502, the evaluation pattern 3503, and the grade 3504, that are correspondingly combined with each other.

Note that, in FIG. 30, the respective evaluation rules are categorized in accordance with the evaluation rule type 3502, but the evaluation rule type 3502 may be omitted by writing a type of the evaluation rule in the evaluation pattern 3503.

The selection set evaluating means 3207 judges whether or not the evaluation rule stored in the evaluation rule storing means 3205 corresponds to the selection set that is targeted. When the evaluation rule corresponds to the selection set, the selection set evaluating means 3207 evaluates the selection set in accordance with a calculation result calculated by using the grade 3504, for example, by adding the grades 3504 to each other.

The following description concretely exemplifies the evaluation rule shown in FIG. 30. An evaluation rule 3505 whose evaluation rule number 3501 is 1 is an evaluation rule for making an evaluation in terms of a specific order of the selection items included in the selection set. The evaluation rule 3505 shows that: when the selection item whose ID 3301 is 7 and the selection item whose ID 3301 is 8 are sequentially selected, the grade 3504 is 10.

An evaluation rule 3506, another example, whose evaluation rule number 3501 is 3 shows that: when the selection item whose ID 3301 is 1, the selection item whose ID 3301 is 4, and the selection item whose ID 3301 is 3 are sequentially selected, the grade 3504 is 7. As exemplified, successive selection items can take arbitrary numbers.

Further, it is not necessary that the order is in sequence, but the evaluation pattern 3503 may be such that: arbitrary selection items are included therebetween.

An evaluation rule 3507, still another example, whose evaluation rule number 3501 is 4 is an evaluation rule for making an evaluation in terms of a specific combination of the selection items included in the selection set. This evaluation rule shows that: when the selection item whose artist name 3303 is "Masahiro Hondo" and the selection item whose artist name 3303 is "Toshihiro Kawahara" are included in the selection set, the grade 3504 is 5.

Note that, in the evaluation rule for evaluating the combination, when a plurality of selection items which can be combined with each other exist in the selection set, it is possible to make such an interpretation that all the combinations of the respective selection items are to be evaluated, so that grade may be counted by adding grades of all the combinations, or it is possible to make such an interpretation that the combination is a single combination, so that the grade may be counted with respect to any one of the combinations.

For example, as to the evaluation rule 3507 whose evaluation rule number 3501 is 4, the target selection set includes two selection items whose artist name 3303 is "Masahiro Hondo" and two selection items whose artist name 3303 is "Toshihiro Kawahara". When this is interpreted as four combinations, the grade is 20, and when this is interpreted as a single combination, the grade is 5.

In this manner, as the number of the target selection items included in the selection set is larger, the grade is further increased, based on the former interpretation, so that as more songs are covered, the theme is more emphasized, which is suitable for making an evaluation taking each arrangement into consideration. Further, even though there are many covered selection items included in the selection set, the grade does not change, based on the latter interpretation. Thus, in case of a personal computer, even when a plurality of the same parts are included, it is possible to give the same evaluation to them when there is no change in a function, so that this is suitable for making an evaluation by taking all the selection sets into consideration. Which interpretation is to be employed may be set for each evaluation rule, or may be set by means of the selection set evaluating means 3207.

Further, other evaluation rules 3507, 3508, and 3509, that have values of 7, 8, and 9 respectively in terms of the evaluation rule numbers, are evaluation rules for comparing the selection items, included in the selection set, in terms of the attribute so as to evaluate the selection set. The evaluation rule 3508 whose evaluation rule number 3501 is 7 shows that: when n number of the selection items whose song name 3302 begins with a word "Ai (love)", the grade is n. Further, another evaluation rule 3508 whose evaluation rule number 3501 is 8 shows that: when n number of the selection items whose category 3304 is "Japanese blues (Enka)", the grade is n. Further, the evaluation rule 3509 whose evaluation rule number 3501 is 9 shows that: when a ratio of (a) selection items whose category 3304 is "pops" and (b) selection items whose category 3304 is "Western music" that are included in the selection set is 2:1, the grade is 5. It is possible to evaluate balance of a combination of the selection items included in the selection set in accordance with the evaluation rule for evaluating the ratio.

The evaluation rule described above is stored in the evaluation rule storing means 3205, but the evaluation rule setting means 3206 adds or deletes the evaluation rule as rectification so as to reset the evaluation rule during a process in which the selection set evaluation device of the present invention is operated, so that it is possible to make the evaluation rule converge to a generally appropriate evaluation rule.

It is not necessary that the selection set evaluating means 3207 uses all the evaluation rules stored in the evaluation rule storing means 3205 upon evaluating the selection set. For example, when only the evaluation rules based on a specific theme are used, it is possible to obtain an evaluation from a specific view point, for example, the evaluation rule can be changed according to the intended use of a personal computer which is to be built.

Referring to FIG. 28 to FIG. 30, the following description will give an example where the selection set evaluating means 3207 evaluates the selection set shown in FIG. 29 in accordance with the evaluation rules that have values of 1 to 9 in terms of the evaluation rule numbers 3501 shown in FIG. 30. In FIG. 29, selection items having values of 2 and 3 in terms of the order 3402 are sequentially selected with them having values of 7 and 8 in terms of the ID 3301, so that the evaluation rule 3505 whose evaluation rule number 3501 is 1 is applied. Selection items having values of 1 and 2 in terms of the order 3402 correspond to a combination of (a) a selection item whose artist name 3303 is "Masahiro Hondo" and (b) a selection item whose artist name 3303 is "Toshihiro Kawahara", so that the evaluation rule 3507 whose evaluation rule number 3501 is 4 is applied. Selection items having values of 1 and 3 in terms of the order 3402 correspond to a combination of (a) a selection item whose artist name 3303 is "Masahiro Hondo" and (b) a selection item whose artist name 3303 is "Toshihiro Kawahara", so that the evaluation rule 3507 whose evaluation rule number 3501 is 4 is applied. Selection items having values of 2 and 4 in terms of the order 3402 are such that the song name 3302 begins with a word "Ai (love)", so that the evaluation rule 3508 whose evaluation rule number 3501 is 7 is applied. Selection items having values of 4 and 5 in terms of the order 3402 are such that the category 3304 is "Japanese Blues (Enka)", so that the evaluation rule 3509 whose evaluation rule number 3501 is 8 is applied. As a result, the grade of the selection set is as follows: 10+5+5+2+2=24.

FIG. 31 shows an example of the evaluation result stored in the evaluation result storing means 3210. One evaluation result or a plurality of evaluation results 3601 are stored so as to correspond to the selection set number 3401 shown in FIG. 29. In the example of FIG. 31, the evaluation result 3601 includes: an evaluation number 3602 uniquely added to distinguish one evaluation result 3601 from other evaluation results 3601; an evaluator 3603 which is a name of the user inputting the evaluation result 3601; a comment 3604 added to the evaluation result 3601; a grade 3605 described later; and a content of the adequacy 3606 of the evaluation result 3601 that is set by the evaluation result adequacy setting means 3215.

In this example, a name of the maker 3603 is stored as character string data, but when data such as a number for managing a name of the evaluator is additionally prepared as described above, the managing data may be stored.

The evaluation result storing means 3210 stores the evaluation result made by the selection set evaluating means 3207 and the evaluation result, made by the evaluating user, that has been inputted by the evaluation inputting means 3209. Like a value "(system)" of the evaluator 3603 in the evaluation result 3607 shown in FIG. 31, special data such as a predefined mark which indicates that the evaluation result is made by the selection set evaluating means 3207 is included in the evaluation result, so that the evaluation result made by the selection set evaluating means 3207 is distinguished from the evaluation result inputted by the evaluating user with the evaluation inputting means 3209.

The grade 3605 is a value indicative of points, derived by the selection set evaluating means 3207, in terms of the evaluation result made by the selection set evaluating means 3207, and is an arbitrary value, inputted by the evaluating user in accordance with his/her unique evaluation given to the selection set, in terms of the evaluation result inputted by the evaluating user with the evaluation inputting means 3209. In this example, the grade 3605 inputted by the evaluating user ranges from 0 to 100, but the range of the grade is not limited to this. Further, the range of the grade of the evaluation result made by the selection set evaluating means 3207 is not limited.

The adequacy 3606 is a value for indicating the adequacy of the evaluation result 3601. As to the adequacy 3606, a value in a initial state is 1.0, and the value is updated in accordance with a content that the user using the evaluation result inputted by means of the evaluation result adequacy setting means 3215. The using method and the updating method of the adequacy 3606 are more concretely exemplified later.

The following description will discuss an example where the total evaluation deriving means 3211 derives the total evaluation result corresponding to the evaluation result 3601 shown in FIG. 31.

As described above, the grade of the evaluation result concerning a certain selection set that has been made by the selection set evaluating means 3207 is calculated by adding the grades 3504 (see FIG. 30) of the evaluation rule applied to the selection set, so that it is impossible to specify a range of a value of the grades. While, a range of a value of the grade inputted by the evaluating user is set in advance, so that it is inappropriate that these grades are compared with each other in the same manner, and there is a possibility that the ordinary user is confused.

Then, the total evaluation result is derived from a plurality of evaluation results concerning a certain selection set, so that it is possible to obtain the following advantage: even when a large quantity of evaluations are made with respect to the selection set, the ordinary user can appropriately grasp how the selection set is entirely evaluated, without referring to individual evaluation results, by referring the total evaluation result.

As an example of the deriving method, it is preferable to use the following method: an average value of the evaluation results made by the evaluating user and the grade which is the evaluation result derived by the selection set evaluating means 3207 are added to each other so as to obtain the grade of the total evaluation result.

Note that, when the grade 3504 for each evaluation rule stored in the evaluation rule storing means 3205 is set so that a value of the grade which is the evaluation result derived by the selection set evaluating means 3207 is relatively lower than a maximum value of the grade which is the evaluation result made by the evaluating user, it is possible to obtain such a total evaluation result that: the evaluation result made by the evaluating user is mainly used and the evaluation result derived by the selection set evaluating means 3207 is subsidiarily used.

Further, a weighted average of (a) an average of the grade which is an evaluation result made by the evaluating user and (b) a grade which is an evaluation result derived by the selection set evaluating means 3207 may be regarded as the total evaluation result. In this case, the weight may be a predetermined value, but when the weight is made to change according to the number of evaluation results made by the evaluating user, the evaluation is performed as follows: the evaluation results made by the selection set evaluating means 3207 are emphasized when there are few evaluation results made by the evaluating user, and the evaluation results made by the evaluating user are emphasized when there are few evaluation results made by the selection set evaluating means 3207, so that it is possible to derive the total evaluation result in such a manner that the selection set evaluating means 3207 subsidiarily derives the total evaluation result when there are few evaluation results made by the evaluating user.

For example, in FIG. 31, as to the selection set whose selection set number 3401 is 1, the evaluation result 3607 whose evaluation number 3602 is 1 is an evaluation result made by the selection set evaluating means 3207, and its grade 3605 is 24. Further, each of (a) an evaluation result 3608 whose evaluation number 3602 is 2, (b) an evaluation result 3609 whose evaluation number 3602 is 3, and (c) an evaluation result 3610 whose evaluation number 3602 is 4, is the evaluation result made by the evaluating user, and grades thereof are respectively 92, 40, and 80. Thus, the grade which is the total evaluation result obtained in accordance with the foregoing manner is as follows: (92+40+80)/3+24=94.67.

Further, when the total evaluation result is derived, it is possible to use a value obtained by multiplying the grades of the respective evaluation results 3605 by a value of the adequacy 3606. In this manner, the total evaluation result is derived by using the adequacy, so that it is possible to obtain such a total evaluation result that: the evaluation result whose adequacy is set to high is emphasized.

For example, the total evaluation result of the selection set, shown in FIG. 31, whose selection set number 3401 is 1 is as follows: the adequacy of the evaluation result 3607 whose evaluation number 3602 is 1 is 1.0, and the adequacy of the evaluation result 3608 whose evaluation number 3602 is 2 is 1.0, and the adequacy of the evaluation result 3609 whose evaluation number 3602 is 3 is 0.7, and the adequacy of the evaluation result 3610 whose evaluation number 3602 is 4 is 1.2. Thus, the total evaluation result is (92×1.0+40×0.7+80×1.2)/3+24×1.0=96.

Another example of how the total evaluation result is derived is as follows: after calculating a normalized grade in accordance with a grade which is the evaluation result derived by the selection set evaluating means 3207 so that a range of the grade, i.e. the evaluation result, derived by the selection set evaluating means 3207 corresponds to a range of a grade, i.e. the evaluation result, inputted by the evaluating user, the normalized grade is used as the evaluation result derived by the selection set evaluating means 3207, and a grade which is the total evaluation result is obtained by averaging grades each of which is an evaluation result concerning a certain selection set. The range of the grade which is the evaluation result derived by the selection set evaluating means 3207 corresponds to the range of the grade which is the evaluation result inputted by the evaluating user, so that it is possible to compare the grade which is the evaluation result made by the selection set evaluating means 3207 with the grade which is the evaluation result made by the evaluating user under the same condition.

For example, it is assumed that: a minimum value of the range of the grade which is the evaluation result inputted by the evaluating user is Umin and a maximum value thereof is Umax, and a minimum value of the grade which is the evaluation result, derived by the selection set evaluating means 3207, that is one of the evaluation results stored in the evaluation result storing means 3210, is Rmin and a maximum value thereof is Rmax. At this time, a certain selection set is such that: a value P', calculated as P'=(P−Rmin)×(Umax−Umin)/(Rmax−Rmin) with respect to the grade P which is the evaluation result derived by the selection set evaluating means 3207, linearly ranges from Umin as the minimum value to Umax as the maximum value.

Concretely, when it is assumed that the minimum value of the grade which is the evaluation result inputted by the evaluating user is 0 and the maximum value thereof is 100, and the minimum value of the grade which is the evaluation value derived by the selection set evaluating means 3207 is 5 and the maximum value thereof is 60, a grade of the evaluation result 3607 is 24, so that the normalized grade is (24−5)×(100−0)/(60−5)=34.55. Thus, the grade of the evaluation result concerning the selection set whose selection set number 3401 is 1 is as described above, so that the grade of the total evaluation result concerning the selection set whose selection set number 3401 is 1 is (34.55+92+40+80)/4=61.64.

Further, as in the foregoing manner, a value obtained by multiplying the grade of the evaluation results by a value of the adequacy 3606 may be used so as to derive the total evaluation result. In this case, the grade of the evaluation result concerning the selection set whose selection set number 3401 is 1 and the value of the adequacy thereof are as described above, so that the grade which is the total evaluation result concerning the selection set whose selection set number 3401 is 1 is (34.55×1.0+92×1.0+40×0.7+80×1.2)/4=62.64.

Further, the total evaluation result may be derived as follows: distributions of a grade 3605 is calculated in accordance with a statistical technique, and after excluding a grade 3605 having an idiosyncratic value that should be rejected, the total evaluation result is derived in the foregoing manner. Alternatively, an evaluation result in which the adequacy is not more than a predetermined value, that is, an evaluation result in which the adequacy is evaluated low may be excluded. By excluding inappropriate evaluation results in this manner, it is possible to derive a total evaluation result which can appropriately represents entire evaluations concerning the selection set.

Next, FIG. 32 shows an example of a partial evaluation result which is an evaluation result concerning a part of the selection set. The partial evaluation result is the same as the evaluation result in that the evaluating user inputs it by means of the evaluation inputting means 3209, but is different from the evaluation result in that: one selection item or a plurality of selection items, specified by the evaluating user, out of the selection items included in the selection set that are stored in the evaluation result storing means 3210, are evaluated. The partial evaluation result is utilized when the evaluation rule extracting means 3214 extracts a new evaluation rule from the evaluation rules inputted by the evaluating user as described later.

Corresponding to the selection set number 3401 shown in FIG. 29, one or a plurality of partial evaluation results 3701 are stored. In an example shown in FIG. 29, the partial evaluation result 3701 includes: a partial evaluation number 3702 which is a number uniquely added to distinguish one partial evaluation result from other partial evaluation results; an evaluator 3703 which is a name such as a real name and a nickname of the evaluating user who inputs the partial evaluation result; an evaluation target ID 3704 having IDs 3301 that are added to one or a plurality of selection items evaluated in terms of the partial evaluation result; an evaluation rule type 3705 which indicates a type of a combination of the evaluation target IDs 3704 so that the evaluation rule type 3705 corresponds to the evaluation rule type 3502 which indicates a type of the evaluation rule shown in FIG. 30; a grade 3706 of the partial evaluation result; and adequacy 3707 concerning the partial evaluation result set by the evaluation result adequacy setting means 3215.

In this example, contents of the evaluator 3703 and the evaluation rule 3705 are stored as character string data, but when a name of the evaluator and data managing the evaluation rule type are additionally prepared as described above, managing numbers may be correspondingly stored. Further, like the grade 3706 in FIG. 32, a grade having a minus value may be set as the evaluation result.

The following description will discuss an example where the evaluation rule extracting means 3214 extracts the evaluation rule from the partial evaluation result 3701 referring to FIG. 28, FIG. 30, and FIG. 32. The partial evaluation result 3701, shown in FIG. 32, whose partial evaluation number is 1, is such that: the evaluation target IDs 3704 are 4 and 6, and the evaluation rule type 3705 is "combination", and the grade 3706 is 10. In accordance with the partial evaluation result 3701, the evaluation rule extracting means 3214 generates such an evaluation rule that: the evaluation rule type 3502 is "combination", and the evaluation pattern 3503 is "ID=[4,6]", and the grade 3504 is 10. The generated evaluation rule is registered to the evaluation rule storing means 3205 via the evaluation rule setting means 3206 as a new evaluation rule.

In this example, a content of the evaluation target ID 3704 is written on the evaluation pattern 3503 as it is, and there is generated an evaluation rule on which the combination is written, but it is possible to perform the following process: an artist name 3303 "Sayoko Hikawa" of a selection item whose ID 3301 is 4 and an artist name "Hijiri Saekawa" of a selection item whose ID 3301 is 6 are respectively referred to, so that the evaluation rule extracting means 3214 generates an evaluation rule whose evaluation pattern 3503 is "artist name= (Sayoko Hikawa, Hijiri Saekawa)" so as to cover the combination of artist names. This enables extraction of an evaluation rule having an evaluation rule other than the evaluation rules explicitly inputted by the evaluating user.

Further, in this case, there is a possibility that an evaluation rule derived from the partial evaluation result 3701 is different from an evaluation rule intended by the evaluating user, so that the grade 3706 of the partial evaluation result 3701 may be multiplied at a predetermined scale so as to obtain the grade 3504 of the evaluation rule. When the scale is 0.5 for example, the grade 3504 of the generated evaluation rule is 10×0.5=5, so that there is extracted an evaluation rule in which the converted grade 3504 is lower than the evaluation intended by the evaluating user.

Likewise, the category 3304 of the selection item whose ID 3301 is 4 and the category 3304 of the selection item whose ID 3301 is 6 are referred to, as shown in FIG. 32, in accordance with the partial evaluation result 3701, shown in FIG. 32, whose partial evaluation number 3702, and the categories 3304 are identical to each other in "Japanese blues (Enka)", so that the evaluation rule extracting means 3214 may generate an evaluation rule in which: the evaluation rule type 3502 is "attribute", and the evaluation pattern 3503 is "category=n (Enka)". In this case, the grade 3706 of the partial evaluation result 3701 is 10, so that an equation in which n number of selection items corresponding to the evaluation rule type 3502 are multiplied at scale k, such that k×n=10, may be used as the grade 3504 of the evaluation rule.

In this example, two selection items whose category 3304 is Enka are included in the selection set, so that n=2. 5 points are added to each selection item, so that an evaluation rule in which the grade 3504 is set to "5n" is extracted.

Further, the evaluation rule in which the grade 3504 is set to "5n" is regarded as an evaluation rule derived from an evaluation rule in which "ID=[4,6] and the grade 3504 is 10, and a grade further multiplied at a predetermined scale may be used as the grade 3504 as described above. When the scale is 0.5 for example, k=2.5 based on k=10×0.5/n, so that the grade 3504 of the generated evaluation rule is "2.5n".

While, there is a case where an evaluation rule having the same evaluation pattern 3503 as the evaluation rule generated by the evaluation rule extracting means 3214 has already been stored in the evaluation rule storing means 3205. In the foregoing example, the evaluation rule extracted by the evaluation rule extracting means 3214 is such that: the evaluation rule type 3502 is "attribute", and the evaluation pattern 3503 is "category=n (Enka)", and the grade 3504 is "2.5n". On the other hand, like the evaluation rule 3509 shown in FIG. 30, an evaluation rule, having the same evaluation pattern 3503, in which: the evaluation rule type 3502 is "attribute", and the evaluation pattern 3503 is "category=n (Enka)", and the grade 3504 is "n", has already been stored in the evaluation rule storing means 3205.

In this case, the evaluation rule setting means 3206 may overwrite the evaluation rule stored in the evaluation rule storing means 3205 so as to replace the evaluation rule with an evaluation rule generated by the evaluation rule extracting means 3214, or may rectify the evaluation rule stored in the evaluation rule storing means 3205 by referring to the evaluation rule generated by the evaluation rule extracting means 3214. In the latter case, the rectification may be performed so that grades of both the evaluation rules are averaged. In the foregoing example, the grade 3504 of the evaluation rule stored in the evaluation rule storing means 3205 is rectified to "1.75n". Besides this averaging, the grades of both the evaluation rules may be added to each other.

Further, an evaluation rule may be extracted as follows: the grade 3706 of the partial evaluation result 3701 is rectified by utilizing the adequacy 3707 of the partial evaluation result 3701, and the evaluation rule extracting means 3214 uses the rectified grade. In FIG. 32 for example, the partial evaluation result 3701 whose partial evaluation number is 3 is such that: the evaluation target IDs 3704 are 8 and 6, and the evaluation rule type 3705 is "order", and the grade 3706 is 7, and the adequacy 3707 is 0.8. The rectified grade is 7×0.8=5.6 in accordance with the partial evaluation result 3701, so that the evaluation rule extracting means 3214 generates an evaluation rule in which: the evaluation rule type 3502 is "order", and the evaluation pattern 3503 is "ID=[8,6]", and the grade 3504 is 5.6.

Besides this example, it is possible to perform the following setting: the partial evaluation result 3701 whose adequacy 3707 is not more than a certain value is not targeted. Alternately, in a case where a plurality of partial evaluation results 3701 identical to each other in the evaluation target ID 3704 and the evaluation rule type 3705 are stored in the evaluation result storing means 3210, a partial evaluation result 3710 having the largest adequacy 3707 may be targeted by the evaluation rule extracting means 3214 upon generating the evaluation rule. The adequacy 3707 is used in the foregoing manner when the evaluation rule extracting means 3214 extracts the evaluation rule, so that it is possible to extract such an evaluation rule that the partial evaluation result whose adequacy is set to high is emphasized.

The foregoing description illustrates the concrete example where the evaluation rule extracting means 3214 extracts the evaluation rule from the partial evaluation result 3701, but the evaluation rule may be extracted from the evaluation result 3601 concerning the entire selection set, instead of using the partial evaluation result 3701, as shown in FIG. 31. For example, it is assumed that the evaluation result 3601 concerning a certain selection set is constituted of subsets, and it is assumed that all the subsets of selection items included in the selection set are generated so that the respective subsets indicate the respective partial evaluation results. In accordance with this, it is possible that a value, obtained by dividing the grade concerning the evaluation result by the number of the generated subsets, is allocated to each subset as a grade of each evaluation result.

In accordance with the evaluation result constituted of five selection items for example, there are generated 30 subsets each of which is such that: the subset having one selection item is 5, and the subset having two selection items is (5×4)/(2×1)=10, the subset having three selection items is (5×4×3)/(3×2×1)=10, and the subset having four selection items is (5×4×3×2)/(4×3×2×1)=5. However, it is general that (a) an empty set whose element number is 0 and (b) a set equal to an original set are included in a subset of a certain set, but these sets are not included since they are not so important in this case.

Further, when the grade 3605 of an original evaluation result 3601 is 90 with respect to the thirty subsets for example, a grade of 90/30=3 is allocated to each subset. It is possible to obtain a partial evaluation result in which: the evaluation target ID 3704 is a component of the subset, and the evaluation rule 3705 is a predetermined type (for example "combination"), and the grade 3706 is the allocated grade, and the adequacy 3707 is a predetermined value (for example 1.0), in accordance with the subset obtained in the foregoing manner, so that it is possible to extract a plurality of evaluation rules from a single evaluation result as in the example where the evaluation rule is extracted from the partial evaluation result.

As described above, if a large quantity of evaluation results 3601 are collected even when the same grades are allocated to the respective subsets constituting the evaluation result 3601 concerning the entire selection set, there occurs the following condition: when a grade 3605 of an evaluation result 3601 including a certain evaluation rule type 3502 is high, allocated points, concerning the evaluation rule type 3502, that are calculated from the grade 3605, are expected to be high. On the other hand, the allocated points of the evaluation rule type 3502 having little influence on the evaluation result 3601 are diffracted into a high value and a low value, so that the evaluation result 3601 is expected to be counterbalanced. Thus, the evaluation rule extracted from the evaluation result 3601 has more adequacy as more evaluation results are collected.

Alternately, a common rule may be extracted from a plurality of evaluation results 3601 by using a technique known as data mining so as to extract the evaluation rule. For example, it is possible to extract a pattern, such as a combination and an order, common to combinations of selection items included in a selection set in which the grade 3605 of the evaluation result 3601 is high. The common pattern extracted in this manner is regarded as a pattern heightening the evaluation result, and is extracted as an evaluation rule having a high grade. Alternately, a neural network, learned in accordance with a plurality of evaluation results, that outputs a grade with respect to an inputted selection set, may be generated by using a technique known as a neural network. Further, with respect to the evaluation rule extracted in this manner, the adequacy 3606 of the evaluation result 3601 may be processed in the same manner as in the adequacy 3707 of the partial evaluation result 3701.

The following description discuss a concrete example of the selection set evaluation device of the present invention referring to FIG. 33 to FIG. 36. The selection set evaluation device described in the example functions also as a product selling device for selling a selection set that has been made.

Figure 33:
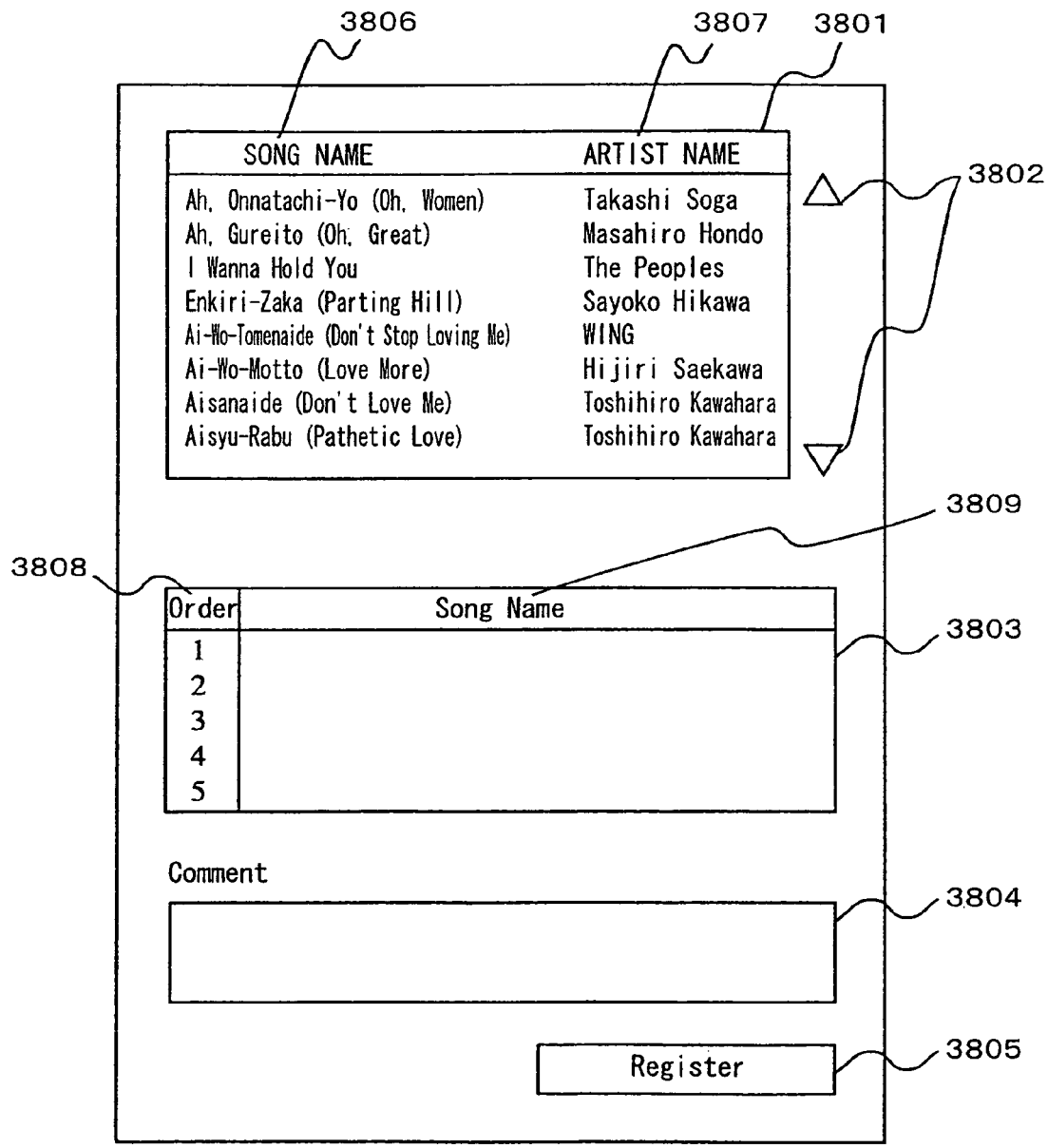
FIG. 33 illustrates a concrete example of an initial state of an image by which the selecting user selects the selection item so as to make the selection set.

FIG. 33 illustrates an example of an initial state of an image by which the selecting user selects the selection items so as to make the selection set. In FIG. 33, 3801 is a selection item indicating area for indicating information concerning target selection items to the selecting user, and 3802 is a scroll button for switching to the information concerning the selection items displayed in the selection item indicating area 3801, and 3803 is a selection set display area for displaying a content of the selection set, being made, that is a combination of the selection items selected by the selecting user, 3804 is a comment inputting area by which the selecting user inputs a comment for the selection set, and 3805 is a registration button for storing the selection set displayed in the selection set display area 3803 in a selection set storing means 3204.

Further, in the selection item indicating area 3801, a song name 3806 and an artist name 3807 are displayed as the information concerning each selection item, and in the selection set display area 3803, an order 3808 and an song name 3809 corresponding to the selection item are displayed.

In an example of this image, the selection item indicating area 3801, the selection item selecting means 3203 are provided in the selection item indicating means 3202 as the selection item indicating area 3801 and the selection set area 3803.

In order to select the selection item displayed in the selection item indicating area 3801, the displayed song name 3806 or artist name 3807 is pointed by means of a pointing tool such as a mouse so as to click it. Alternately, a touch panel may be used so as to give instructions by directly touching the panel, or a key board may be used so as to give instructions by moving a cursor displayed in the selection item indicating area 3801. Hereinbelow, the operation for selecting a displayed target is referred to merely as "click".

The selected selection items are added to the selection set being made, and are displayed in the selection set display area 3803. In order to delete the selection items displayed in the selection set display area 3803, the song name 3809 of the selection item in the selection set display area 3803 that is required to be deleted is clicked.

The selecting user repeats an operation for selecting a selection item displayed in the selection item indicating area 3801 so as to add the selection item to the selection set being made, or an operation for selecting a selection item displayed in the selection set display area 3803 so as to delete the selection item from the selection set being made, so that the selection set that is desired by the user is made. It is possible to store the selection set, that has been made, in the selection set storing means 3204 by pushing the registration button 3805.

In addition to the example shown in FIG. 33, when there is further provided a maker name input area by which the selection user inputs his/her own name, it is possible to input a name of the maker 3403 of the selection set exemplified in FIG. 29, so as to be stored in the selection set storing means 3204 in combination. Alternately, a name of the selecting user, such as a log-in name, that has been inputted upon using a terminal or a software using the image for making the selection set that is shown in FIG. 33, may be stored in the selection set storing means 3204 as the maker 3403 in the selection set exemplified in FIG. 29.

FIG. 34 illustrates an example of an evaluation result informing image such that: the total evaluation results derived from the evaluation results, stored in the evaluation result storing means 2107, by the total evaluation deriving means 3211 are ranked by the selection set ranking means 3212, and the evaluation result informing means 3213 informs the evaluation results to the ordinary user. The ordinary user gives an instruction from evaluation result displaying means (not shown) provided in the selection set making device 3260 shown in FIG. 27 via the communication controlling means 3217 of the selection set making device 3250 to the evaluation result informing means 3213, so that it is possible to refer to a list of the selection sets ranked in accordance with the total evaluation result. Thus, the ordinary user can grasp which selection set is highly evaluated, so that it is possible to make a new selection set by referring to a combination of the selected items included in a highly-evaluated selection set.

Alternately, in the product selling device including the selection set evaluation device of the present invention or the selection set evaluating system of the present invention, the selection set that is displayed can be purchased as it is, so that it is not required to select the selection items upon purchasing the selection set, and it is possible to purchase the combination of the selected items included in the highly-evaluated selection set as a product.

In FIG. 34, 3901 is a ranking display area for displaying a ranking of the selection sets, and 3902 is a scroll button for switching the selection sets displayed in the ranking display area 3901. Further, in the ranking display area 3901, an order 3903 of the ranking, a maker 3904 of the selection set, a comment 3905 on the selection set, and a grade 3906 are correspondingly displayed. In the grade 3906 of the selection set, a grade of the total evaluation result derived by the total evaluation deriving means 3211 is displayed. A concrete example of deriving the total evaluation result is as described above.

For example, it is assumed that: the grade of the total evaluation result derived in the foregoing manner with respect to the selection set exemplified in FIG. 29 is 96, and the selection set ranking means 3212 ranks the selection set as a top. Thus, the order 3903 in the ranking display area 3901 corresponds to the top, and "DJ mina" a content of the maker 3403 shown in FIG. 29 is displayed in the maker 3904, and "I made the album in memory of old days" a content of the comment 3404 shown in FIG. 29 is displayed in the comment 3404, and 96 which is the grade of the total evaluation result derived by the total evaluation deriving means 3211 is displayed in the grade 3906.

When a specific mark is added to the selection item that has not received the evaluation made by the evaluating user so that the selection item is displayed with it included in the ranking, the ordinary user can grasp a list concerning the reliability of the evaluation result of each selection set. Further, there may be additionally prepared a ranking display area for displaying only a selection set that has not received the evaluation made by the evaluating user.

Figure 35:
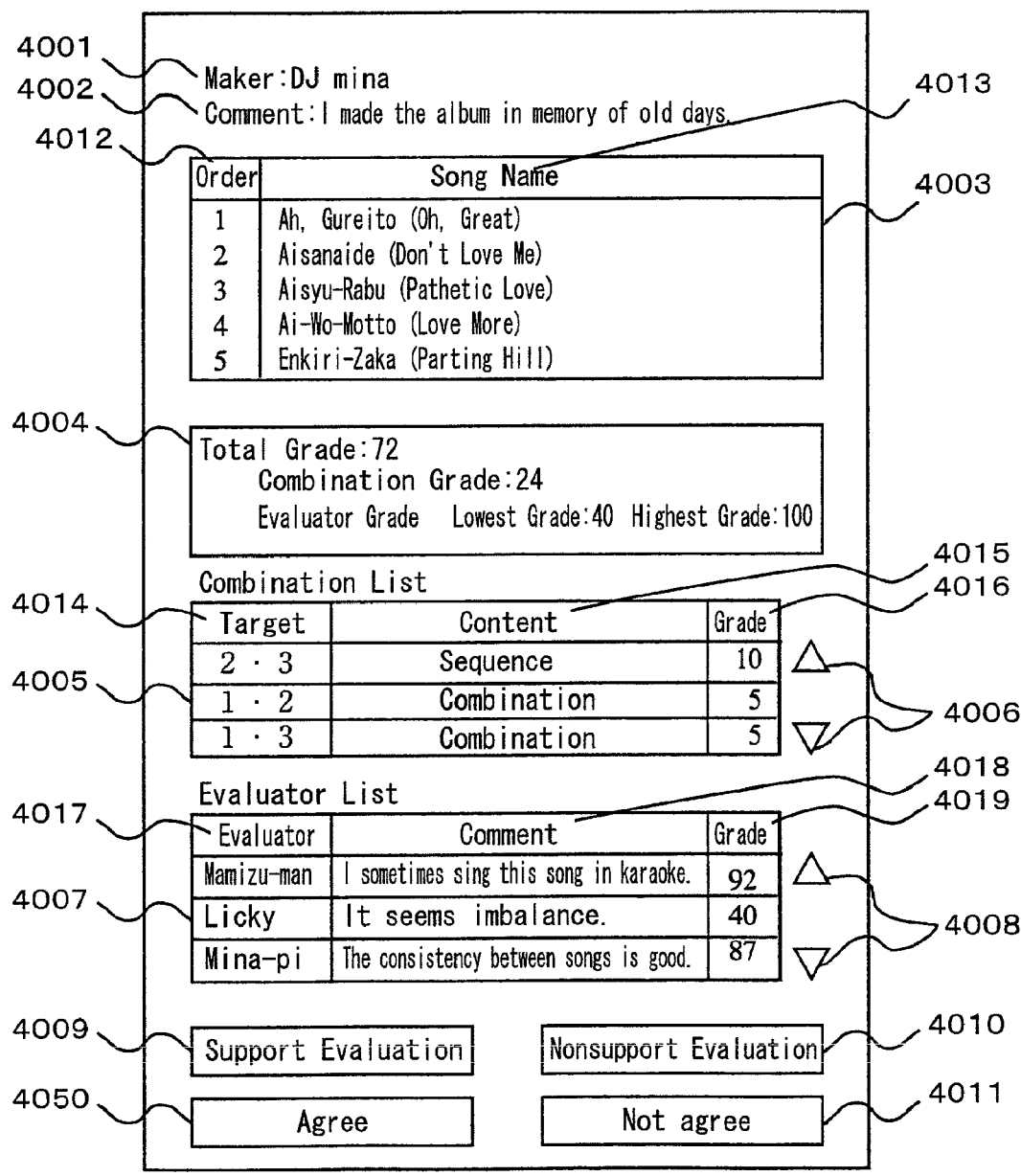
FIG. 35 illustrates a concrete example where a detail evaluation concerning the selection set selected in FIG. 34 is displayed.

When the selection set displayed in the ranking display area 3901 is clicked, the image is switched to an image for displaying detail information of the selection set as shown in FIG. 35. FIG. 35 shows an example where the evaluation result informing means 3213 displays a detail evaluation content concerning the selection set selected in FIG. 34.

In FIG. 35, 4001 is a maker display area for displaying a name of the selecting user who made the selection set, and 4002 is a comment display area for displaying a comment the selecting user inputted upon making the selection set, and 4003 is a selection set display area for displaying selection items included in the selection set, and 4004 is a total evaluation result display area for displaying a total evaluation result of the selection set that has been derived by the total evaluation deriving means 3211, and 4005 is a combination list for displaying the detail evaluation result of the selection set that is calculated by the selection set evaluating means 3207 in accordance with the evaluation rule stored in the evaluation rule storing means 3205, and 4006 is a scroll button for switching the detail evaluation result displayed in the combination list to another detail evaluation result.

Further, 4007 is an evaluator list for displaying the detail evaluation result of the selection set that is inputted by the evaluating user, and 4008 is a scroll button for switching the detail evaluation result displayed in the evaluator list 4007 to another detail evaluation result, and 4009 is an evaluation agree button which is pushed in case where the ordinary user agrees with one of the evaluation results displayed in the combination list 4005 or the evaluator list 4007, and 4010 is an evaluation not-agree button which is pushed in case where the ordinary user does not agree with one of the evaluation results displayed in the combination list 4005 or the evaluator list 4007, and 4011 is an evaluation input button for switching to an image by which a new evaluation of the selection set is inputted, and 4050 is a selection set purchase button for purchasing the selection set. The image for inputting the new evaluation is exemplified in FIG. 36 described later.

Further, in the selection set display area 4003, the selection item's order 4012 and the selection item's song name 4013 are correspondingly displayed. Further, in the combination list 4005, (a) a target 4014 in which selection items of the selection set that have been evaluated in terms of an evaluation rule derived from a certain evaluation result are displayed in combination of the order 4012, (b) a content 4015 which indicates a characteristic (focused point) of the selection set that are evaluated so as to correspond to the evaluation rule type 3502 of the evaluation rule, and (c) a grade 4016 are correspondingly displayed. Further, in the evaluator list 4007, (a) an evaluator 4017 which is a name of the evaluating user who inputted each evaluation result, (b) a comment 4018 which is inputted by the evaluating user with respect to the evaluation result, and (c) the grade 4019 as the evaluation result are correspondingly displayed.

In the total evaluation result display area 4004, (a) a combination grade which is an evaluation result derived by the selection set evaluating means 3207 and (b) a lowest grade and a highest grade of the evaluation result inputted by the evaluating user with the evaluation inputting means 3209, are displayed. Further, a total evaluation derived by the total evaluation deriving means 3211 from the evaluation result of the selection set that is stored in the evaluation result storing means 3210 is displayed as a total grade. An example of deriving the total evaluation result is as described above.

One of the evaluation results displayed in the combination list 4005 or the evaluator list 4007 is selected by clicking it, and the evaluation agree button 4009 or the evaluation not-agree button 4010 is pushed, so that the ordinary user can set the adequacy 3606 of the evaluation result. As illustrated in FIG. 31, the adequacy 3606 is indicated as a value stored in the evaluation result storing means 3210 in combination with the evaluation result.

For example, with respect to the evaluation result newly derived by the selection set evaluating means 3207 or the evaluation result inputted by the evaluating user, 1.0 is set as a value of an initial state of the adequacy 3606. Every time the ordinary user pushes the evaluation agree button 4009 as to the evaluation result, the value of the adequacy 3606 is increased by 0.1, and every time the ordinary user pushes the evaluation not-agree button 4010 as to the evaluation result, the value of the adequacy 3606 is decreased by 0.1. For example, in a case where the adequacy 3606 stored in the evaluation result storing means 3207 is 1.2, when the evaluation agree button 4009 is pushed one time, the value of the adequacy 3606 is updated to 1.3.

The value of the adequacy 3606 updated in this manner is multiplied by the grades of the respective evaluation results as described in the example where the total evaluation deriving means 3211 derives the total evaluation result. Thus, it is possible to derive the total evaluation result so that the evaluation result whose adequacy 3606 is high is emphasized. Alternately, the value of the adequacy 3606 is used upon determining the grade 3605 of the evaluation rule generated by the evaluation rule extracting means 3214 as described above. Thus, it is possible to extract the evaluation rule so that the evaluation result whose adequacy 3606 is high is emphasized.

Note that, the process of updating the adequacy 3606 is not limited to the foregoing example. Further, when the lower limit and the upper limit are given to the value of the adequacy 3606 in advance, it is possible to prevent the value of the adequacy 3606 from being excessively reflected to the total evaluation result and the extracted evaluation rule.

In combination with each evaluation result displayed in the combination list 4005 or the evaluator list 4007, the value of the adequacy 3606 or 3707 of the evaluation result is displayed, so that it is possible to give the ordinary user a clue for judging whether the evaluation result is reliable or not. In this case, when marks such as asterisks whose quantity corresponds to the value of the adequacy 3606 or 3707 are added, or a display color of the evaluation result is changed, instead of indicating the adequacy 3606 in a form of a value, it is possible to intuitively judge the reliability.

Further, as described above, the ordinary user selects the selection set in the evaluation result informing image as described in FIG. 34, and confirms its content and the evaluation result, made by the evaluating user, by means of the image which displays the detail evaluation content concerning the selection set described in FIG. 35, and pushes the selection set purchase button 4050, so that the ordinary user can purchase the selection set. Thus, the ordinary user can purchase the selection set, which has been made by other user and is highly evaluated by the evaluating user, without making the selection set.

Figure 36:
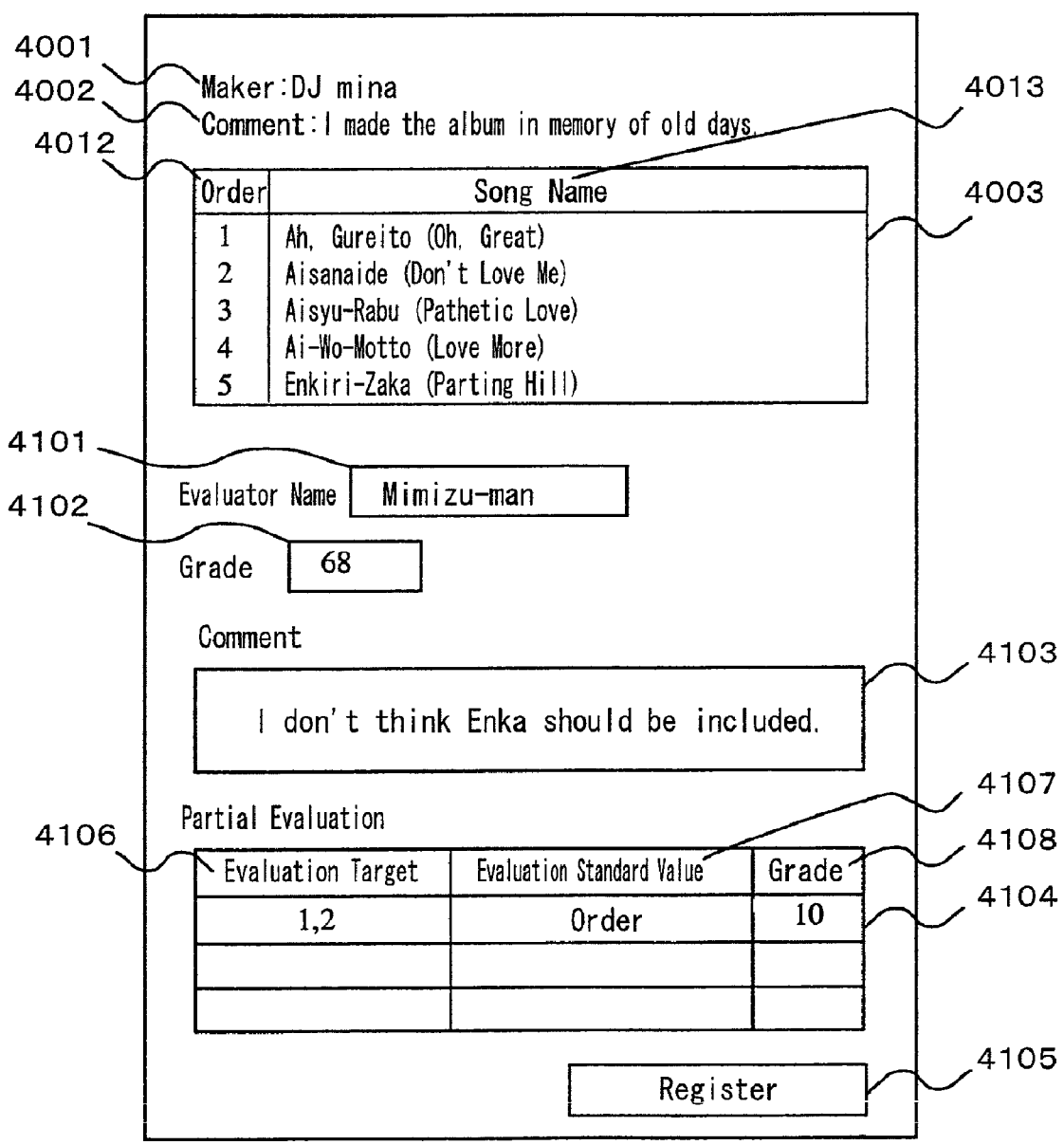
FIG. 36 illustrates a concrete example of an image by which the evaluation user inputs an evaluation with respect to the selection set indicated.

FIG. 36 illustrates an example of an image by which the evaluating user inputs the evaluation with respect to the selection set indicated by the selection set indicating means 3208. Concretely, when the evaluation input button 4011 is pushed with respect to the selection set whose contents are displayed in the maker display area 4001, the comment display area 4002, and the selection set display area 4003 that are shown in FIG. 35, the image shown in FIG. 35 is switched to the image shown in FIG. 36, so that the evaluating user can input the evaluation with respect to the selection set.

In FIG. 36, 4001 is a maker display area for displaying a name of the selecting user who made the selection set, and 4002 is a comment display area for displaying a comment inputted by the selecting user upon making the selection set, and 4003 is a selection set display area for displaying the selection items included in the selection set, and an order 4012 of the selection item and a song name 4013 of the selection item are displayed in the selection set display area 4003. In this point, FIG. 36 is the same as FIG. 35.

In addition, 4101 is an evaluator name input area for inputting a name of the evaluating user, and 4102 is a grade input area for inputting a grade subjectively determined by the evaluating user as the evaluation result of the selection set displayed in the selection set display area 4003, and 4103 is a comment input area for inputting a comment such as a basis for the evaluation result made by the evaluator, and 4104 is a partial evaluation input area for inputting a partial evaluation result which is an evaluation for a part of the selection set, and 4105 is a registration button by which the evaluation results inputted to (a) the evaluator name input area 4101, (b) the grade input area 4102, and (c) the comment input area 4103 are registered so as to be stored in the evaluation result storing means 3210.

Further, in the partial evaluation input area 4104, there are provided (a) an evaluation target input area 4106 in which the selection items included in the selection set are specified and inputted, (b) an evaluation rule type selecting menu 4107 for selecting an evaluation rule type indicative of a type of the evaluation rule shown in FIG. 30, and (c) a grade input area 4108 for inputting a grade of the partial evaluation result.

The example of FIG. 36 shows that the partial evaluation input area 4104 includes only three columns in which the partial evaluations are inputted, but the number of the partial evaluations that can be inputted by the evaluating user is not limited to this. For example, there is additionally provided a scroll button for switching to fourth or more columns so that new partial evaluations are inputted in case fourth or more columns are required.

Note that, the order 4012 of the selection items displayed in the selection set display area 4003 is inputted to the evaluation target input area 4106. When a desired order 4012 is clicked, the number of the clicked order 4012 is added to the evaluation target input area 4106 that is receiving the input. This makes it easier to perform the input.

The order 4012 inputted in the evaluation target input area 4106 is converted into the ID 3301, by referring to (a) data of the selection set stored in the selection set storing means 3204 as shown in FIG. 29 and (b) information concerning the selection items stored in the selection item storing means 3201, when the registration button 4105 is pushed so that the partial evaluation result is stored in the evaluation result storing means 3210, and the ID 3301 is stored as the evaluation target ID 3704 shown in FIG. 32. Further, in order to input the evaluation rule type 4107, the evaluation rule type 4107 which can be selected by a menu such as a pull-down menu is indicated so that the evaluating user selects the evaluation rule 4107. This makes it easier to input the evaluation rule type 4107.

Figure 37:
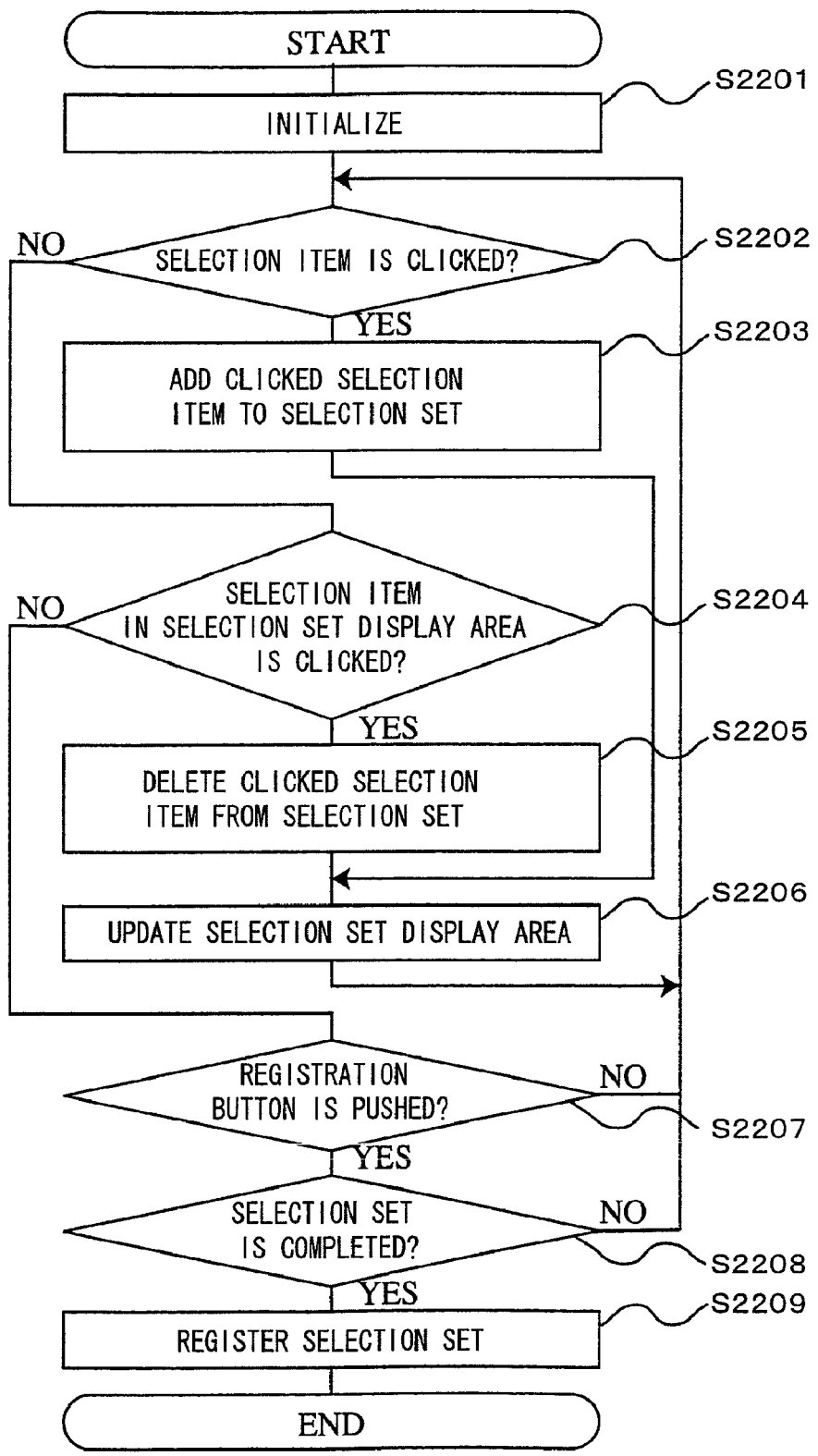
FIG. 37 is a flow chart for illustrating a processing flow in which the selection set is made.

FIG. 37 is a flow chart for illustrating a processing flow in which the selection set is made in the image, exemplified in FIG. 33, by which the selecting user makes the selection set by selecting the indicated selection items.

First, the process is entirely initialized (step 2201; hereinbelow referred to as S2201 for short). In the example shown in FIG. 33, some of the selection items stored in the selection item storing means 3201 are displayed in the selection item indicating area 3803, and the selection set display area 3803 and the comment input area 3804 are cleared. Further, the selection set, being made, that is stored in the selection item selecting means 3203 is cleared. Any selection item can be displayed in the selection item indicating area 3801, but it is preferable to display a displayable number of the selection items, stored in the selection item storing means 3201, in the selection item indicating area 3801.

Next, judgment is given on whether the selection item displayed in the selection item indicating area 3801 has been clicked or not (S2202). In a case where the selection item has been clicked, the process proceeds to S2203, and in a case where the selection item has not been clicked, the process proceeds to S2204.

In the case where the selection item has been clicked in S2202, the selection item is added to the selection set being made (S2203). Thereafter, the process proceeds to S2206.

In the case where the selection item has not been clicked in S2202, judgment is given on whether the selection item, included in the selection set, that is displayed in the selection set display area 3803, has been clicked or not (S2204). In a case where the selection item has been clicked, the process proceeds to S2205, and in a case where the selection item has not been clicked, the process proceeds to S2207.

In the case where the selection item has clicked, the selection item is deleted from the selection set being made (S2205).

Next, after the processes S2203 and S2205, the display of the selection set display area 3803 is updated in accordance with a content of the selection set being made (S2206). Thereafter, the process returns to S2202.

In the case where the selection item has not been clicked in S2204, judgment is given on whether the registration button 3805 has been pushed or not (S2207). In a case where the registration button 3805 has been pushed, the process proceeds to S2208. In the case where the registration button 3805 has not been pushed, the process returns to S2202.

In the case where the registration button 3805 has been pushed in S2207, judgment is given on whether the selection set being made has been completed or not (S2208). That is, when at least one selection item is not included in the selection set, it is judged that the selection set has not been completed. In a case where a predetermined number of selection items are included in the selection set, whether it is regarded as completion or not is a matter of design variation. In the case where the selection set being made has been completed, the process proceeds to S2209. In the case where the selection set being made has not been completed, the process returns to S2202.

In the case where the selection set being made has been completed in S2208, the selection set being made is registered and stored in the selection set storing means 3204 in combination with the comment inputted to the comment input area 3804 (S2209), and the process is finished.

Figure 38:
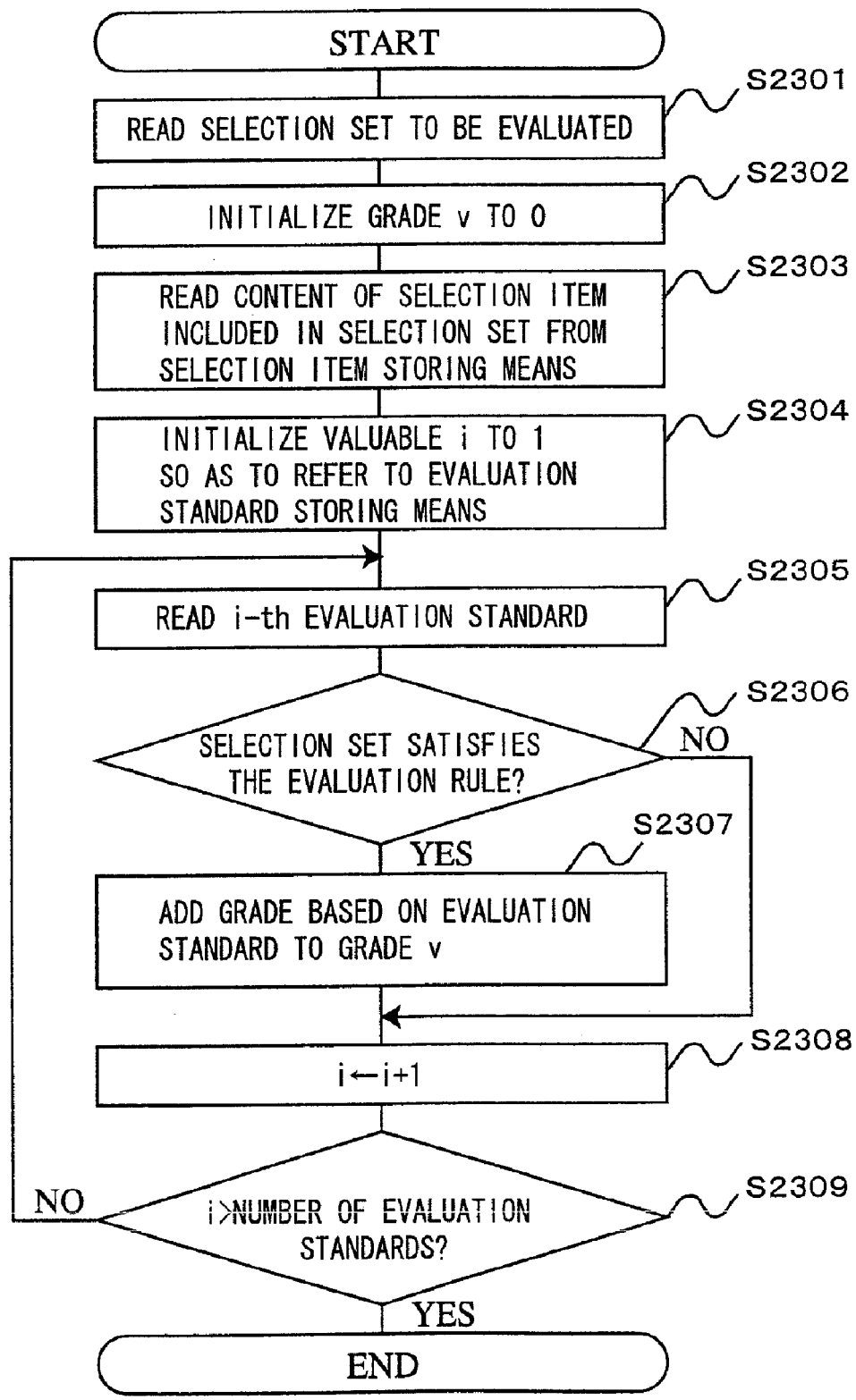
FIG. 38 is a flow chart for illustrating a processing flow in which the selection set evaluating means evaluates the selection set.

FIG. 38 is a flow chart for illustrating a processing flow in which the selection set evaluating means 3207 evaluates the selection set stored in the selection set storing means 3204. This process is started (a) when a specific operation is performed, for example, the user pushes a button for starting the evaluation, or (b) right after a new selection set is made and is registered into the selection set storing means 3204, or (c) when a combination of the selection items included in the selection set being made is changed, or (d) on a specific time and date, and the like.

First, the selection set evaluating means 3204 reads a target selection set stored in the selection set storing means 3204 (S2301). The selection set is additionally made by the selecting user with the selection items selecting means 3203. The selection set is as exemplified in FIG. 29.

Next, a grade v of the selection set that is stored in the selection set evaluating means 3207 is initialized (S2302).

Next, a content of the selection item included in the selection set is read from the selection item storing means 3201 (S2303). For example, the selection item whose order 3402 shown in FIG. 29 corresponds to the selection item whose ID 3301 shown in FIG. 28 is 2, so that a content of the selection item (song name 3302, artist name 3303, category 3304) is read. This process is performed with respect to all the selection items included in the selection set.

Next, in order to refer to the evaluation rule stored in the evaluation rule storing means 3205, a value of a variable i (stored in the selection set evaluating means 3207) is initialized to 1 (S2304).

Next, the evaluation rule having an i-th evaluation rule number is read from the evaluation rule storing means 3205 (S2305). For example, in an example of the evaluation rule shown in FIG. 30, when the i value is 1, the evaluation rule 3505 whose evaluation rule number 3501 is 1 is read.

Next, whether the evaluation rule read in S2305 is applied to the selection set or not is judged (S2306). A concrete example is as described above. In case where the evaluation rule is applied, the process proceeds to S2307, and in case where the evaluation rule is not applied, the process proceeds to S2308.

Next, the grade is calculated based on the evaluation rule, and is added to the grade v (S2307). A concrete example is as described above.

Next, the value i is increased by 1 (S2308).

Next, whether the i value is larger than the number of the evaluation rules stored in the evaluation rule storing means 3205 or not is judged (S2309). In case where the i value is larger than the number of the evaluation rules, this means that the evaluation based on all the evaluation rules stored in the evaluation rule storing means 3205 is finished, so that the process is finished. In case where the i value is lower than or equal to the number of the evaluation rules, this means that the evaluation rule which has not been evaluated exists in the evaluation rule storing means 3205, so that the process returns to S2305 so as to continue the process.

Figure 39:
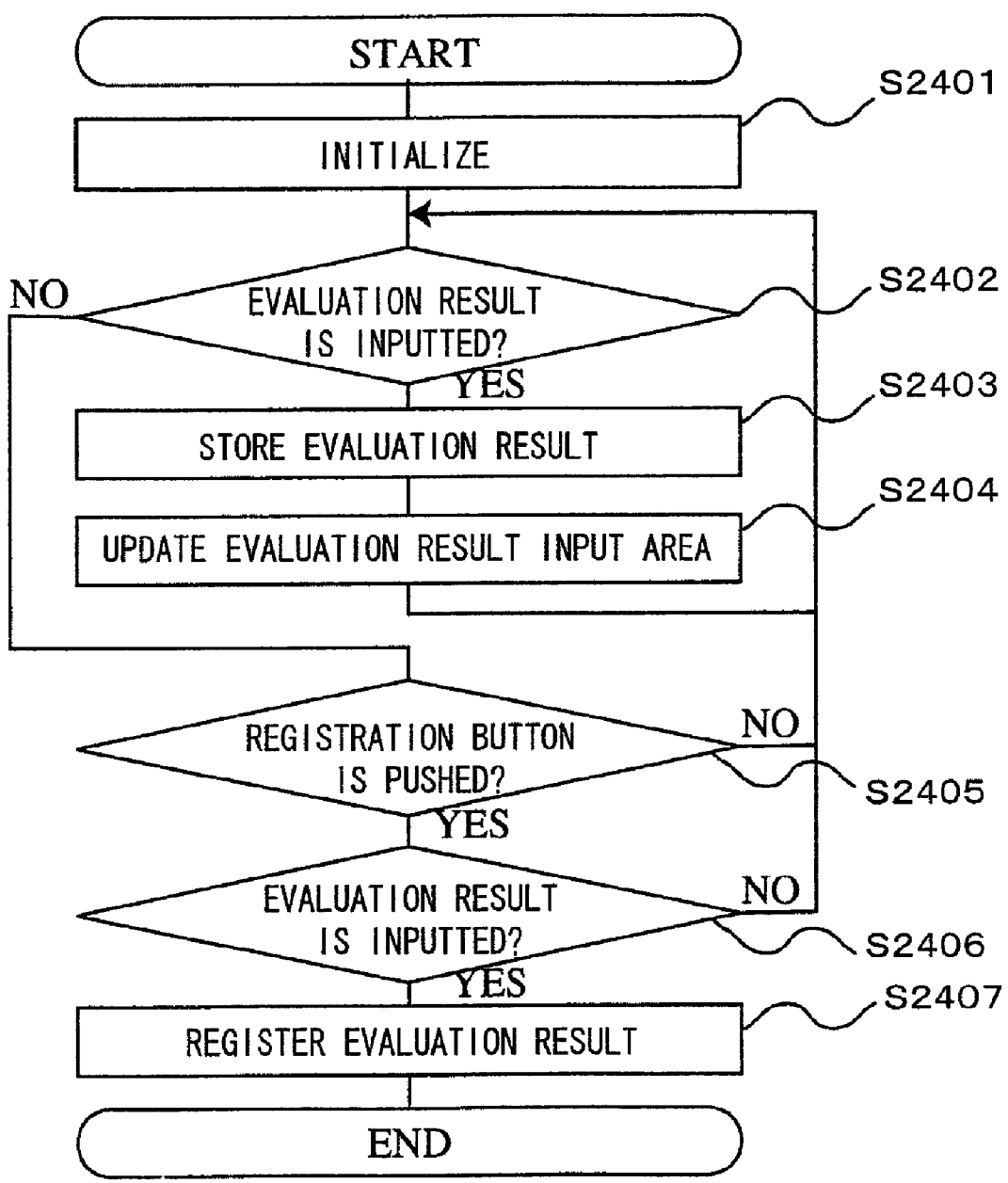
FIG. 39 is a flow chart for illustrating a processing flow in which the evaluation result is inputted.

Next, FIG. 39 is a flow chart for illustrating a processing flow in which the selection set is made in the image, exemplified in FIG. 36, by which the evaluating user inputs an evaluation of the selection set indicated by the selection set indicating means 3208.

First, the process is entirely initialized (S2401). In the example shown in FIG. 36, the selection set that is to be evaluated is referred to in accordance with the selection set storing means 3204, and the maker 3403 is displayed in the maker display area 4001 and the comment 3404 is displayed in the comment display area 4002. Further, information concerning the selection item included in the selection set is referred to in accordance with the selection item storing means 3201 so as to be displayed in the selection set display area 4003. Further, the evaluator name input area 4101, the grade input area 4102, the comment input area 4103, and the evaluation target input area 4106 are cleared.

Hereinbelow, areas for inputting the evaluation results, such as the evaluator name input area 4101, the grade input area 4102, and the comment input area 4103, are collectively referred to as an evaluation result input area.

Next, judgment is given on whether the evaluation result has been inputted to the evaluation result input area or not (S2402). In a case where the evaluation result has been inputted, the process proceeds to S2403, and in a case where the evaluation result has not been inputted, the process proceeds to S2405.

In the case where the evaluation result has been inputted in S2402, the inputted evaluation result is stored (S2403). The inputted evaluation result may be stored in a temporary storage area provided in the evaluation inputting means 3209, or may be stored in the respective evaluation result input areas.

After S2403, a display content of the evaluation result input area is updated so as to correspond to the evaluation result inputted in S2403 (S2404). Thereafter, the process returns to S2402.

In the case where the evaluation result has not been inputted in S2402, judgment is given on whether the registration button 4104 has been pushed or not (S2405). In a case where the registration button 4104 has been pushed, the process proceeds to S2406. In a case where the registration button 4104 has not been pushed, the process returns to S2402.

In the case where the registration button 4104 is judged to have been pushed, judgment is given on whether an essential matter of the evaluation result has been inputted or not (S2406). As exemplified in FIG. 36, in a case where there are a plurality of evaluation result input areas, it is a matter of design variation which evaluation result input area needs to receive the input. In the case where the essential matter of the evaluation result has been inputted, the process proceeds to S2407. In the case where the essential matter of the evaluation result has not been inputted, the process returns to S2402.

In the case where the essential matter of the evaluation result is judged to have been inputted in S2406, the inputted evaluation result is registered to the evaluation result storing means 3210 (S2407), and the process is finished.

Figure 40:
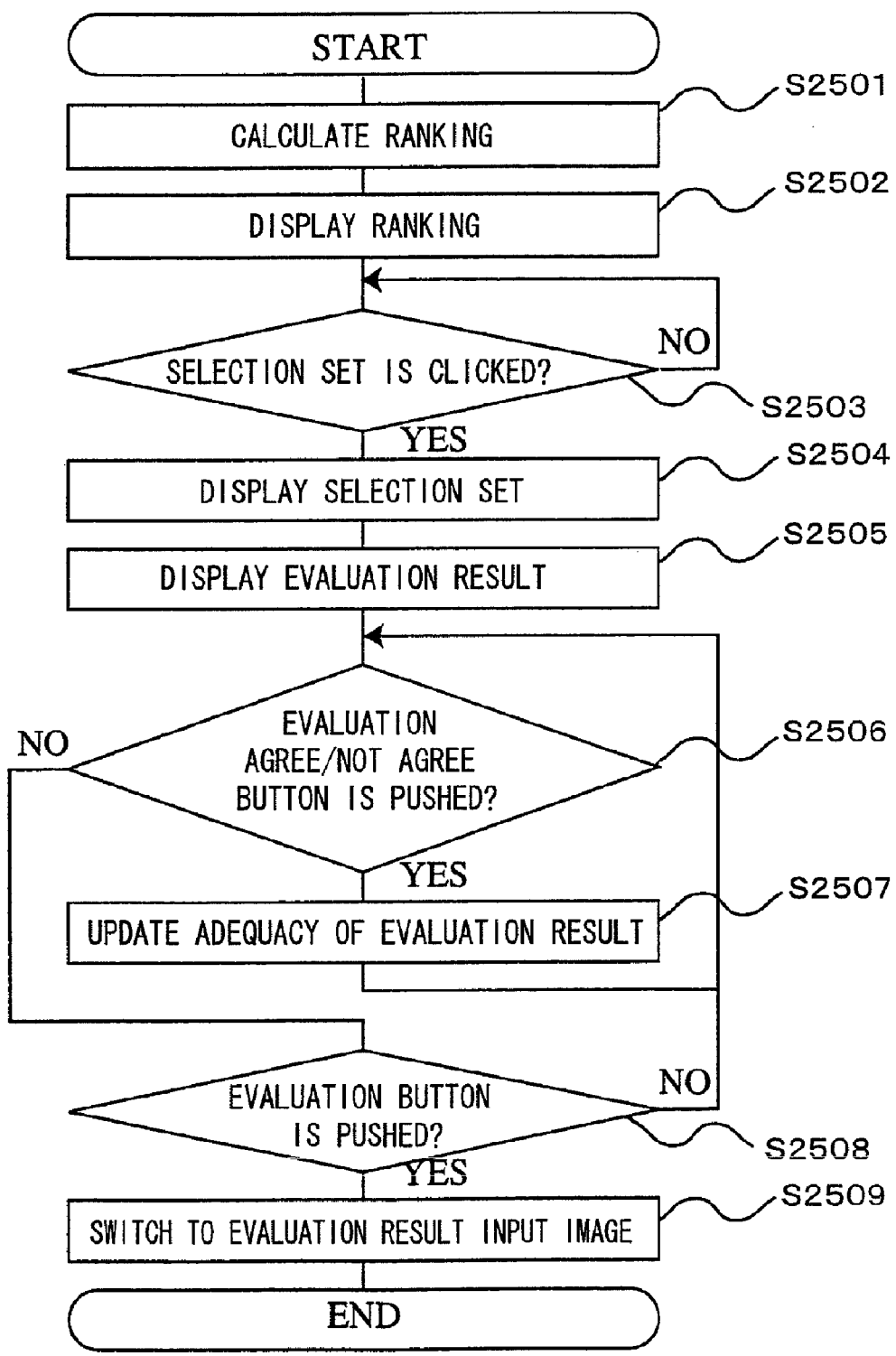
FIG. 40 is a flow chart for illustrating a processing flow in which the detail evaluation is confirmed.

Referring to (a) the evaluation result informing image shown in FIG. 34 and (b) the example where the detail evaluation content of the selection set shown in FIG. 35 is displayed, FIG. 40 illustrates a processing flow, in which the ordinary user confirms the detail evaluation content of the selection set by checking the ranking of the selection set.

First, the selection set ranking means 3212 sorts the selection sets stored in the selection set storing means 3204 in descending order of the total evaluation results derived, by the total evaluation deriving means 3211, from the evaluation results, given to the selection sets, that are stored in the evaluation result storing means 3210 (S2501). A generally-known sorting algorithm is used, so that detail description thereof is omitted.

Next, the evaluation result informing means 3213 displays the selection set in accordance with the ranking derived in S2501 (S2502). A concrete example of the display is as illustrated in FIG. 34.

Next, judgment is given on whether the selection set displayed in S2502 has been clicked or not (S2503). In a case where the selection set has been clicked, the process proceeds to S2504. In a case where the selection set has not been clicked, the process returns to S2503.

In the case where the selection set has been clicked in S2503, the evaluation result informing means 3213 displays a detail content of the selection set by referring to the selection set storing means 3204 and the selection item storing means 3201 (S2504). A concrete example of the display is as exemplified in the maker display area 4001, the comment display area 4002, and the selection set display area 4003 shown in FIG. 35.

Next, the evaluation result informing means 3213 displays the detail evaluation result of the selection set that is stored in the evaluation result storing means 3210 (S2505). A concrete example thereof is as exemplified in the total evaluation result display area 4004, the combination list 4005, and the evaluator list 4007, that are shown in FIG. 35.

Next, judgment is given on whether the evaluation agree button 4009 or the evaluation not-agree button 4010, shown in FIG. 35, that is the evaluation result adequacy setting means 3215, has been pushed or not (S2506). In a case where either the button 4009 or the button 4010 has been pushed, the process proceeds to S2507. In a case where neither the buttons have been pushed, the process proceeds to S2508.

In the case where the evaluation agree button 4009 or the evaluation not-agree button 4010 has been pushed, the evaluation result adequacy setting means 3215 updates the adequacy of the evaluation result, concerning the selection set stored in the evaluation result storing means 3210, in accordance with a type of the pushed button (S2507). An example of how the adequacy is updated is as described above. After performing the process of S2507, the process returns to S2506.

In S2506, in the case where neither the evaluation agree button 4009 nor the evaluation not-agree button 4010 have been pushed, judgment is given on whether the evaluation input button 4011 has been pushed or not (S2508). In a case where the evaluation input button 4011 has been pushed, the process proceeds to S2509. In a case where the evaluation input button 4011 has not been pushed, the process returns to S2506.

In the case where the evaluation input button 4011 has been pushed in S2507, the display image is switched to the image, shown in FIG. 36, by which the evaluation is inputted (S2509), and the process is finished.

The selection set evaluation device described above is realized by a program which causes a selection set evaluation process to function. The program is stored in a computer-readable storage medium. In the present invention, a general computer is used to perform the foregoing process as the storage medium, so that a memory such as a ROM (Read Only Memory) provided in or connected to the general computer may be a program media, or may be a program media such that: there is provided a program reading device as an external storage device, and a storage medium is inserted into the program reading device, so that the program is read.

In each case, it may be so arranged that: a microprocessor accesses a stored program so as to execute the program, or in each case, it may be so arranged that: a program is read out, and the read program is down-loaded into a program storage area, such as a RAM (Read Only Memory), provided in a general computer, so that the program executes the process. The program for down-loading is stored in a main device in advance.

Examples of the program media include: tapes such as a magnetic tape and a cassette tape, discs including a magnetic disc such as a floppy disc/a hard disc, and an optical disc such as CD-ROM/MO/MD/DVD and the like; cards such as an IC card (including a memory card)/an optical card and the like; and a semiconductor memories such as a mask ROM/EPROM/EEPROM/flash ROM and the like.

Further, in the present invention, the program media may be a medium which carries the program fluidly so that it can provide the program via a communication network and the like. Note that, in case where a program is down-loaded from a communication network in this manner, the program for down-loading may be stored in the main body in advance, or may be installed from another storage medium.

Note that, a content stored in the storage medium is not limited to a program, but may be data.

The following description will discuss still another embodiment of the present invention referring to FIG. 41 to FIG. 48.

Figure 41:
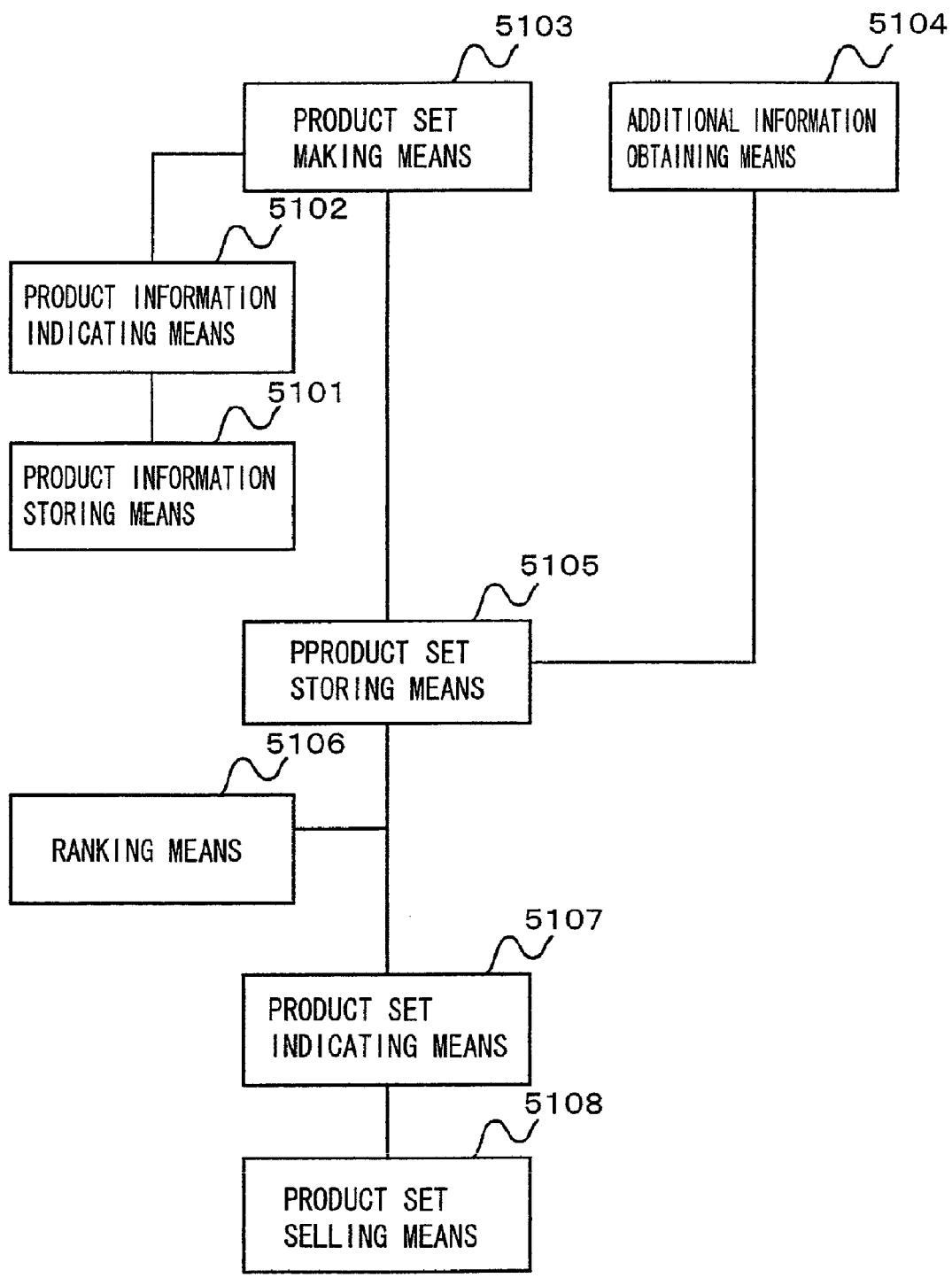
FIG. 41 is a block diagram showing an arrangement of a sale management system according to one embodiment of the present invention.

FIG. 41 is a block diagram showing an arrangement of one embodiment of a sale management device of the present invention.

In FIG. 41, 5101 is product information storing means for storing information concerning a product (hereinbelow referred to as product information for short), and 5102 is product information indicating means for selecting product information, indicated to a product set maker, from the product information stored in the product information storing means 5101, so as to output the selected product information, and 5103 is product set making means for making a product set constituted of a plurality of products or a plurality of selectable items by referring to the product information indicated by the product set maker with the product information indicating means 5102, and 5104 is additional information obtaining means for obtaining additional information (described later) concerning the product set from the product set maker, and 5105 is product set storing means for storing (a) the product set made by the product set making means 5103, (b) the additional information obtained by the additional information obtaining means 5104, and (c) information related to the product set (hereinbelow referred to as product set related information for short) such as the number of times the product set is purchased, with the information corresponding to each product set, and 5106 is ranking means for sorting the product sets stored in the product set storing means 5105, for example, sorting the number of times purchased, in accordance with a certain standard, and 5107 is product set indicating means for selecting (a) a product set indicated to a purchaser from the product sets stored in the product set storing means 5105 or (b) a result from a sorting result given by the ranking means 5106, so as to output the selected product set or the selected result, and 5108 is product set selling means for selling the product set indicated by the product set indicating means 5107 to the purchaser.

Note that, all the users using the sale management device of the present invention or the sale management system of the present invention (described later) can be regarded as the product set maker, and not only a professional or a mania familiar with a specific product but also an unspecified number of ordinary consumers can be regarded as the product set maker.

The foregoing components may be directly connected to each other, or may be connected via a communication network using a telephone line, a radio communication, the Internet, and the like. Further, it may be so arranged that: a plurality of product set making means 5103 are prepared so that a plurality of product set makers can use them at the same time, or it may be so arranged that: a plurality of product set indicating means 5107 or a plurality of product set selling means 5108 are prepared so that a plurality of purchasers can use them at the same time.

Further, it does not matter whether the storing means 5101 and 5105 store information temporarily or continuously, and it is possible to select the temporary storage or continuous storage as usage, and it does not matter whether the storing means are internally provided or externally provided or detachably provided.

Further, it may be so arranged that: there is provided a display section for at least displaying information, and the product information outputted by the product information indicating means 5102, or the product set or the sorted result outputted from the product set indicating means 5107 is displayed in the display section. This enables such condition that: the product set maker checks the product information displayed in the display section so as to make the product set, and the purchaser checks the product set displayed in the display section so as to select a product set to be purchased.

The sale management device arranged in the foregoing manner can be realized as a terminal device, referred to as information kiosk, that is placed in a convenience store or a shop or a public space, thereby carrying out the present invention.

Figure 42:
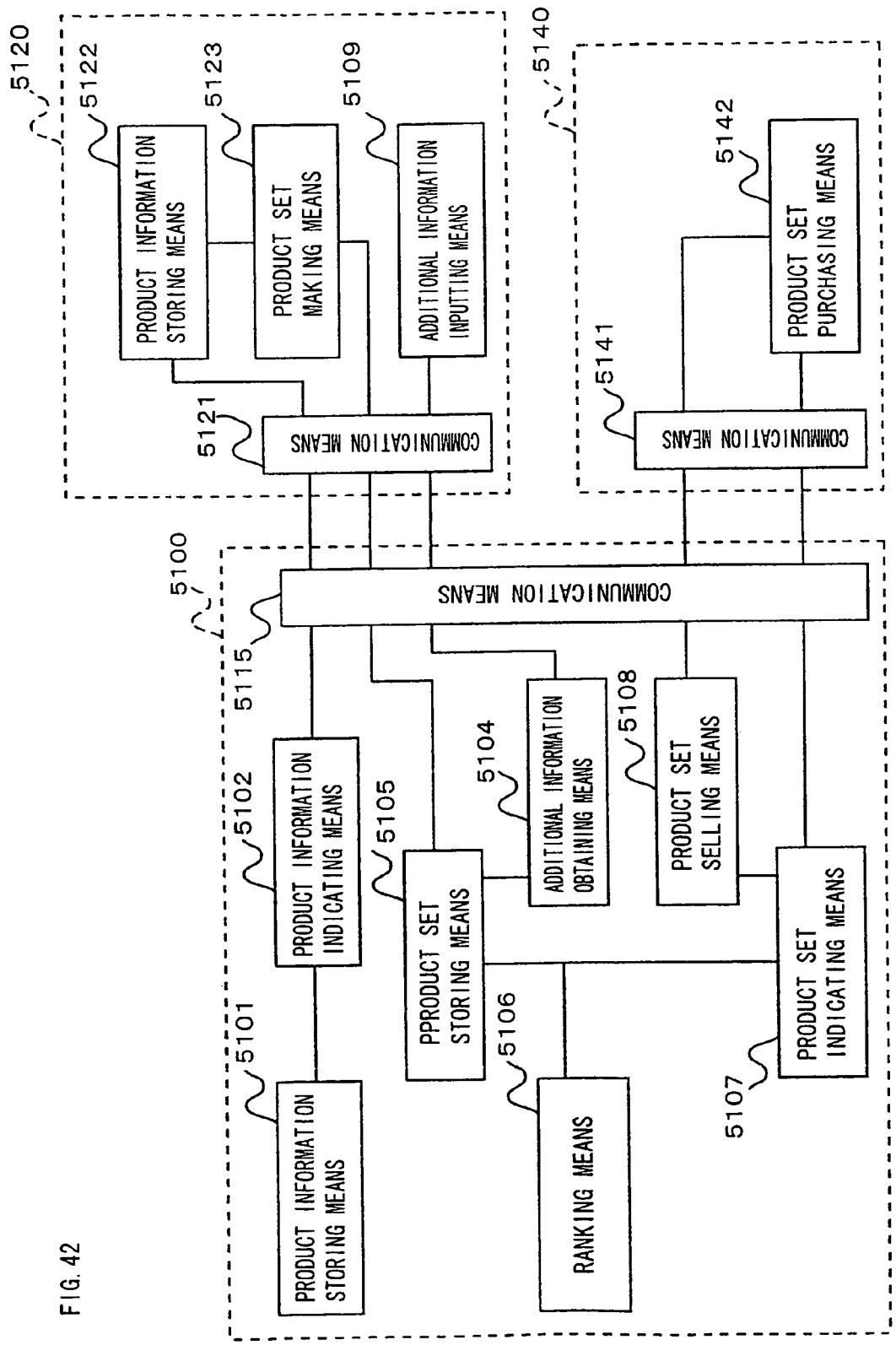
FIG. 42 is a block diagram showing a sale management system according to one embodiment of the present invention.

FIG. 42 is a block diagram showing an arrangement of one embodiment of the sale management system of the present invention. The arrangement shown in FIG. 42 is basically the same as the arrangement shown in FIG. 41, but is different from FIG. 41 in that: the system is constituted of a sale management device 5100 for managing the product set, a product set making device 5120 (first device) by which the product set maker makes the product set, and a product set purchasing device 5140 (second device) by which the purchaser purchases the product set. The respective means 5101, 5102, 5104 to 5108 are the same as in FIG. 41, so that description thereof is omitted.

In the sale management device 5100, 5115 is communication means for transmitting/receiving data to/from the product set making device 5120 or the product set purchasing device 5140. Thus, the product information indicating means 5102 transmits information concerning a product to the product set making device 5120 via the communication means 5115 as required by the product set making device 5120. Further, the product set indicating means 5102 transmits (a) the product set stored in the product set storing means 5105 and (b) the information concerning the product stored in the product information storing means 5101, via the communication means 5115, to the product set purchasing device 5140 from which the request for transmission has been received.

Likewise, the additional information obtaining means 5104 receives the additional information of the product set (described later) from the product set making device 5120 via the communication means 5115.

Further, in the product set making device 5120, 5109 is additional information inputting means by which the product set maker inputs the additional information concerning the product set that has been made, and 5121 is communication means for transmitting/receiving data to/from the sale management device 5100, and 5122 is product information storing means for storing the product information, and 5123 is product set making means by which the product set maker selects the product information stored in the product information storing means 5122 so as to make the product set.

Further, in the product set purchasing device 5140, 5141 is communication means for transmitting/receiving data to/from the sale management device 5100, and 5142 is product set purchasing means by which the purchaser inputs information required in purchasing the product set indicated by the sale management device 5100.

In the foregoing arrangement, the product information selected by the product information indicating means 5102 is transmitted to the product set making device 5120 by the communication means 5115, and is received by the communication means 5121, and is stored in the product information storing means 5122. Further, the product information storing means 5112 may additionally read and store information concerning a product distributed by a medium such as CD-ROM and DVD-ROM. The product information stored in the product information storing means 5122 is indicated to the product set maker by the product set making device 5123, and the product set maker selects the indicated product information so as to make the product set.

The product set that has been made is transmitted to the sale management device 5100 by the communication means 5121, and is received by the communication means 5115, and is stored in the product set storing means 5105. Further, the additional information inputted by the additional information inputting means 5109 is transmitted to the sale management device 5100 by the communication means 5121, and is received by the communication means 5115, and is obtained by the additional information obtaining means 5104. In this manner, the communication means 5121 functions as product set transmitting means.

Further, (a) the product set selected from the product set storing means 5105 by the product set indicating means 5107 or (b) the result sorted by the ranking means 5106 is transmitted to the product set purchasing device 5140 by the communication means 5115, and is received by the communication means 5141, and is indicated to the purchaser. Further, information, concerning the purchase of the product, that has been inputted by the product set purchasing means 5142, is transmitted to the sale management device 5100 by the communication means 5141, and is received by the communication means 5115, and is processed by the product set selling device 5108. In this manner, the communication means 5141 functions as product set receiving means and purchase information transmitting means.

In FIG. 42, only one product set making device 5120 and only one product set purchasing device 5140 are illustrated, but a plurality of product set making devices 5120 and a plurality of product set purchasing devices 5140 may be connected to the sale management device 5100 so that a network, using a telephone line, a radio communication, the Internet, and the like, is arranged. By arranging in this manner, it is possible to make and sell the product sets so that a wide range of users are covered.

Further, it is not necessary that the product set making device 5120 and the product set purchasing device 5140 are separately provided, but they may be combined with each other as a single terminal device. Such arrangement enables a product set made by another product set maker to be indicated by the sale management device 5100, so that it is possible to make a new product set by referring to the product set made by this product set maker. This can be realized also by a program which causes a device such as a general personal computer to function as the product set making device 5120 and the product set purchasing device 5140.

Figure 43:
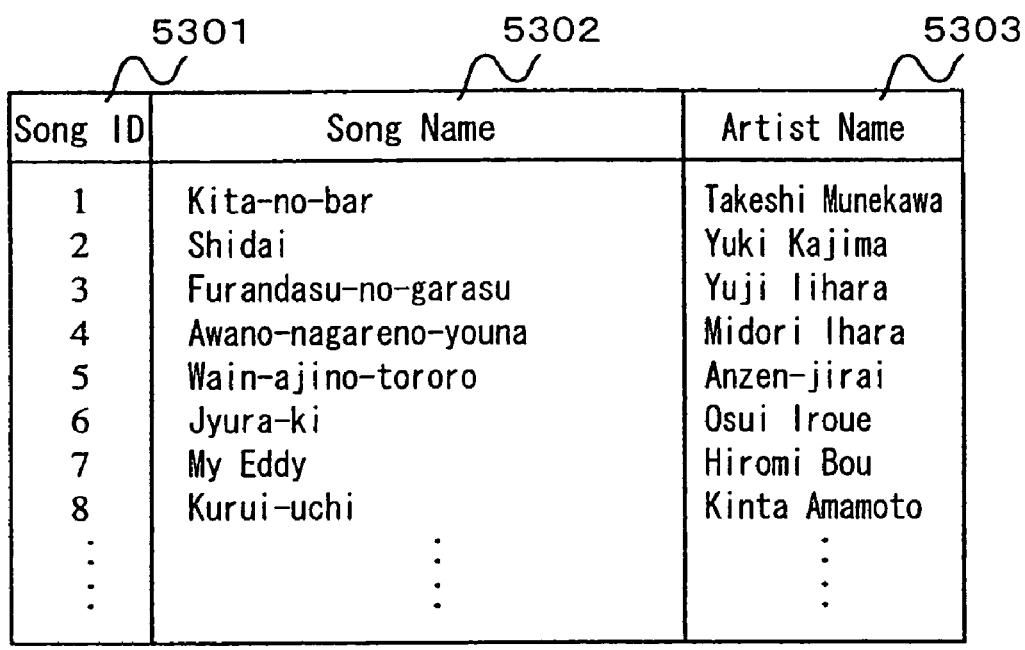
FIG. 43 shows an example of information concerning a product.

FIG. 43 shows an example of the product information stored in the product information storing means 5101. FIG. 43 shows music data as an example. In FIG. 43, 5301 is a song ID which is uniquely added to each music data, and 5302 is a song name, and 5303 is an artist name. Thus, one music data is constituted of the song ID 5301, the song name 5302, and the artist name 5303, that are correspondingly combined with each other.

In addition to these examples, when information concerning the music such as a category (attribute) of the music data and a length of the song is stored in combination, the information can be used as a clue by the product set maker and the purchaser to refer to the music data. When information concerning the purchase such as a sale price is stored in combination, it is possible to diversify a sale form, for example, it is possible to set a price of one music data which is different from a price of another music data.

Further, the product information storing means 5101 may store actual data of the music. Alternately, it may be so arranged that: the actual data is stored in another storing means, a file name indicative of the actual data is stored so as to correspond to each music data. Alternately, it may be so arranged that: the actual data is stored in a server connected via a network to the sale management device 5100, and URL (Uniform Resource Locator) indicative of a resource name of the actual data is stored.

Further, the file name may be generated as follows: a suffix indicative of the music data, for example ".mp3", is linked to a value indicating the song ID 5301 in a form of a character string, so that the file name is generated from the value of the song ID 5301. For example, when the song ID 5301 of the music data is 1, a file name "1.mp3" is obtained. This facilitates management of the music data.

More generally speaking, a single product information is constituted of (a) identification information for uniquely specifying the product, (b) content information indicative of a content of the product, (c) attribute information which indicates a attribute of the product, and the like.

FIG. 44 shows an example of the product set stored in the product set stored in the product set storing means 5105. The song ID 5301 added to the music data included in the product set is stored in accordance with the order 5402 so as to correspond to a product set ID 5401 uniquely added to distinguish one product set from other product sets. The product set of this example includes the music data of five songs, but the number of songs is not limited to this, and the number of songs may be varied for each product set.

Alternately, there are stored the following additional information; a maker name 5403 of a maker who made the product set: a title 5404, given to the product set, which briefly indicates a characteristic, a theme, and the like thereof, so as to give the purchaser a clue for selecting the product set: an image file name 5405 such as a jacket image of an album, given to the product set, that expresses the image of the product set.

In this example, a name of the maker 5403 is stored in a form of a character string, but may additionally include data such as a management number corresponding to the name so that the data is stored. By arranging in this manner, information concerning the maker can be shared even when a single maker is making a plurality of product sets, so that it is not necessary to update the information of the product set every time the information of the maker is updated.

Further, the number of the image file name 5405 is not limited to one, but may be varied. Alternately, the image file name (326.jpg in FIG. 44) may be generated from the product set ID 5401 (number 326 in FIG. 44) in the same manner as in the example where the file name is generated from the song ID 5301.

In the foregoing description, it is assumed that the image data is additionally stored, but the image data itself may be stored in the product set storing means 5105 in combination. Besides the additional information, information, for example, a voice file name indicative of voice data such as a speech comment of the maker, a sale price of the product set, and the like, may be stored. Further, in a case where the product set is an intangible product such as a song, it is preferable to use an image expressing its image, but in a case of a tangible product set, it is more preferable to use photographic data obtained by taking a shot of its appearance.

Figure 45:
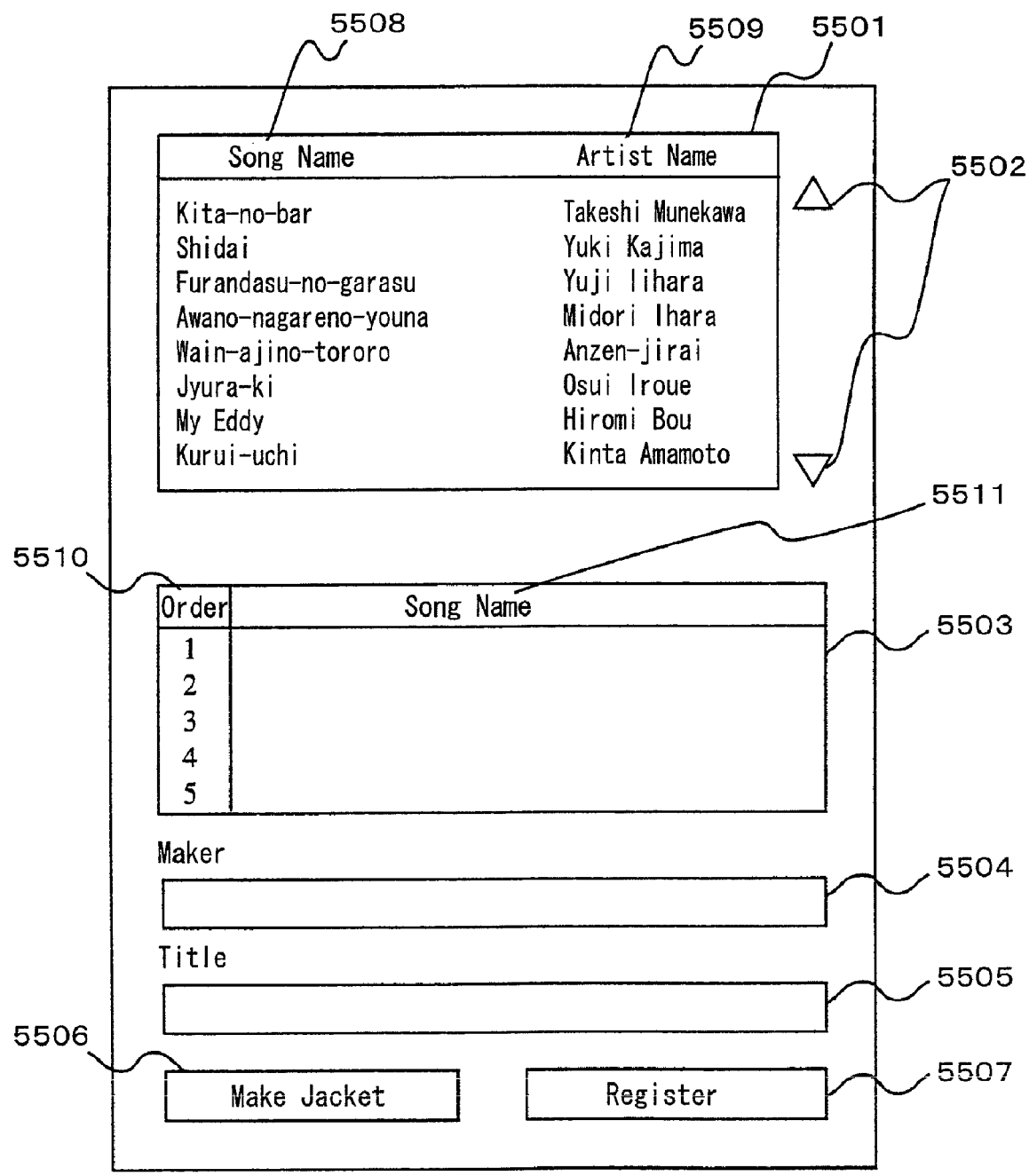
FIG. 45 shows a concrete example according to one embodiment of the present invention, and illustrates an example of an image by which a product set maker makes the product set.
Figure 46:
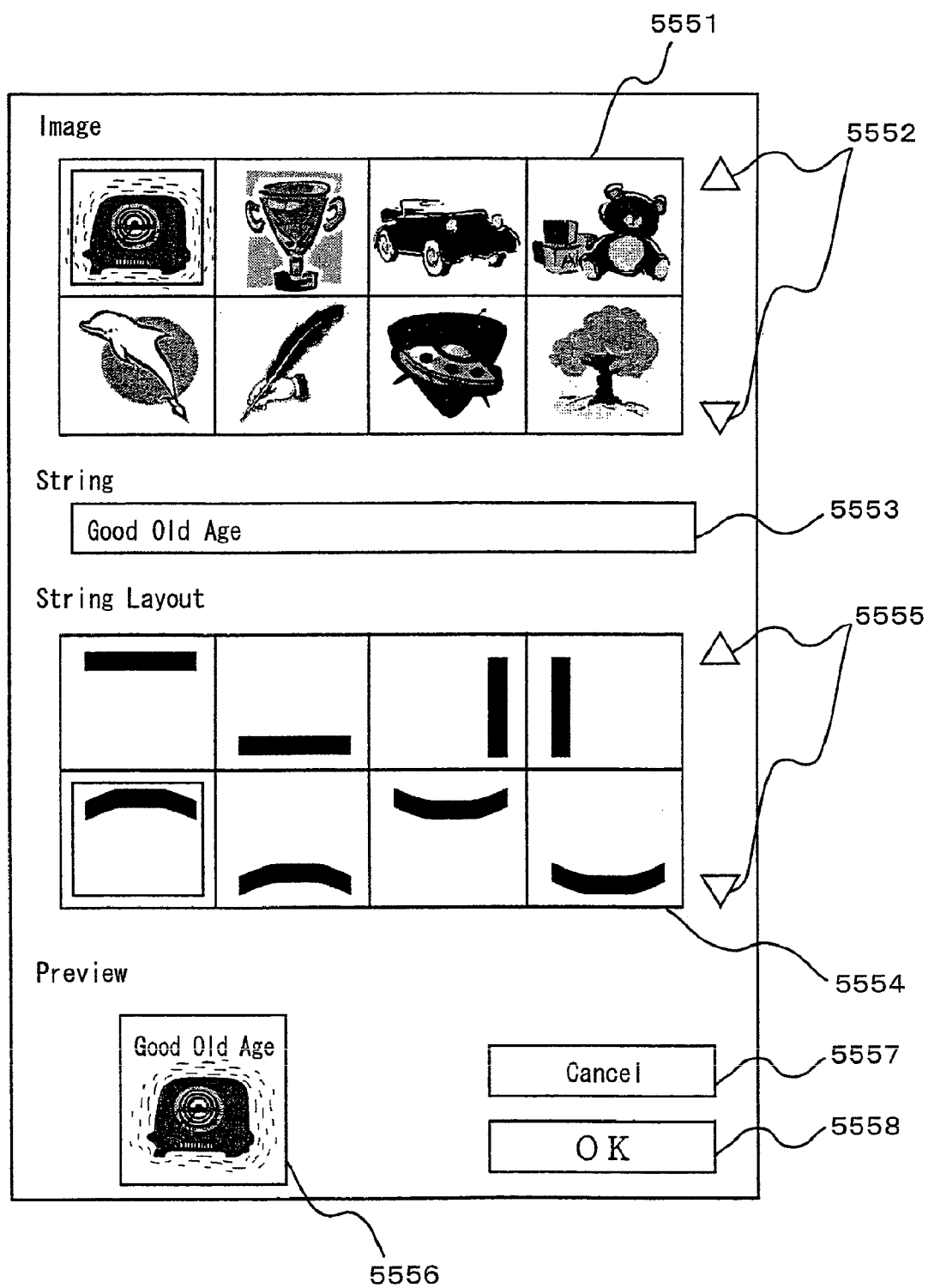
FIG. 46 shows a concrete example according to one embodiment of the present invention, and illustrates an example of an image by which a jacket image used as additional information is made.

The following description will discuss a concrete example of the sale management system of the present embodiment referring to FIG. 45 and FIG. 46.

FIG. 45 shows an example of an image, displayed in the product set making device 5120, by which the product set maker makes the product set. A display section for displaying such image may be provided as a part of the product set making means 5103 or 5123. Alternately, in a case where the product set making device 5120 is combined with the sale management device 5100 and the product set purchasing device 5140 as a single device, it may be so arranged that: a common display section and common display controlling means are provided, and the display controlling means obtains necessary information from the product set making means 5103 or 5123, the product set indicating means 5102, the product set selling means 5108, and the product set purchasing means 5142, so as to control the display section to display the information.

In FIG. 45, 5501 is a product information indicating area for indicating product information outputted by the product information indicating means 5102 to a product set maker, and 5502 is a scroll button for switching the product information displayed in the product information indicating area 5501 to another product information, and 5503 is a product set making area for displaying a content of the product set, being made, that is a combination of products selected by the product set maker, and 5504 is a maker name input area for inputting a name of the product set maker, and 5505 is a title input area for inputting a title of the product set being made, and 5506 is a jacket making button for making a jacket image which is additional information of the product set being made, and 5507 is a registration button for transmitting the product set being made to the product management device 5100 so as to store the product set in the product set storing means 5105.

Further, in the product information indicating area 5501, a song name 5508 and an artist name 5509 are displayed as the product information, and in the product set making area 5503, a song order 5510 and a song name 5511 that are included in the product set are displayed.

In order to select a product displayed in the product information indicating area 5501, the displayed song name 5508 or the displayed artist name 5509 is pointed by using a pointing tool such as a mouse, so as to click it. Alternately, a touch panel may be used so as to give instructions by directly touching the panel, or a key board may be used so as to give instructions by moving a cursor displayed in the product information indicating area 5501. Hereinbelow, the operation for selecting a displayed target is referred to merely as "click".

The selected product is added to a product set being made, and is displayed in the product set making area 5503. In order to delete the product displayed in the product set making area 5503 from the product set being made, the order 5510 or the song name 5511 of the product required to be deleted is clicked in the product set making area 5503.

In a case where the jacket making button 5506 is pushed, the image is switched to an image for making the jacket image. The image for making the jacket image is described later.

The product set maker repeats an operation in which the product information displayed in the product information indicating area 5501 is selected so as to add the product information to the product set being made, or repeats an operation in which the product information displayed in the product set making area 5503 is selected so as to delete the product information from the product set being made, so that a desired product set is made.

The product set that has been made is transmitted to the sale management device 5100 by pushing the registration button 5507, and is stored in the product set storing means 5105. Further, at this time, the maker name inputted in the maker name input area 5504, the title inputted in the title input area 5505, and the jacket image data made in the image for making the jacket image (described later) are transmitted to the sale management device 5100 as the additional information, and are obtained by the additional information obtaining means 5104, so as to be stored in the product set storing means 5105 in combination with the product set.

FIG. 46 shows an example of the image for making the jacket that is switched when the jacket making button 5506 is pushed. Here, the product set maker selects a desired combination of an image, characters, and a layout, from images, characters, and layouts, that have been prepared in advance, so as to make the jacket image.

In FIG. 46, 5551 is an image indicating area for displaying a recommended image prepared in advance so as to indicate the recommended image to the product set maker, and 5552 is a scroll button for switching the image displayed in the image indicating area 5551 to another image, and 5553 is a string input area by which the product set maker inputs a string, and 5554 is a string layout indicating area for displaying a recommended layout prepared in advance so that the character string inputted to the string input area 5553 is disposed in the image, so as to indicate the recommended layout to the product set maker, and 5555 is a scroll button for switching the recommended layout displayed in the string layout input area 5554 to another recommended layout, and 5556 is a preview display area for displaying a preview of the jacket image being made, and 5557 is a cancel button for stopping making the jacket image so as to return to the product set making image shown in FIG. 45, and 5558 is an OK button for finishing making the jacket image so as to register the jacket image being made.

The image indicated in the image indicating area 5551 is stored in image storing means (not shown). When the image storing means is provided in the sale management device 5100 so as to transmit the image information to the product set making device 5120 as required, it is not necessary to store a large quantity of images in the product set making device 5120. Alternatively, when the image storing means is provided in the product set making device 5120, it is possible to utilize different images for the respective product set making devices 5120, so that it is possible to obtain characteristics of the respective product set making devices 5120.

The product set maker clicks the image indicated in the image indicating area 5551 and the layout indicated in the character layout indicating area 5554, so that the image and the layout can be selected. The selected image or layout is displayed so that a specific mark such as a column is added thereto as shown in FIG. 46, so that the product set maker is informed that the image or the layout is selected.

An image in which the character string inputted in the character input area 5553 is disposed in the selected image in accordance with the selected layout is displayed in the preview display area 5556 as the jacket image being made. In a case where a content of the jacket image being made is changed, for example, the image selected in the image indicating area 5511 or the layout selected in the character layout indicating area 5554 is changed, or the character string inputted in the character input area 5553 is changed, a content displayed in the preview display area 5556 is immediately updated. In this manner, the product set maker changes or rectifies the image, the layout, and the character string, according to his/her predilection, by trial and error, so that it is possible to make the jacket image.

When the OK button 5558 is pushed, the jacket image being made is converted into image data, so as to be stored in the product set making device 5120 for a while. The image data is transmitted in combination with the product set being made when the product set is registered and transmitted to the sale management device 5100, and the image data is obtained by the additional information obtaining means 5104.

The foregoing description shows the example where an image used as the jacket image is selected from images prepared in advance. In addition, it may be so arranged that: there is provided a function for drawing an image like a general graphics editor so that the product set maker draws a jacket image freely. Alternately, it may be so arranged that: image data made by using another graphics editor is read so as to make a jacket image.

After the cancel button 5557 or the OK button 5558, the image is returned to the product set making image shown in FIG. 45.

FIG. 47 shows an example of (a) product set selling means 5108 provided in the sale management device shown in FIG. 41, or (b) product set purchasing means 5142 provided in the product set purchasing device 5140 shown in FIG. 42, by which the purchaser confirms a content of the product set upon purchasing the product set. Note that, a display section for displaying such image may be provided as a part of the product set selling means 5108 or a part of the product set purchasing means 5142. Alternately, in a case where the product set making device 5120, the sale management device 5100, and the product set purchasing device 5140 are combined with each other as a single device, the common display section and the common display controlling means are provided as described above.

In FIG. 47, 5601 is product set ranking means for displaying the product sets stored in the product set storing means 5105 in an order sorted by the ranking means 5106 in accordance with a certain standard such as the number of times purchased in the last one month, and 5602 is a scroll button for switching the ranking of the product sets displayed in the product set ranking area 5601 to another ranking of the product sets, and 5603 is a product set content display area for displaying a detail content of one product set selected from the product sets displayed in the product set ranking display area, and 5604 is a purchase button for purchasing the product set displayed in the product set content display area 5603.

When the product set displayed in the product set display area 5601 is clicked, the product set is selected, and a content concerning the selected product set is displayed in the product set content display area 5601. Further, the product set ranking display area 5601 displays a ranking 5605 of the respective product sets, a title and a maker 5606, the number of songs and a total time 5607, and a sale price 5608. The product set content display area 5603 displays a product set title 5609, a maker 5610, a jacket image 5611, and a list 5612 of songs included in the product set.

Further, in the ranking 5605 of each product set, vicissitude of the ranking that is based on comparison with a ranking of the last week is indicated by using an arrow in combination with the ranking itself. The information concerning the product set gives the purchaser a clue for looking for a product set which satisfies an object in purchasing the product set.

The purchaser checks the ranking of the product sets displayed in the product set ranking display area 5601, and clicks a product set, which is attractive for the purchaser or satisfies the object in purchasing the product set, so that a detail content of the clicked product set is displayed in the product set content display area 5603. The purchaser confirms the content of the product set. When the product set comes into his/her favor and the purchaser determines to purchase the product set, he/she pushes the purchase button 5604. When the purchase button 5604 is pushed, the image is switched to an image by which a procedure for purchasing is performed, so that it is possible to perform the procedure required in purchasing the product set. The product set selling means 5108 identifies the purchaser and confirms how the payment is to be performed as to the required product set, and performs a charging process as required.

Figure 48:
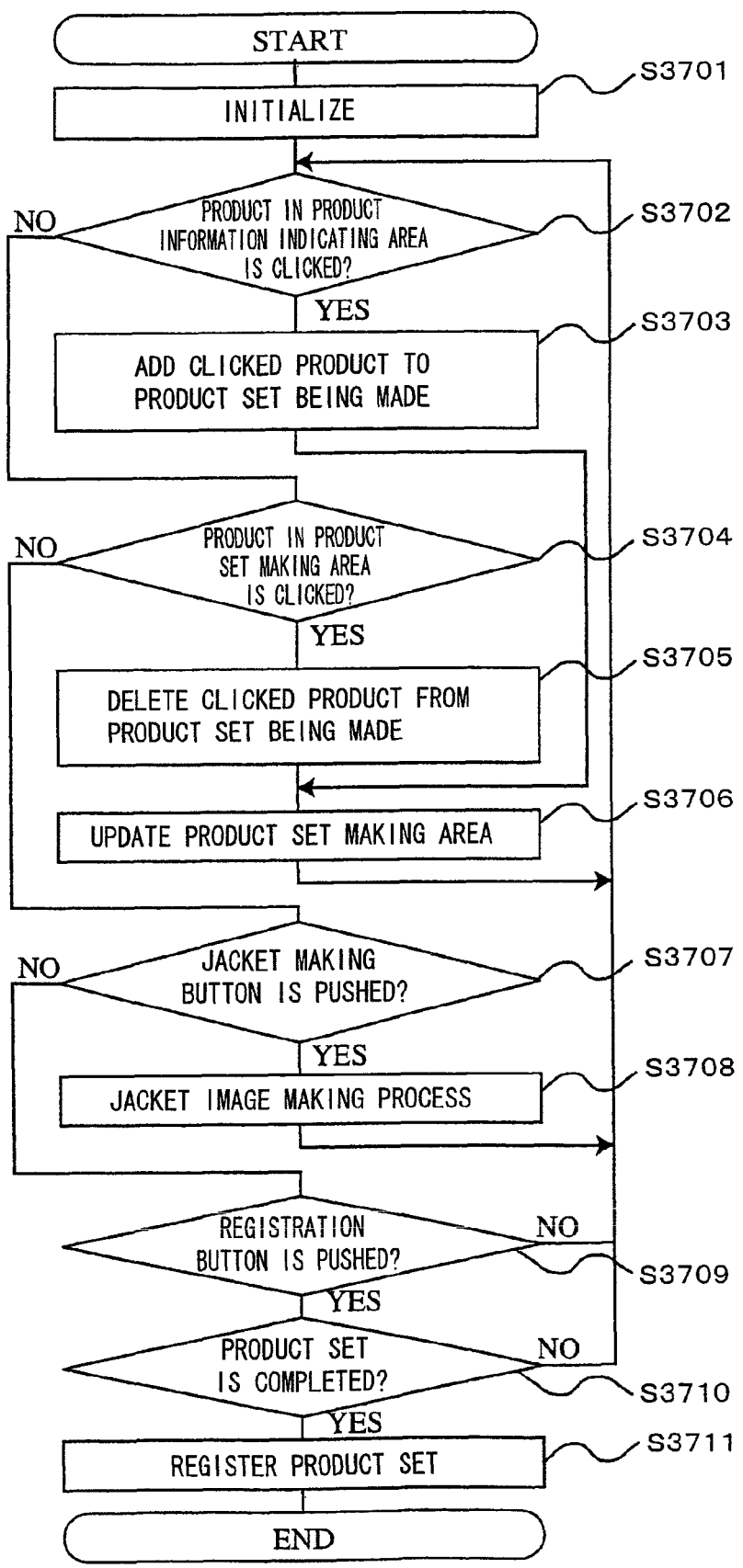
FIG. 48 is a flow chart illustrating a processing flow in which the product set is made.

FIG. 48 is a flow chart in which the product set maker makes the product set by means of the image, exemplified in FIG. 45, in which the product set maker combines products so as to make the product set.

First, the process is entirely initialized (step 3701; hereinbelow referred to as S3701 for short). In the example shown in FIG. 45, out of the product information, selected and outputted by the product information indicating means 5101, that is stored in the product information storing means 5101, some information selected and outputted by the product information indicating means 5102 is displayed in the product information indicating area 5501, and the product set making area 5503, the maker name input area 5504, and the title input area 5505 are cleared. Then, the product set, being made, that is temporarily stored in the product set making means 5103 is cleared.

Note that, any product information can be displayed, in an initial state, in the product information indicating area 5501, but it is preferable to display a displayable number of the product information displayed in the product information indicating area 5501, from product information whose song ID 5301 is the minimum out of the product information stored in the product information storing means 5101.

Next, judgment is given on whether the product information displayed in the product information indicating area 5501 has been clicked or not (S3702). In a case where any product information has been clicked, the process proceeds to S3703, and in a case where no product information has been clicked, the process proceeds to S3704.

In the case where the product information has been clicked in S3702, the product is added to the product set being made (S3703). Thereafter, the process proceeds to S3706.

In the case where the product information has not been clicked in S3702, judgment is given on whether the product information, included in the product set, that is displayed in the product set making area 5503, has been clicked or not (S3704). In a case where the product set has been clicked, the process proceeds to S3705, and in a case where the product set has not been clicked, the process proceeds to S3707.

In the case where the product information has been clicked, the product is deleted from the product set being made (S3705).

Next, after the processes S3703 or S3705, the display of the product set making area 5503 is updated in accordance with the product set being made (S3706). Thereafter, the process returns to S3702.

In the case where the product has not been clicked in S3704, judgment is given on whether the jacket making button 5506 has been pushed or not (S3707). In a case where the jacket making button 5506 has been pushed, the process proceeds to S3708. In the case where the jacket making button 5506 has not been pushed, the process returns to S3709.

In the case where the jacket making button 5506 has been pushed in S3707, the image is switched to the image for making the jacket image as shown in FIG. 46 so as to perform a process for making the jacket image (S3708). When the jacket image is registered or making of the jacket image is stopped so as to finish the process for making the jacket image, the process returns to S3702.

In the case where the jacket making button has not been pushed in S3707, judgment is given on whether the registration button 5507 has been pushed or not (S3709). In the case where the registration button 5507 has been pushed, the process proceeds to S 3710. In the case where the registration button 5507 has not been pushed, the process returns to S3702.

In the case where the registration button 5507 is pushed in S3709, judgment is given on whether the product set being made is completed or not (S3710). In this case, when at least one product is not included in the product set being made, the product set is judged not to have been completed. Further, it may be so arranged that: the upper limit or the lower limit of the number of products included in the product set are set in advance, and when the number of products is more or less than these limits, the product set is judged not to have been completed. Further, it may be so arranged that: one or some information of the additional information, such as a name of the product set maker, a title of the product set, and the jacket image, are regarded as essential items, and when the essential items are not inputted, the product set is judged not to have been completed. In the case where the product set being made is completed, the process proceeds to S3711. In the case where the product set has not been completed, the process returns to S3702.

In the case where the product set being made is judged to have been completed, the product set is registered to the product set storing means 5105 (S3711), and the process is finished.

The following description will discuss still another embodiment of the present invention referring to FIG. 49 to FIG. 56. The present embodiment gives an example where: information concerning a user is obtained, and information concerning the product set maker and information concerning the purchaser are compared with each other, so that a product set made by the product set maker having preference information similar to preference information of the purchaser is preferentially indicated to the purchaser.

FIG. 49 is a block diagram showing an arrangement of a sale management system in the present embodiment. As in FIG. 42, FIG. 49 illustrates the sale management system as a system including: a sale management device 5100; a product set making device 5120; and a product set purchasing device 5140.

In FIG. 49, the respective devices and means 5100, 5120, 5140, 5101, 5102, 5105 to 5108, 5115, 5121 to 5123, 5141 to 5142 are the same as in FIG. 42, so that description thereof is omitted.

In FIG. 49, 5110 is user information obtaining means for obtaining the information concerning the user of the present system from (a) the product set making device 5120, and (b) the product set purchasing device 5140, or (c) other device which can refer to the product set, and 5111 is user information storing means for storing the information, concerning the user, that has been obtained by the user information obtaining means 5110, and 5112 is user information comparing means for comparing information, concerning a plurality of users, that have been stored in the user information storing means 5111, so as to calculate compatibility therebetween, and these means are provided in the sale management device 5100.

Further, 5124 is maker information inputting means for inputting information concerning the product set maker, and is provided in the product set making device 5120. Further, 5143 is purchaser information obtaining means for inputting information concerning the purchaser or automatically obtaining the information, and is provided in the product set storing means 5140. Note that, it is needless to say that the product set storing means 5105 may function as the user information storing means 5111.

In order that the purchaser information obtaining means 5143 automatically obtains the information concerning the purchaser, it is possible to utilize history of the operation. For example, it is possible to automatically obtain information such that the purchaser likes a certain color, in accordance with history of an operation in which the purchaser refers to product sets, having the specific color, that are some of the product sets indicated by the product set indicating means 5107.

The information, concerning the product set maker, that has been inputted by the maker information inputting means 5124, is transmitted to the sale management device 5100 by the communication means 5121, and is received by the communication means 5115, so as to be obtained by the user information obtaining means 5110. Further, the information, concerning the purchaser, that has been inputted or obtained by the purchaser information obtaining means 5143, is transmitted to the sale management device 5100 by the communication means 5141, and is received by the communication means 5115, so as to be obtained by the user information obtaining means 5100.

Further, when a certain product set is purchased by means of the product set purchasing device 5140, the product set selling means 5108 retrieves and selects the product set maker, who made the product set, from the information, concerning the user, that has been stored in the user information storing means 5111, and gives the product set maker benefits, for example, gives the product set maker a part of the benefit as financial incentive, or gives the product set maker points etc. which can be exchanged for a product or service. Thus, the product set selling means 5108 functions as product set maker selecting means.

Information concerning the benefits is stored in the user information storing means 5111 in combination with information of a user who receives the benefits, and the benefits are given by benefit processing means (not shown) as required.

FIG. 50 shows an example of information concerning a product stored in the product information storing means

5101. The present embodiment exemplifies the information concerning the product by describing options of a car.

Recently, in a car sale, various options such as selection of body colors, aero parts, accessories, and the like, are prepared, so that the purchaser can combine the options as he/she likes upon purchasing a car. However, since there are so many variations of options, it is difficult to determine a combination which satisfies the requirement of the purchaser. A simulation device which displays appearances changed in accordance with selected options are used, but there are the following problems: it is necessary to make preparations for all types of cars, and in a case where there are a large quantity of options, it takes a lot of trouble to make various combinations by trial and error.

The present embodiment gives an example where: the purchaser purchases a desired product set by referring to a combination of options that has been made by other product set maker, so that the purchaser does not have to make the combination of options.

In FIG. 50, 5901 is an option ID which is a number uniquely added to each option, and 5902 is a type of each option, and 5903 is an option name, and 5904 is a price. A single information of an option includes the option ID 5901, the type 5902, the option name 5903, and the price 5904, that are correspondingly combined with each other.

In addition, as to each option, (a) a prerequisite option ID indicated with an option ID of an option required to be simultaneously selected and (b) an excluded option ID indicated with an option ID of an option which cannot be simultaneously selected are stored in combination, so that it is possible to describe a dependency relation between the options. Alternately, when prices for a plurality of combinations of options are stored, it is possible to store setting such that a combination is discounted in a case where options corresponding to the combination are simultaneously selected.

FIG. 51 shows an example of the information, concerning the user, that is stored in the user information storing means 5111. In FIG. 51, corresponding to each user ID 6001 which is a number uniquely added to the information concerning the user, there are stored a user name 6002, an age 6003, a gender 6004, single or married 6005, the number of family members 6006, and a hobby 6007. The stored information is not limited to this. Further, the stored information is indicated with a character string or a number in this example, but the information may be stored in a form of binary data. Alternately, the information may be stored in an encoded manner, for example, branches are prepared in the hobby 6007 in advance, and one or some of marks/one or some of numbers, that are added to the respective branches, are stored.

Figure 52:
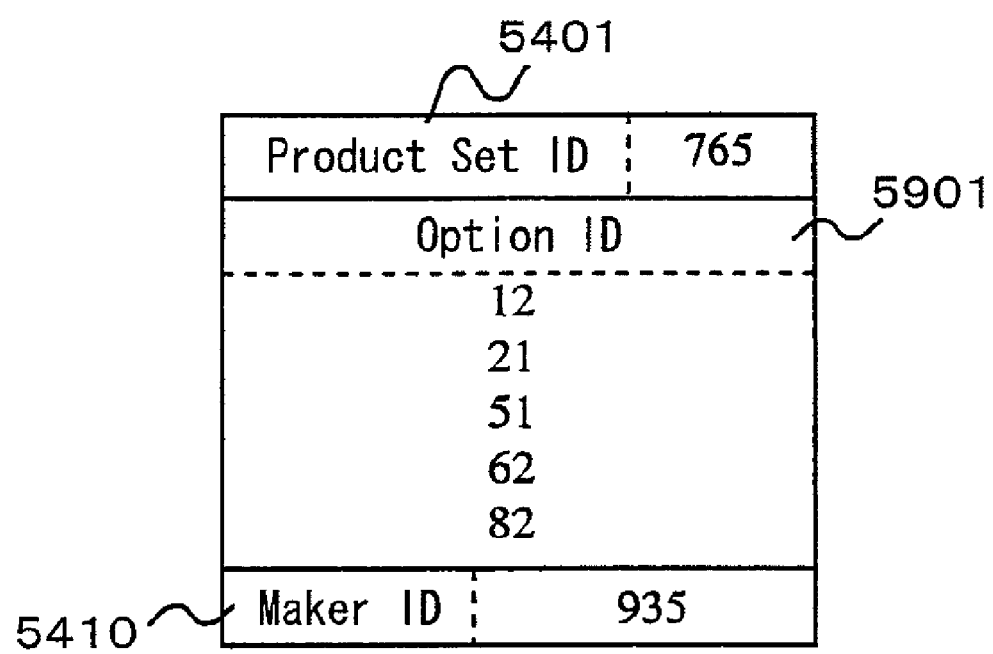
FIG. 52 shows an example of the product set.

FIG. 52 shows an example of the product set stored in the product set storing means 5105 of the present embodiment. As in FIG. 44, an option ID 5901 added to each option included in the product set is stored so as to correspond to the product set ID 5401 which is a number uniquely added to distinguish one product set from other product sets.

Note that, in the present embodiment, an order of the options is not important. As to the product set in this example, a combination of five options is stored, but the number of options is not limited to this, and the number of options may be varied for each product set. Alternately, as additional information, a maker ID 5401, which is the user ID 6001 added to the information of the product set maker who made the product set, is stored in combination.

Figure 53:
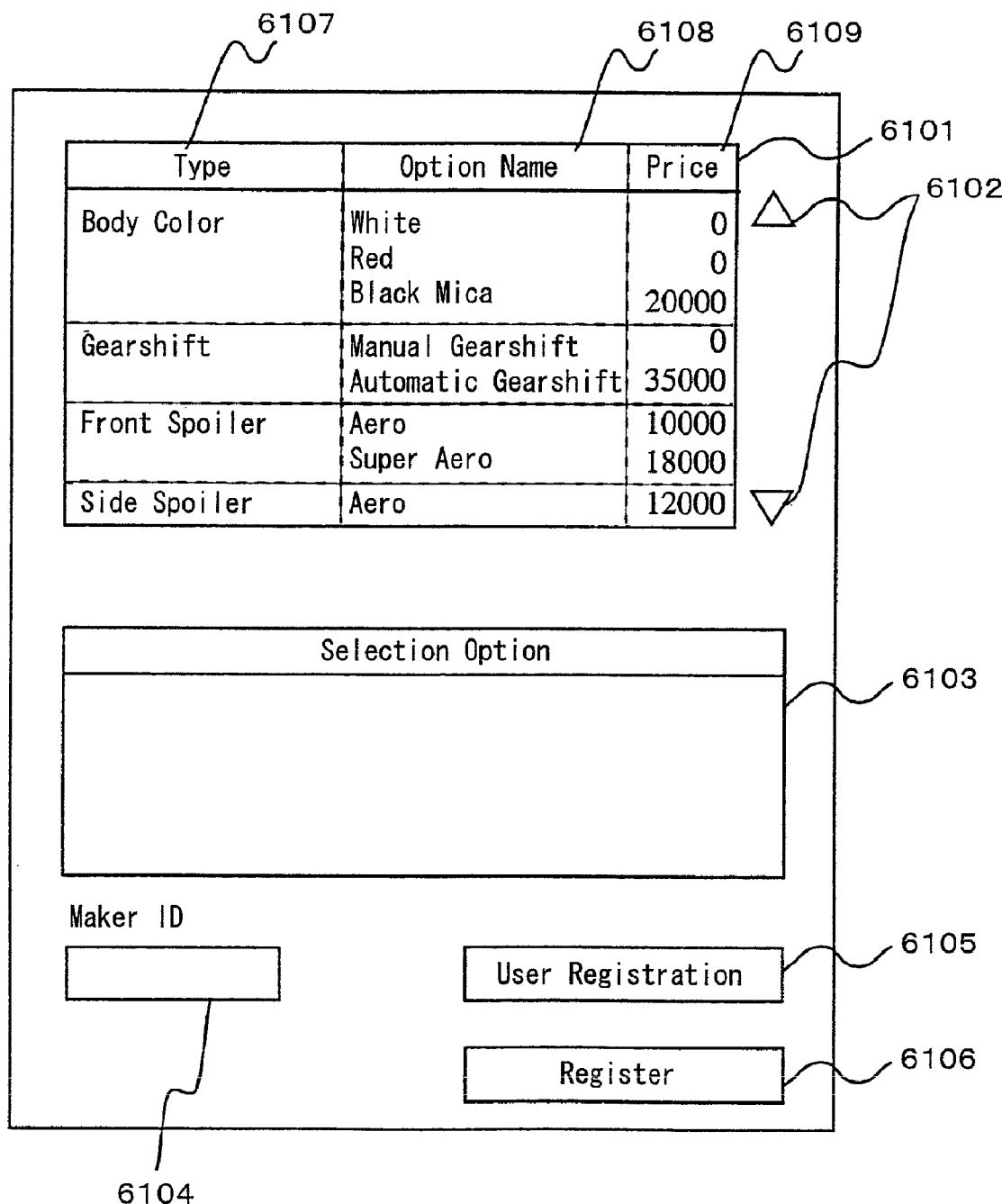
FIG. 53 shows a concrete example according to one embodiment of the present invention, and illustrates an example of an image by which the product set maker makes the product set.
Figure 55:
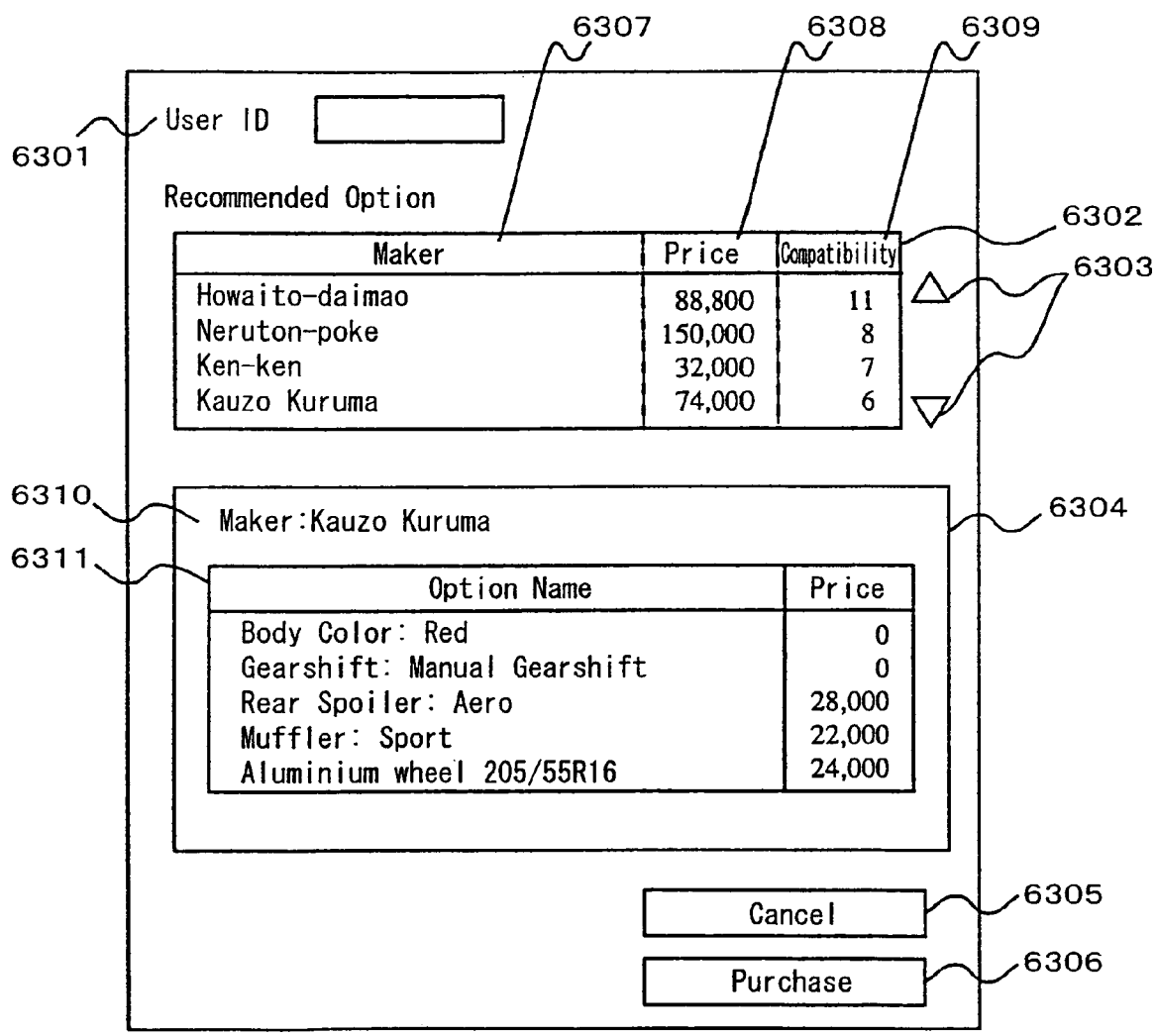
FIG. 55 shows a concrete example according to one embodiment of the present invention, and illustrates an example of an image by which the purchaser confirms a content of the product set so as to purchase the product set.

The following description will concretely exemplify the sale management system of the present embodiment referring to FIG. 53 to FIG. 55.

FIG. 53 shows an example of an image by which the product set maker makes the product set.

In FIG. 53, 6101 is a product information indicating area for indicating information of selective options, i.e., information concerning the product that has been outputted by the product information indicating means 5102, and 6102 is a scroll button for switching the information concerning the product that is displayed in the product information indicating area 6101 to information concerning another product, and 6103 is a selected option display area for displaying a content of a combination of options, that the product set maker selected from the options displayed in the product set indicating area 6101, as a content of the product set being made, and 6104 is a maker ID input area for inputting the user ID 6001 allocated to the user information when the user information has been additionally inputted by the product set maker with the maker information inputting means 5124 and has been registered in the user information storing means 5111, and 6105 is a user registration button for switching the image to an image for registering the user information described later in a case where the product set maker has not registered the user information yet, and 6106 is a registration button for transmitting the product set being made to the product management device 5100 so as to store the product set to the product set storing means 5105.

Further, in the product information indicating area 6101, a type 6107, an option name 6108, and a price 6109 are displayed as information concerning each option.

(a) An operation for selecting an option displayed in the product information indicating area 6101 so as to add the product set being made and (b) an operation for deleting an option displayed in the selection option display area 6103 from the product set being made are performed by clicking the option which is to be added or deleted in the same manner as described in FIG. 45.

FIG. 54 illustrates an example of the image for inputting the user information. This image appears when the user information is inputted, for example, when the user registration button 6105 in the image for making the product set shown in FIG. 53 is pushed. The user means not only the product set maker who makes the product set and the purchaser who purchases the product set, but also an ordinary user who refers to the product set.

In FIG. 54, 6201 is a name input area for inputting a name of the user, and 6202 is an age input area for inputting an age of the user, and 6203 is a gender input switch for inputting a gender of the user, and 6204 is a single/marriage inputting switch for inputting whether the user is married or unmarried, and 6205 is a family member number input area for inputting the number of family members of the user, and 6206 is a hobby input check box for inputting hobbies of the user, and 6207 is a cancel button for revoking information being inputted so as to cancel the input of the user information, and 6208 is a registration button for registering the inputted information to the user information storing means 5111. An example of this input image is based on the example of the information concerning the user that is shown in FIG. 51.

A character string or numeric values are inputted to each of the name input area 6201, the age input area 6202, and the family member number input area 6205, by using a key board and the like. The gender input switch 6203, the single/marriage input switch 6204, the hobby input check box 6206 are selected by clicking them. When the user finishes setting the required input information and pushes the registration button 6207, the inputted information is transmitted to the sale management device 5100, and is obtained by the user information obtaining means 5110.

The user information obtaining means 5110 allocates the user ID 6001 uniquely to the information concerning the user that has been obtained, and the allocated user ID 6001 and the information concerning the user are stored in the user information storing means 5111. Further, the allocated user ID 6001 is informed to the user who has inputted the information concerning the user by means of a display image (not shown) or an electronic mail and the like.

If the user inputs the information concerning the user once as described above, the user has only to input the user ID 6001 in a case where the user information is required, so that the user do not have to input the information concerning the user again.

FIG. 55 illustrates an example of an image by which the user confirms a content of the product set so as to purchase the product set.

In FIG. 55, 6301 is a user ID input area by which the purchaser inputs the user ID 6001, and 6312 is a user registration button for switching to the image for registering the user information as described in FIG. 54 so as to register the information concerning the product set in a case where the purchaser has not registered the user information, and 6302 is a product set ranking display area for displaying the product sets stored in the product set storing means 5105 in an order sorted by the ranking means 5106 in accordance with a certain standard such as compatibility derived by comparing (a) the information, concerning the product set maker who made the product sets, that has been stored in the user information storing means 5111 and (b) information of the purchaser having the user ID inputted as the user ID 6301, and 6303 is a scroll button for switching the product set displayed in the product set display area 6302 to another product set so as to display the switched product set, and 6304 is a product set content display area for displaying a detail content of one product set selected from the product sets displayed in the product set display area 6302, and 6305 is a cancel button for canceling the purchase of the product set, and 6306 is a purchase button for purchasing the product set displayed in the product set content display area 6304.

Further, in the product set display area 6302, the product set maker 6307, the price 6307, and the compatibility 6309 derived in the foregoing manner, are displayed.

When the product set displayed in the product set display area 6302 is clicked, a content of the clicked product set is displayed in the product set content display area 6304. Here, in the product set content display area 6304, there are displayed (a) a name 6310 of the product set maker and (b) a list 6311 of options included in the product set. The information is such that: the name of the maker is obtained by retrieving the user ID stored as the maker ID 5410 from the information, concerning the user, that has been stored in the user information storing means 5111 as shown in FIG. 51, and the type 5902 and the option name 5903 are obtained by retrieving the option ID 5901 from the information, concerning the product, that has been stored in the product information storing means 5101 as shown in FIG. 50, and the name of the maker, the type 5902, and the option ID 5901 are displayed.

In addition, when a key indicative of a content of the product set is displayed, for example, an appearance of a car that is obtained by simulating a combination of options included in the product set is displayed, the purchaser can select the desired product set based on the key.

The purchaser clicks the product set displayed in the product set display area 6302 so as to confirm the content displayed in the product set content display area 6304, and when the product set is desired, the purchaser pushes the purchase button 6305, so that it is possible to shift to a purchasing process.

An example of how to derive the compatibility between the information concerning the product set maker and the information concerning the purchaser is as follows: the information concerning the user as shown in FIG. 51 is referred to, and items other than the user ID 6001 and the user name 6002 are compared with each other, and when they coincide with each other, 1 is added as a grade, and when they do not coincide with each other, 0 is added as a grade, so as to calculate a total grade.

It is not necessary that the grade is fixed for each item, but a high grade may be allocated to an important item. Further, as to an item indicated by numerical values, the values may be classified into some phases for comparison, or the grade may be allocated according to differences between the values. The former is a process in which, for example, the age 6003 is classified into age attributes such as teens, twenties, thirties, and the like, and they are compared with each other. The latter is a process in which, for example, the numbers indicated as the family member number 6006 are compared with each other, and when a difference therebetween is 0, 5 is added as the grade, and when the difference is 1, 3 is added as the grade, and when the difference is 2, 1 is added as the grade, and the difference is not less than 3, 0 is added as the grade, so that the grade is allocated according to the difference between the values.

According to the former process, a minute difference between the numeric values can be ignored, and it is possible to consider a classification which classifies certain ranges such as ages each of which brings about the same sense of value between people of the same age. According to the latter process, when the numeric values coincide with each other, a high grade is added, but even when there is a minute difference between the numeric values, a certain grade is added. In this manner, it is possible to perform comparison while taking the difference between the numeric values into consideration. Further, as to items which can be selected in plurality, a grade is added for each coincident item as in the case of the hobby 6007.

A value displayed in the compatibility 6309 indicates the compatibility derived in the foregoing manner. When the value of the compatibility with respect to each product set is normalized so that a highest grade is a value easily understood such as 5100 grade, this makes it easier for the purchaser to understand the difference in the value. When it is assumed that the highest grade is 11 in the example shown in FIG. 55, it is preferable that the compatibility for all the product sets is multiplied by $100/11 \approx 9.09$.

To facilitate understanding, a value obtained by the foregoing multiplication may be rounded off.

Further, other than the expression based on numerical values, icons such as the number of asterisks corresponding to each predefined value are used, so that this makes it easier for the purchaser to intuitively understand which product set is preferable to purchase.

Figure 56:
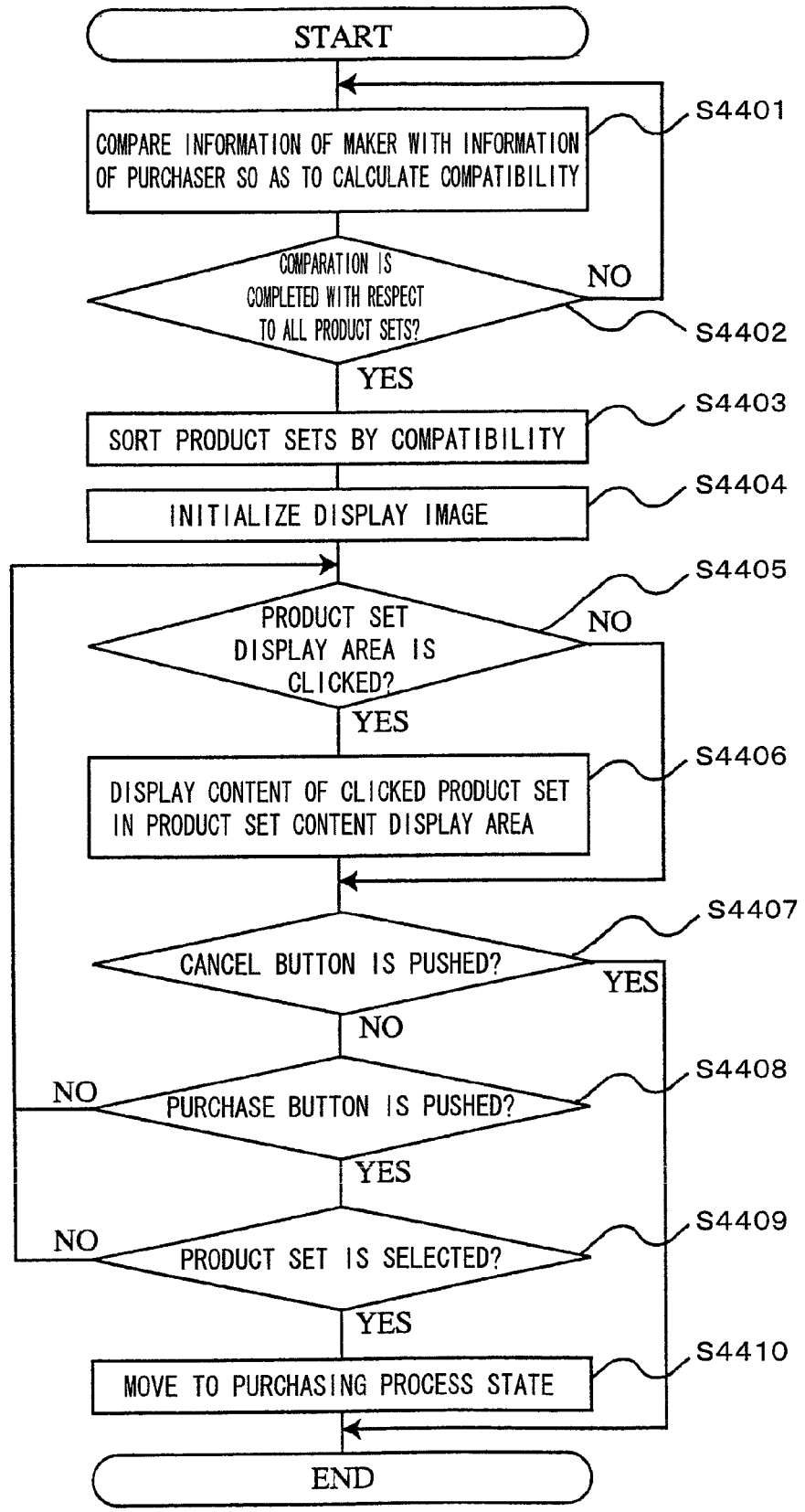
FIG. 56 is a flow chart for illustrating a processing flow in which the purchaser selects the product set to purchase the product set.

FIG. 56 is a flow chart for illustrating a processing flow in which the product set stored in the product set storing means 5105 is indicated to the purchaser so that the purchaser selects and purchases the desired product set by using the sale management system of the present embodiment.

First, judgment is given on whether the user registration button 6312 has been pushed or not (S4401). In a case where the user registration button 6312 has been pushed, the process proceeds to S4402, and in a case where the user registration button 6312 has not been pushed, the process proceeds to S4403.

In the case where the user registration button 6312 has been pushed in S4401, the purchaser inputs the information concerning himself/herself so as to register the information as described in FIG. 54 (S4402). After registering the information of the purchaser, the user ID 6001 allocated to the purchaser is automatically inputted to the user ID input area 6301, so that the purchaser does not have to input the user ID 6001 again.

Next, the user ID 6001 inputted to the user ID input area 6301 is obtained, and the user information, stored in the user information storing means 5111, that includes the user ID 6001, is read out (S4403). In a case where the user ID 6001 is not inputted to the user ID input area 6301, the process may be stopped until the user ID 6001 is inputted. Alternately, before the image for purchase that is shown in FIG. 55 is displayed, an access image constituted of the user ID input area 6301 and the user registration button 6312 is displayed, and the purchaser inputs the user ID 6001 to the user ID input area 6301 or pushes the user registration button 6312 so as to input the information concerning the user, so that it is possible to read the information of the purchaser without fail.

Next, the product set indicating means 5107 refers to a maker of a certain product set stored in the product set storing means 5105, and the user information comparing means 5112 compares (a) information, concerning the maker of the product set, that is stored in the user information storing means 5111, and (b) information concerning the purchaser, so as to derive the compatibility (S4404). The deriving method of the compatibility is as described above.

Next, judgment is given on whether or not the compatibility has been completely derived by the process of S4404 with respect to all the product sets stored in the product set storing means 5105 (S4405). In a case where the compatibility has been completely derived, the process proceeds to S4406. In a case where the compatibility has not been completely derived, the process returns to S4404, so as to repeat the deriving process with respect to the product set whose compatibility has not been derived.

Next, the ranking means 5106 sorts the product sets stored in the product set storing means 5105 in accordance with the compatibility calculated in S4404 (S4406). As algorithm used in sorting the product sets, a general algorithm such as bubble sort and quick sort may be used.

Next, the display image is initialized (S4407). In an example of FIG. 55, the maker 6307, the price 6308, and the compatibility 6309 are displayed in the product set display area 6302, as information concerning the product sets, in order sorted in S4406, that is, in order in which the product set made by the product set maker whose compatibility for the purchaser is highly ranked, and a content of the product set content display area 6304 is cleared.

Next, judgment is given on whether the product set display area 6302 has been clicked or not (S4408). In a case where the product set display area 6302 has been clicked, the process proceeds to S4409. In a case where the product set display area 6302 has not been clicked, the process proceeds to S4410.

In the case where the product set display area 6302 has been clicked in S4408, a content of the clicked product set is referred to in accordance with the product set storing means 5105, and is displayed in the product set content display area 6304 (S4409).

Next, judgment is given on whether the cancel button 6305 has been pushed or not (S4410). In a case where the cancel button 6305 has been pushed, the purchasing process is stopped. In a case where the cancel button 6305 has not been pushed, the process proceeds to S4411.

Next, judgment is given on whether the purchase button 6306 has been pushed or not (S4411). In a case where the purchase button 6306 has been pushed, the process proceeds to S4412. In a case where the purchase button 6306 has not been pushed, the process returns to S4408.

In the case where the purchase button 6306 has been pushed in S4411, judgment is given on whether the product set has been selected or not (S4412). Here, selecting the product set means that: the product set displayed in the product set display area 6302 is clicked, and a content of the product set is displayed in the product set content display area 6304. In a case where the product set has been selected, the process proceeds to S4413. In a case where the product set has not been selected, the process returns to S4408.

In the case where the product set has been selected in S4412, the process shifts to a process for purchasing the selected product set (S4413), and the process is finished.

The sale management device, or the product set making device, or the product set purchasing device, that is described above, is realized by a program which causes a sale management process, or a product set making process, or a product set purchasing process to function. The program is stored in a computer-readable storage medium. In the present invention, a general computer performs processes as the storage medium. Thus, a memory such as ROM (Read Only Memory) provided in or connected to a general computer may be used as a program media. Alternately, it may be so arranged that: a program media, provided in combination with a program reading device, is provided as an external storage device so that a storage medium is inserted into the program reading device so as to read the program.

In each case, it may be so arranged that the stored program is accessed and carried out by a microprocessor. Alternately, it may be so arranged that: in each case, a program is read out, and the read program is down-loaded to a program storing area such as RAM (Random Access Memory) included in a general computer so that the program is carried out. The program for down-loading is stored in a main body in advance.

Here, the program media is a storage medium detachably provided in a main body, and may be a medium which fixedly holds the program. Examples of the program media include: tapes such as a magnetic tape and a cassette tape, discs including a magnetic disc such as a floppy disc/a hard disc, and an optical disc such as CD-ROM/MO/MD/DVD and the like; cards such as an IC card (including a memory card)/an optical card and the like; and a semiconductor memories such as a mask ROM/EPROM/EEPROM/flash ROM and the like.

Further, in the present invention, the system can be connected to a communication network including the Internet. Thus, the program media may be a medium which carries the program fluidly so that the program can be down-loaded from the communication network. Note that, in case where a program is down-loaded from the communication network in this manner, the program for down-loading may be stored in the main body in advance, or may be installed from another storage medium.

Note that, a content stored in the storage medium is not limited to a program, but may be data.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

With the selection set evaluation device according to the present invention, it is possible to evaluate a combination of selection items selected by the user, in accordance with a certain standard. Further, the user can obtain a specific standard for making the selection set, so that the user can make the selection set of selection items so that the combination is highly evaluated, in accordance with the evaluation.

Further, the selection set evaluation device according to the present invention makes it easier for the user to select the selection items, and it is possible to evaluate a combination of the selection items selected by the user, in accordance with a specific standard. Further, the user can obtain a specific standard for making the selection set. Thus, the user can make the selection set so that the selection set is highly evaluated, in accordance with the evaluation.

Further, with the selection set evaluation device according to the present invention, it is possible to utilize a wide range of terminal devices as the terminal, so that it is possible to evaluate the selection sets made by a wide range of users.

Further, with the selection set making device according to the present invention, even when information concerning the selection item and an evaluation rule for evaluating the selection set are not stored in the terminal, it is possible to make the selection set and to obtain an evaluation with respect to the selection set. Further, with simplification of the selection set making device, it is possible to miniaturize the selection set making device and make the selection set making device lighter at a lower cost.

Further, with the selection set evaluating system according to the present invention, it is possible to build a selection set evaluating system which covers a wide range of users.

Further, with the selection set evaluating method, it is possible that: a selection set constituted of selection items selected by the user is inputted, and a combination of the selection items is evaluated in accordance with a certain standard. Further, the user can obtain a specific standard for making the selection set, so that he/she can make the selection set so that its evaluation is high, in accordance with the evaluation.

Further, the selection set evaluating method of the present invention makes it easier for the user to select the selection items, and it is possible to evaluate the combination of selection items selected by the user, in accordance with a specific standard. Further, the user can obtain a specific standard for making the selection set, so that he/she can make the selection set so that its evaluation is high, in accordance with the evaluation.

Further, a general computer realizes the computer-readable storage medium according to the present invention by carrying out the aforementioned selection set evaluating method.

Further, with the product selling device according to the present invention by which a plurality of products are combined with each other and sold, the purchaser can obtain a clue for determining a combination upon purchasing a plurality of products.

Further, with the selection set evaluation device according to the present invention, the evaluating user can evaluate the combination of selection items selected by the selecting user, so that the selecting user can make a new selection set, and can refer to an evaluation of the selection set upon rectifying the selection set that has been made.

Further, with the selection set evaluation result collecting device according to the present invention, a wide range of terminal devices can be used as a first terminal or a second terminal, so that it is possible to allow a wide range of users to make selection sets, and to collect evaluation results.

Further, with the selection set making device according to the present invention, information concerning the selection items are indicated by the selection set evaluation result collecting device, so that the selection set making device itself is not required to store the information concerning the selection items. Thus, it is possible to save a memory capacity of the selection set making device. Further, the selection set made by the selecting user is transmitted to the selection set evaluation result collecting device by the selection set transmitting means, so that the selection set evaluation result collecting device transmits the selection set to the evaluating user, thereby collecting evaluations of the selection set.

Further, with the evaluation inputting device according to the present invention, the evaluating users can input evaluations of a selection set made by other user, and the selection set evaluation result collecting device can collect evaluations of a selection set made by the selecting user.

Further, with the selection set evaluating system according to the present invention, it is possible to build a selection set evaluating system which covers a wide range of users.

Further, with the selection set evaluating method according to the present invention, the selecting user can refer to the evaluation of the selection set upon making a new selection set and rectifying the selection set that has been made.

Further, with the computer-readable storage medium according to the present invention, it is possible to cause a general computer to carry out the selection set evaluating method.

Further, with the product selling device according to the present invention by which a plurality of products are combined with each other and are sold, the purchaser can obtain a clue for determining a combination of a plurality of products upon combining them so as to purchase the combination. For example, when this is applied to a product selling device by which songs are combined with each other as a music album to be purchased, the purchaser can learn whether the combination is preferable or not, and the purchaser can make a new combination by referring to a highly-evaluated combination made by other purchaser.

Further, with the communication supporting device according to the present invention, it is possible to support exchange of messages and the like between a plurality of users talking about the evaluations of the selection set. For example, when this is applied to a device for supporting communications concerning music, a plurality of users can discus which part is preferable and which part is not preferable with respect to an arrangement of a music album made by combining songs.

Further, with the selection set evaluation device according to the present invention, the total evaluation result is derived in accordance with (a) an evaluation result based on the evaluation rule which is a specific objective standard and (b) an evaluation given by the evaluating user from a view point different from the evaluation rule, so that this brings about a more appropriate evaluation result. Thus, the selecting user can refer to the evaluation of the selection set upon making a new selection set and rectifying the selection set that has been made.

Further, with the selection set evaluation result collecting device according to the present invention, it is possible to use a wide range of terminal devices as a first terminal or a second terminal, so that it is possible to allow a wide range of users to make selection sets and it is possible to collect the evaluation results.

Further, with the selection set making device according to the present invention, even when the evaluation rule for evaluating the selection set is not stored, it is possible to obtain the evaluation of the selection set, that has been made, by means of the selection set evaluation result collecting device. Further, many evaluation users can access the selection set evaluation result collecting device, so that it is possible to obtain huge variety of and a large quantity of evaluations with respect to the selection set.

Further, with the selection set evaluation inputting device according to the present invention, it is possible to input an evaluation of a selection set made by other user, so that the selection set evaluation result collecting device can collect evaluations of a selection set made by the selecting user.

Further, with the selection set evaluating system according to the present invention, it is possible to a selection set evaluating system which covers a wide range of users.

Further, with the selection set evaluating method according to the present invention, the total evaluation result is derived in accordance with (a) an evaluation result based on the evaluation rule which is a specific objective standard and (b) an evaluation made by the evaluating user from a view point different from the evaluation rule, so that this brings about a more appropriate evaluation result. Thus, the selecting user can refer to the evaluation of the selection set upon making a new selection set and rectifying the selection set that has been made.

Further, as to the computer-readable storage medium according to the present invention which stores a selection set evaluating program, a general computer can be used as the selection set evaluation device, or the selection set evaluation result collecting device, or the selection set making device, or the selection set evaluation inputting device, and it is possible to build the selection set evaluating system by using a computer which operates in accordance with such program.

Further, with the product selling device according to the present invention by which a plurality of products are combined and are sold, the purchaser can obtain a clue for determining a combination upon combining a plurality of products so as to purchase them. For example, when this is applied to a product selling device by which songs are combined with each other as a music album to be purchased, the purchaser can learn whether the combination is preferable or not, and can purchase a highly-evaluated combination made by a user who makes other selection set, and can make a new selection set by referring to the selection set.

Further, with the communication supporting device according to the present invention by which messages and the like are exchanged between a plurality of users, it is possible to support exchange of the messages and the like between the plurality of users talking about the evaluation of the selection set. For example, when this is applied to a device for supporting communications with respect to music, a plurality of users can discus which part is preferable and which part is not preferable with respect to an arrangement of a music album made by combining songs.

Further, with the sale management device according to the present invention, the purchaser do not have to take any trouble in determining which combination of products or which combination of selection items is to be purchased. Further, the seller do not have to take any trouble in making the product set. Moreover, it is possible to indicate a product set including a product, which has never been sold, or a selection item, which has not been selected, to the purchaser. The product set maker can freely make a special product set based on a specific theme, so that it is possible to indicate a product set, which cannot be made by a conventional method, to the purchaser.

Further, with the sale management device according to the present invention, the purchaser do not have to take any trouble in determining which combination of products or which combination of selection items is to be purchased. Further, the seller do not have to take any trouble in making a product set. Moreover, it is possible to indicate a product set including a product, which has never been sold, or a selection item, which has not been selected, to the purchaser. The product set maker can freely make a special product set based on a specific theme, so that it is possible to indicate a product set, which cannot be made by a conventional method, to the purchaser.

Further, with the product set making device according to the present invention, it is possible to cause the sale management device to collect product sets made by a large number of product set makers.

Further, with the product set purchasing device according to the present invention, it is not necessary to store information concerning the product set in the product set purchasing device, and it is possible to sell product sets to a large number of product set purchasers.

Further, with the sale management system according to the present invention, it is possible to build a sale management system which covers a wide range of users.

Further, with the sale management method according to the present invention, the purchaser do not have to take any trouble in determining which combination of products or which combination of selection items is to be purchased. Further, the seller do not have to take any trouble in making the product set. Moreover, it is possible to indicate a product set including a product, which has never been sold, or a selection item, which has not been selected, to the purchaser. The product set maker can freely make a special product set based on a specific theme, so that it is possible to indicate a product set, which cannot be made by a conventional method, to the purchaser.

Further, with the computer-readable storage medium according to the present invention which stores a sale management program, a general computer can be used as the sale management device, or the product set making device, or the product set purchasing device, or the sale management system, and it is possible to build the sale management system by using a computer which operates in accordance with such program.

What is claimed is:

1. A selection set evaluation device, by which a selection set constituted of one selection item or a plurality of selection items selected by a selecting user is evaluated by another user wherein each selection item representing a commercial product constituting a product set, and the selecting user selects the selection item subjectively freely according to a specific theme, comprising:

selection item memory storing information concerning the selection item;

selection item display indicator for indicating the selection item to a selecting user;

selection item selecting input device by which the selecting user selects the selection item, that has been indicated, so as to make the selection set;

selection set display indicator for indicating the selection set, that has been made by the selecting user, to a plurality of evaluating users; and evaluation input area by which each of the evaluating users inputs an evaluation of the selection set that has been indicated, the evaluation is the evaluation user's subjective evaluation about how excellent the selection set is as a representation of the specific theme.

2. The selection set evaluation device as set forth in claim 1, further comprising total evaluation deriving calculator for deriving a total evaluation in accordance with a plurality of evaluations of the selection set, said evaluations having been inputted by said plurality of evaluating users.

3. The selection set evaluation device as set forth in claim 1, further comprising:
   evaluation result informing output for informing evaluation results, that have been inputted by the plurality of evaluating users, to a user using the evaluation results;
   evaluation result adequacy setting input device by which the user using the evaluation results sets adequacy of the evaluation results that have been informed by the evaluation result informing output; and
   total evaluation deriving calculator for deriving a total evaluation in accordance with (a) the evaluations that have been inputted by said plurality of evaluating users and (b) the adequacy that has been set by the evaluation result adequacy setting input device.

4. The selection set evaluation device as set forth in any one of claims 1 to 3, wherein a basis for each evaluation is inputted together via the evaluation input area.

5. A product selling device, comprising the selection set evaluation device as set forth in claim 1.

6. A communication supporting device, comprising the selection set evaluation device as set forth in claim 1.

7. A selection set evaluating method performed by one or more computers having memory, of which a computer is a selection set evaluating device, by which a selection set constituted of one selection item or a plurality of selection items selected by a selecting user is evaluated by another user, wherein each selection item representing a commercial product constituting a product set, and the selecting user selects the selection item subjectively freely according to a specific theme, comprising the steps of:
   indicating information concerning the selection item to a selecting user;
   indicating the selection set made by the selecting user to an evaluating user; and
   allowing the evaluating user to input an evaluation of the selection set that has been indicated, the evaluation is the evaluating user's subjective evaluation about how excellent the selection set is as a representation of the specific theme.

8. A non-transitory computer-readable storage medium, storing a program for carrying out the selection set evaluating method as set forth in claim 7.

9. A selection set evaluating method, by which a selection set constituted of one selection item or a plurality of selection items selected by a selecting user is evaluated, wherein each selection item representing a commercial product constituting a product set, and the selecting user selects the selection item subjectively freely according to the specific theme, comprising the steps of:
   (i) evaluating the selection set, in accordance with an evaluation rule to evaluate the selection set that has been made by a user making the selection set, so as to output an evaluation result;
   (ii) indicating the selection set to an evaluating user;
   (iii) accepting the evaluating user to input an evaluation of the selection set that has been indicated, the evaluation the evaluating user's subjective evaluation about how excellent the selection set is as a representation of the specific theme; and
   (iv) deriving a total evaluation result in accordance with (a) the evaluation result obtained in the step (i) and (b) the evaluation inputted in the step (iii), so as to output the total evaluation result, wherein a program causes a computer to carry out the steps.

10. A selection set evaluating system, comprising:
   a selection set evaluation result collecting device, which collects an evaluation result with respect to a selection set constituted of one selection item or a plurality of selection items selected by a selecting user, wherein each selection item representing a commercial product constituting a product set, and the selecting user selects the selection item subjectively freely according to a specific theme, said evaluation result being made by an evaluating user, said selection set evaluation result collecting device including
   selection item transmission controller for controlling transmission of information concerning the selection item to a first terminal operated by the user selecting the selection item so as to make the selection set,
   selection item transmission/reception controller for controlling (a) reception of the selection set from the first terminal and (b) transmission of the selection set to a second terminal operated by the evaluating user, and
   selection set evaluation reception controller for controlling reception of an evaluation of the selection set from the second terminal;
   a selection set making device, connected to the selection set evaluation result collecting device, by which a selection set constituted of one selection item or a plurality of selection items is made, said selection set making device including
   selection item selecting input device by which a user making the selection set selects the selection item, that has been indicated by the selection set evaluation result collecting device, so as to make the selection set, and
   selection set transmitter for transmitting the selection set, that has been made by the user, to the selection set evaluation result collecting device; and
   a selection set evaluation inputting device, connected to the selection set evaluation result collecting device, by which an evaluation with respect to a selection set constituted of one selection item or a plurality of selection items is inputted, said selection set evaluation inputting device including
   evaluation input device by which an evaluating user inputs the evaluation of the selection set indicated by the selection set evaluation result collecting device, the evaluation is the evaluation user's subjective evaluation about how excellent the selection set is as a representation of the specific theme, and
   evaluation transmitter for transmitting the evaluation inputted by the evaluation input device to the selection set evaluation result collecting device.

11. A selection set evaluating system, comprising:
   a selection set evaluation result collecting device, which collects an evaluation result with respect to a selection set constituted of one selection item or a plurality of selection items selected by a selecting user, wherein each selection item representing a commercial product constituting a product set, and the selecting user selects the selection item subjectively freely according to a specific theme, including selection set transmission/reception controller for (a) receiving the selection set, that has been made by a first terminal operated by the user making the selection set, from the first terminal, and (b) transmitting the selection set to a second terminal operated by an evaluating user, evaluation rule memory for storing an evaluation rule to evaluate the selection set, selection set evaluation calculator for evaluating the selection set, that has been received from the first terminal, in accordance with the evaluation rule stored in the evaluation rule memory, so as to output an evaluation result, selection set evaluation reception controller for controlling reception of an evaluation of the selection set from the second terminal, and total evaluation deriving calculator for deriving a total evaluation result in accordance with (a) the evaluation result made by the selection set evaluation calculator and (b) the evaluation received by the selection set evaluation reception controller;

a selection set making device, connected to the selection set evaluation result collecting device, which makes a selection set constituted of one selection item or a plurality of selection items, including selection item memory for temporarily or continuously storing information concerning the selection item, selection item display indicator for indicating the selection item to a user making the selection set, selection item selecting input device by which the user selects the selection item, that has been indicated, so as to make the selection set, and selection set transmitter for transmitting the selection set, that has been made, to the selection set evaluation result collecting device; and a selection set evaluation inputting device, connected to the selection set evaluation result collecting device, by which an evaluation of a selection set constituted of one selection item or a plurality of selection items is inputted, including evaluation input device by which an evaluating user inputs the evaluation of the selection set that has been indicated by the selection set evaluation result collecting device, the evaluation is the evaluation user's subjective evaluation about how excellent the selection set is as a representation of the specific theme, and evaluation transmitter for transmitting the evaluation, that has been inputted by the evaluation inputting means, to the selection set evaluation result collecting device.

* * * * *